(12) United States Patent
Mehta et al.

(10) Patent No.: US 10,577,180 B1
(45) Date of Patent: Mar. 3, 2020

(54) MOBILE MODULES FOR DELIVERING ITEMS

(71) Applicant: Amazon Technologies, Inc., Seattle, WA (US)

(72) Inventors: Kaushal Bharatkumar Mehta, Seattle, WA (US); Jaemi Cheri Tiangco Bermudez, Des Moines, WA (US); Daniel Lowther, Washington Crossing, PA (US); Prasad V. Rao, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/905,456

(22) Filed: Feb. 26, 2018

(51) Int. Cl.
  *B65G 1/137* (2006.01)
  *B65G 1/04* (2006.01)
  *B25J 9/16* (2006.01)
  *G06Q 50/28* (2012.01)

(52) U.S. Cl.
  CPC ............ *B65G 1/1375* (2013.01); *B25J 9/162* (2013.01); *B25J 9/1687* (2013.01); *B25J 9/1697* (2013.01); *B65G 1/0492* (2013.01); *B65G 1/1376* (2013.01); *G06Q 50/28* (2013.01); *Y10S 901/01* (2013.01); *Y10S 901/47* (2013.01)

(58) Field of Classification Search
  CPC combination set(s) only.
  See application file for complete search history.

(56) References Cited

U.S. PATENT DOCUMENTS

| | | | |
|---|---|---|---|
| 7,861,844 B2 | 1/2011 | Hayduchok et al. | |
| 8,560,461 B1* | 10/2013 | Tian | G06Q 10/087 705/332 |
| 2009/0281921 A1* | 11/2009 | Foster | G06Q 30/06 705/26.1 |

* cited by examiner

*Primary Examiner* — Kyle O Logan
(74) *Attorney, Agent, or Firm* — Athorus, PLLC

(57) ABSTRACT

Mobile modules including a number of bins or other storage units may be formed in a modular manner, from various sub-modules. The mobile modules may be loaded with items by a sortation system or by associates. A bin within a mobile module may be selected and assigned to an order for a plurality of items, and each of the items included in the order may be deposited into the selected bin. After a sufficient number of bins within the mobile module have been filled with ordered items, the mobile module may be loaded into or onto a delivery vehicle and transported to a location from which the ordered items may be delivered to a customer, e.g., by an autonomous mobile robot or by an associate.

20 Claims, 38 Drawing Sheets

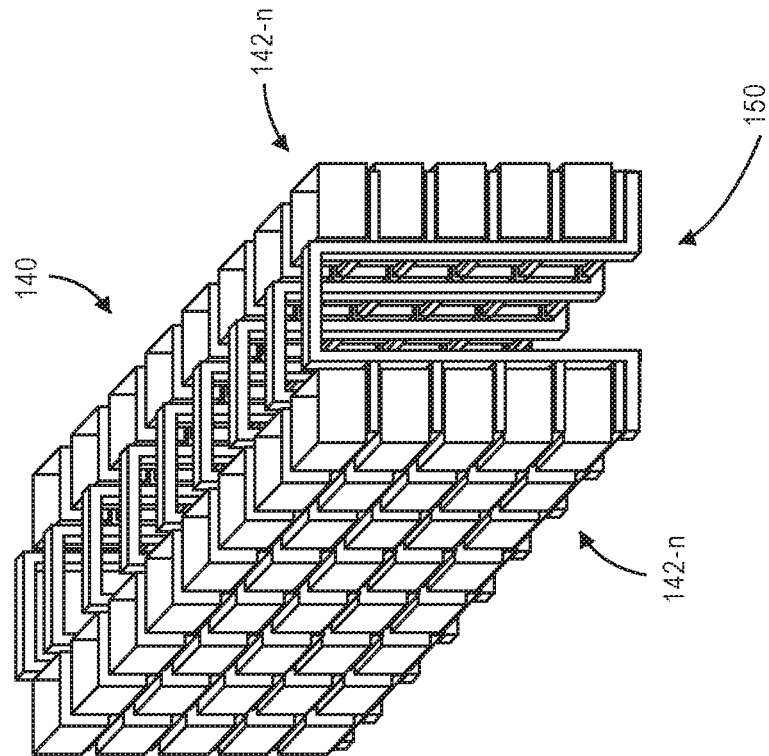
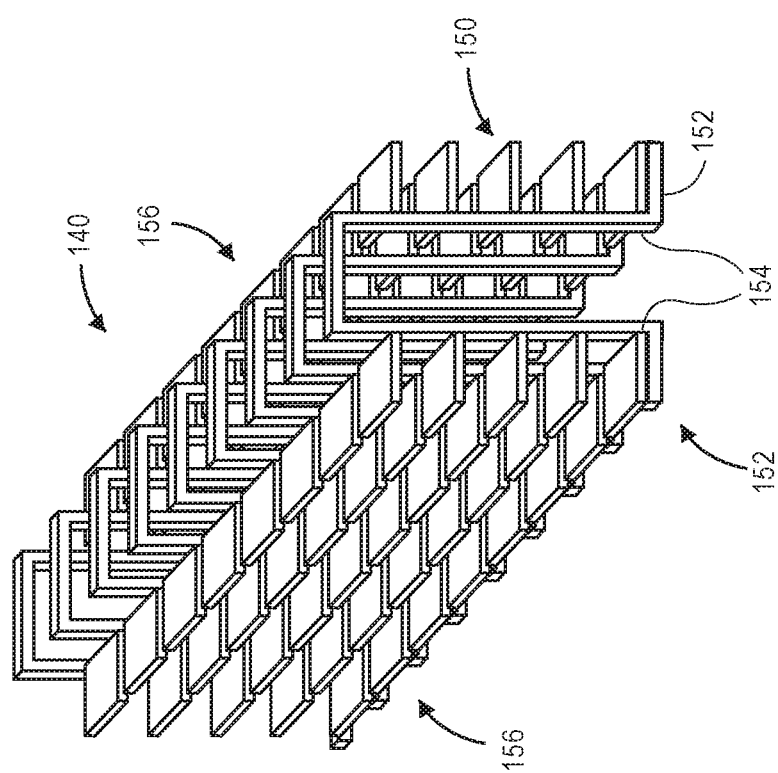
FIG. 1D
FIG. 1C

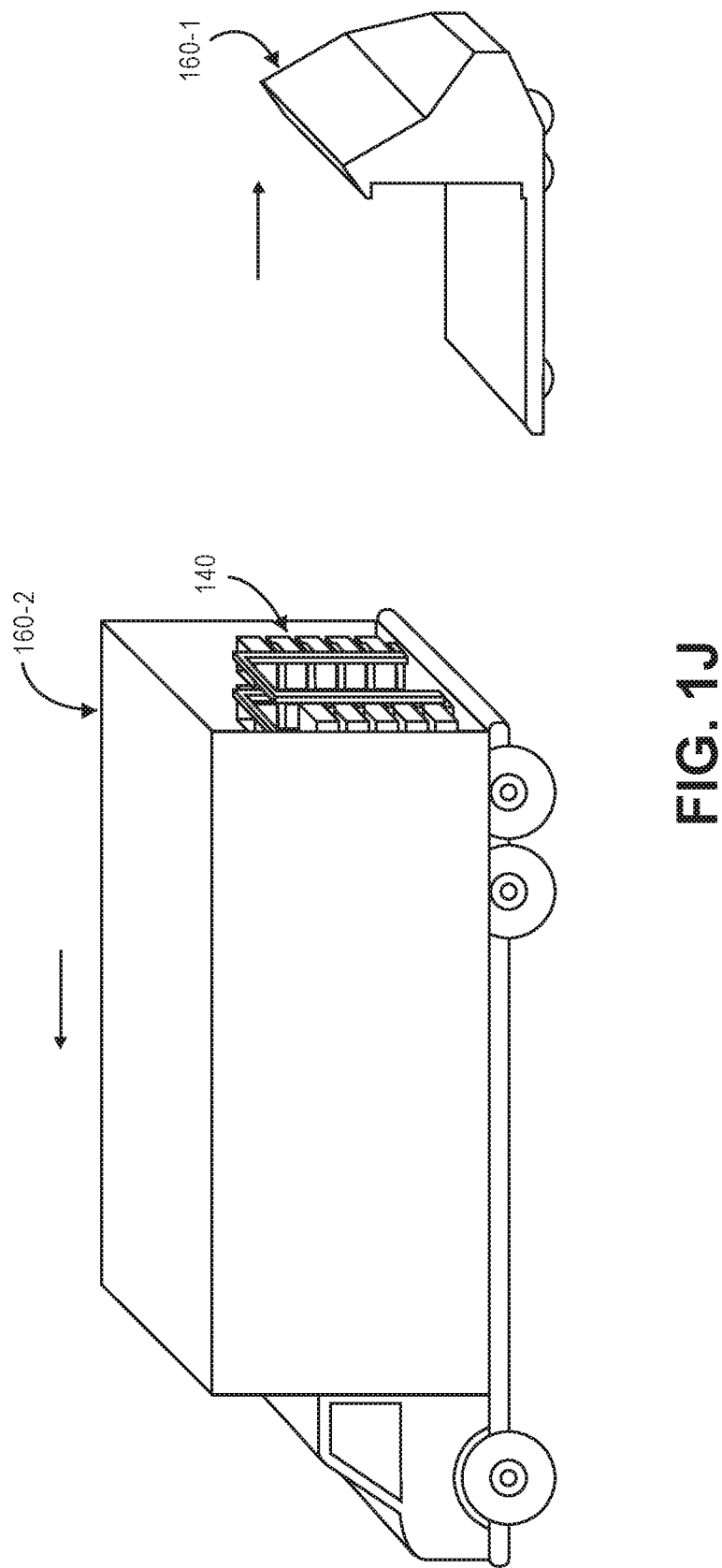

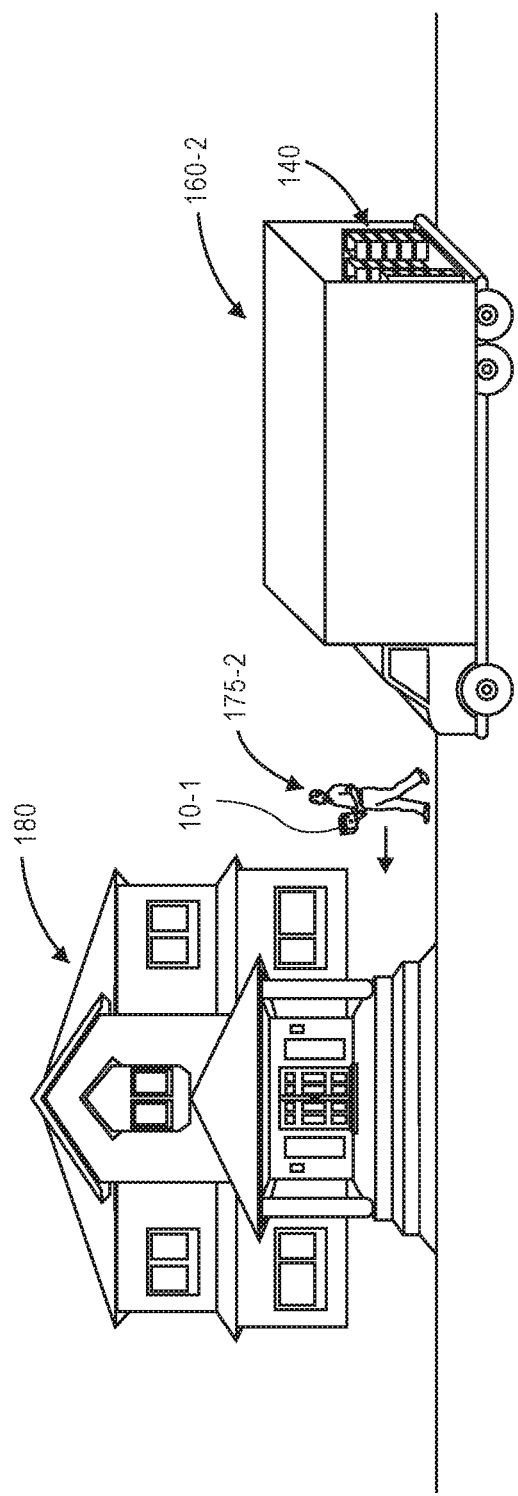

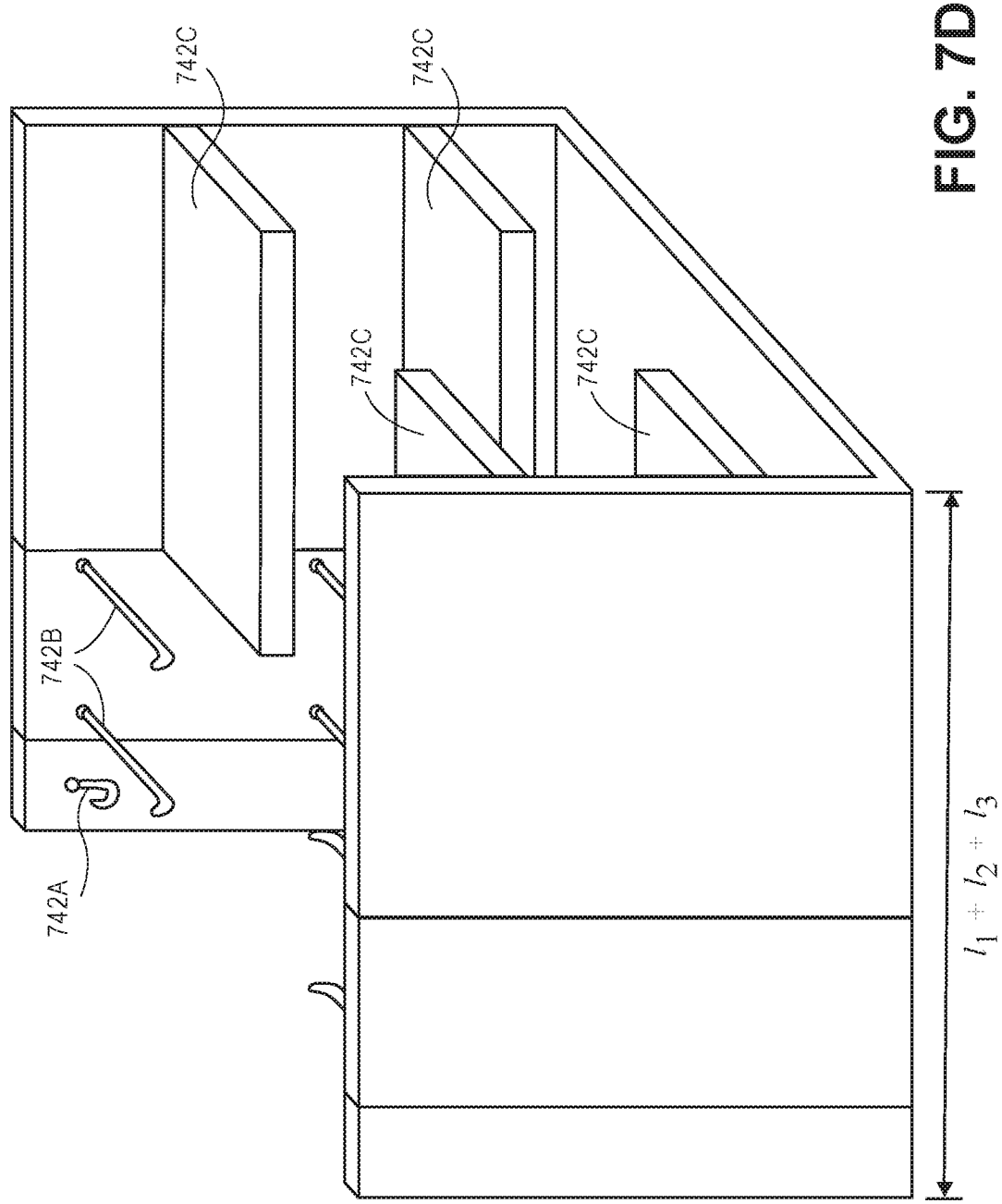

MOBILE MODULES FOR DELIVERING ITEMS

BACKGROUND

The advent of Internet-based electronic commerce in the 1990s spawned the development of online marketplaces, which are increasingly common electronic forums through which customers may place orders for one or more items over the Internet. Online marketplaces enable customers to visit one or more network sites from any corner of the globe, to view and evaluate items, and to place orders for the purchase of such items over the Internet. Initially, orders for items that were placed at online marketplaces over the Internet were fulfilled at the original locations of vendors (or manufacturers, merchants or other sources of the items), from which the items would be shipped to customers via first-class mail or another common carrier.

Online marketplaces soon became victims of their own successes, however, as gains in time or efficiency that were realized through the ease by which customers could place orders for items were soon consumed by losses due to delays in shipping the ordered items from their original locations to customers. Eventually, the growth of online marketplaces, and the rapid expansion in the scope and breadth of their available offerings, led to a concomitant proliferation of fulfillment centers. A fulfillment center is a facility, a warehouse or another like structure that is constructed in a distributed, centralized location and adapted to receive items from sources of the items (e.g., vendors or other fulfillment centers). Fulfillment centers may include stations for receiving shipments of items, for storing such items, and/or for preparing such items for delivery to customers. When an order for the purchase of one or more of the items stored in a fulfillment center is received from a customer, the ordered items are typically retrieved from the spaces or areas in which such items are stored, and prepared for delivery to the customer, e.g., by packing the ordered items into one or more appropriate containers with a sufficient type and amount of dunnage, and delivering the containers to a destination designated by the customer.

As electronic commerce expands into ever more sectors of the economy, customers have become accustomed to, and are increasingly demanding, greater product availability and faster response times from online marketplaces. Shortening an elapsed time between the placement of an order for an item and a delivery of the item remains a primary goal of retailers that engage in electronic commerce. Improvements to any aspect of a supply chain may result in a shortened time of delivery, thereby providing substantial benefits to such retailers, and to customers who order items from them.

BRIEF DESCRIPTION OF THE DRAWINGS

FIGS. 1A through 1M are views of aspects of one system for delivering items using mobile modules in accordance with embodiments of the present disclosure.

FIGS. 7A through 7D are views of aspects of one mobile module for delivering items in accordance with embodiments of the present disclosure.

DETAILED DESCRIPTION

As is set forth in greater detail below, the present disclosure is directed to mobile modules, or the use of mobile modules, for the delivery of items from a source such as a fulfillment center, a warehouse or a like facility, to one or more destinations specified by customers. The mobile modules may be modular in nature, and configured for mating not only with loading systems having conveyors, scanners or other imaging devices for detecting and recognizing items and transferring such items to selected locations within the mobile modules, and also with delivery vehicles of any kind that may be configured to transport or transfer the modules and the items therein from a fulfillment center or like facility to one or more destinations from which the items may be distributed to customers or to another delivery vehicle. Embodiments of the mobile modules of the present disclosure may be modular in nature, and may be formed from one or more individual homogenous or heterogeneous modules or submodules that are collectively or individually outfitted with one or more bins, bays, shelves, slots, racks, tiers, bars, hooks, cubbies or other like storage units for receiving items, or containers of such items, from one or more associates or machines, such as autonomous mobile robots. When a mobile module is delivered to a location (e.g., an area or region associated with one or more customers or orders for items), the items within the storage units may be offloaded by one or more associates or machines and delivered to their respectively intended destinations. In some embodiments, a mobile module may include one or more identifiers (e.g., lights or other signal emitting systems) that alert an associate or a robot as to which storage unit includes the one or more items that are intended for delivery to a given destination.

Accordingly, the mobile modules of the present disclosure may be used to efficiently and effectively transfer items in large numbers from a source, such as a fulfillment center, to a destination, such as an area or region having one or more destinations for such items, by way of one or more delivery vehicles, thereby enabling the items to be delivered by associates or machines to such destinations more rapidly and efficiently than existing systems or methods for fulfillment and delivery.

Figure 1A:
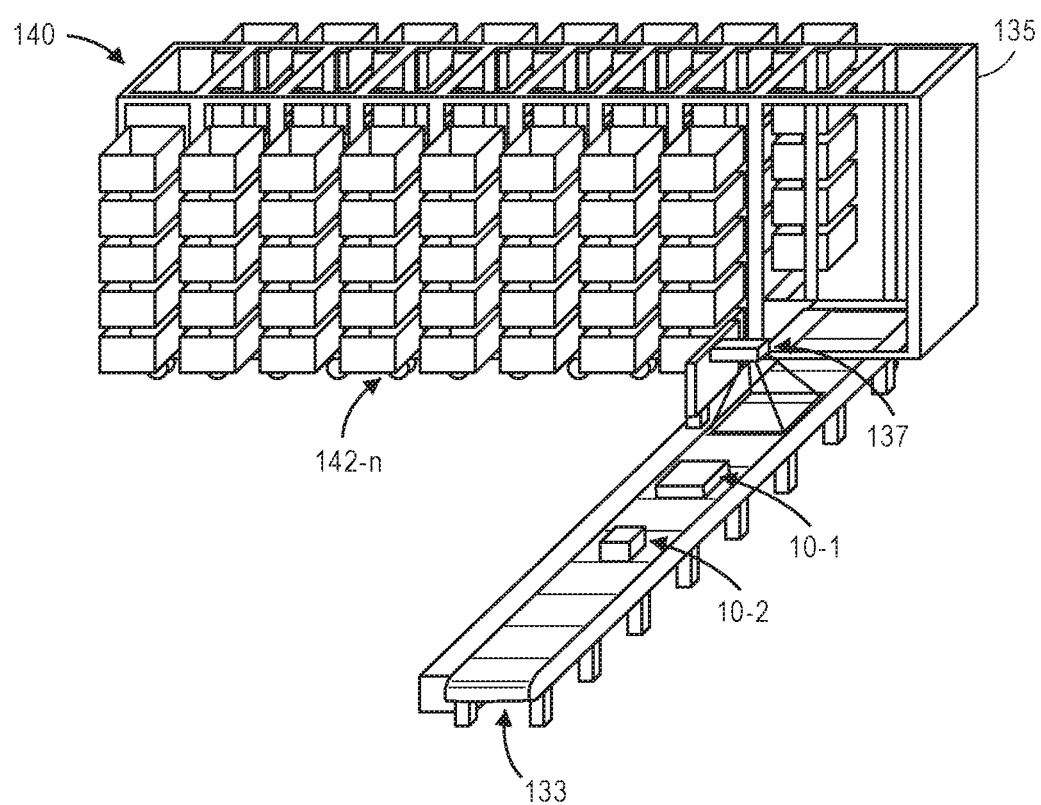

Referring to FIGS. 1A through 1M, views of aspects of one system for delivering items using mobile modules in accordance with embodiments of the present disclosure are shown. As is shown in FIG. 1A, the system includes a conveyor 133, a sortation system 135 and a mobile module 140. The conveyor 133 may be any type or form of conveying system or other powered mover systems such as conveyors or powered carriers (e.g., rail cars) operating on stationary network components (e.g., rails), and may include one or more diversion systems of various types for transferring physical objects between one or more powered mover systems or powered carriers. For example, in some embodiments, the conveying systems may include belted conveyors that may but need not feature one or more hooks, notches or holding extensions thereon for securing items thereto or, alternatively, indents or shaped receptacles for securing items therein, as well as chain conveyors carrying one or more pendants for pulling unit loads on pallets or other large-scale containers, or gravity conveyors consisting of a series of rollers that may be used to move objects based on a difference in height, and a resulting difference in gravitational potential energy, without the use of a motor. One or more objects, such as items 10-1, 10-2, may be placed directly onto the conveyor 133, or into one or more bins or like containers that may be placed on the conveyor 133.

Objects traveling on the conveyor 133 pass beneath a scanner 137 or other item identification device, which may be configured to capture data (e.g., imaging data, bar code data, radiofrequency identification, or "RFID," signals or the like), from which the objects (e.g., the items 10-1, 10-2) may be identified. For example, the scanner 137 may capture visual imaging data using a digital camera, and process the imaging data to recognize any markings, labels or other identifiers that may be disposed on an object, such as one-dimensional bar codes, two-dimensional bar codes (e.g., "QR codes"), bokodes, characters, numbers, symbols, colors or textures, and interpret such identifiers to identify the object, or one or more characteristics of the object. The scanner 137 may also capture depth imaging data using a depth sensor or range camera, and process the imaging data to estimate dimensions of an object (e.g., a length, a width or a height of the object) from the imaging data, or to estimate a surface area or a bounding volume of the object using such dimensions. Moreover, according to some other embodiments of the present disclosure, imaging data or attributes of an object determined therefrom may be augmented by other information or data regarding the object, such as a mass of the object as determined by one or more scales. For example, the conveyor 133 and/or the sortation system 135 may include one or more of any form of electronic scale or measuring device having sufficient electronic and other components that may be configured to determine a mass or weight of an object, and to generate or transmit a digital or analog signal corresponding to the mass or weight.

The sortation system 135 includes a frame or other system defining a channel, a conduit or other passageway for receiving items by way of the conveyor 133. The channel, the conduit or the passageway extends in parallel to a longitudinal axis defined by the frame of the sortation system 135. The mobile module 140 is coupled to the sortation system 135, e.g., at one end of the mobile module 140, and likewise includes a frame or other system for supporting a plurality of bins 142-$n$ into which one or more items may be deposited. As is shown in FIG. 1A, the frame of the sortation system 135 is arranged in a grid or lattice-like structure having bars or framing elements which provide structural support to various aspects of the sortation system 135. Spaces or gaps between such bars or framing elements of the sortation system 135 are coaligned with columns of the bins 142-$n$, such that items may be transferred from within the sortation system 135 to one or more of the bins 142-$n$, e.g., by one or more associates or autonomous mobile robots.

Figure 1B:
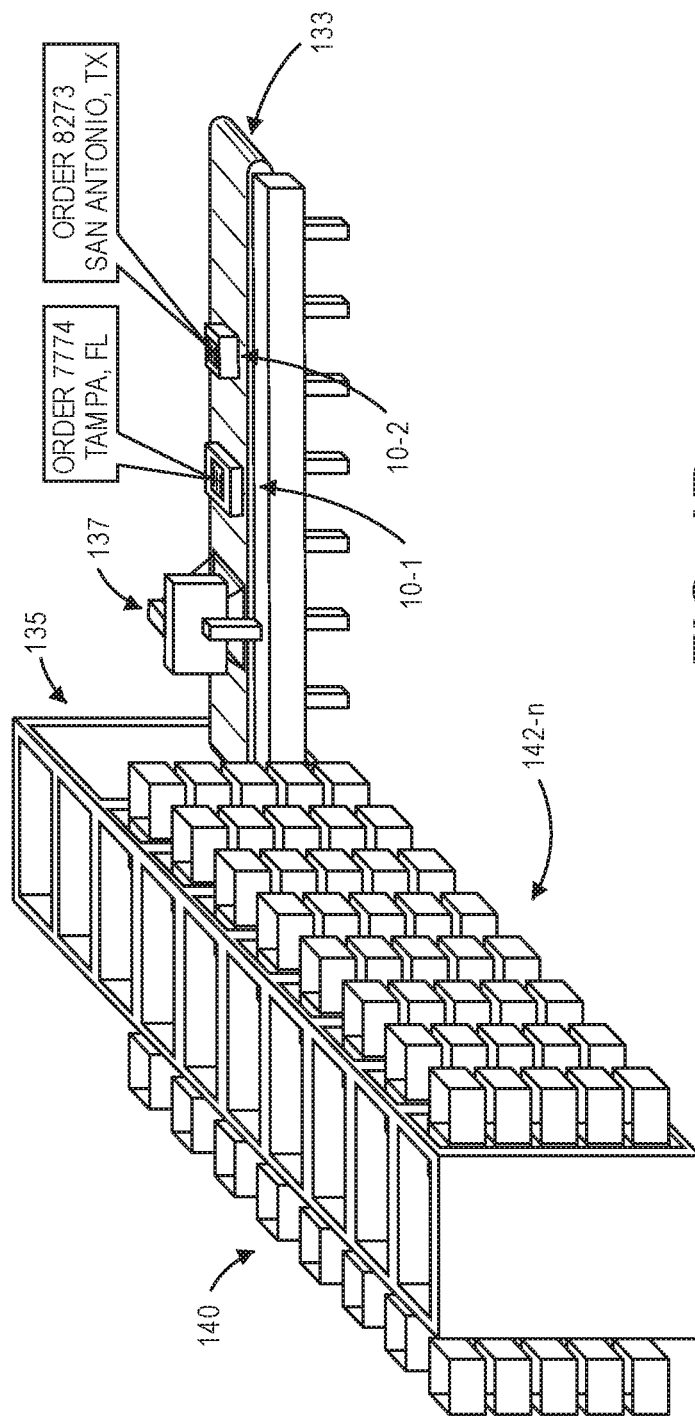

For example, where an order for an item, viz., the item 10-1, is received, the item may be picked or otherwise retrieved from one or more storage areas and placed on the conveyor 133 for delivery to the mobile module 140. As is shown in FIG. 1B, based on data captured using the scanner 137, orders associated with the item 10-1 (viz., Order No. 7774, for delivery to Tampa, Fla.) and the item 10-2 (viz., Order No. 8273, for delivery to San Antonio, Tex.), or any other items, may be identified. After the items 10-1, 10-2 have been recognized, and orders associated with the items 10-1, 10-2 have been identified, one of the bins 142-$n$ of the mobile module 140 may be selected for each of the orders, and the items 10-1, 10-2 may be deposited within the bins 142-$n$ that have been selected for their respective orders.

As is shown in FIGS. 1C and 1D, in some embodiments, a frame 150 of the mobile module 140 may include a plurality of bases 152 and a plurality of risers 154, with each of the risers 154 extending vertically upward from, e.g., normal to, one of the bases 152. The bases 152 and the risers 154 may be formed from any suitable material, including but not limited to wood, plastics (e.g., reinforced plastics such as fiberglass), metals (e.g., forged steel or aluminum) or composites, and may be assembled using one or more screws, bolts, rivets, brackets or the like. The frame 150 also defines a channel, a conduit or other passageway into which the frame or other system of the sortation system 135 may be received therein, and extends in parallel to a longitudinal axis defined by the frame 150 or the sortation system 135. As is shown in FIGS. 1C and 1D, each of the risers 154 may provide support for a plurality of shelves 156 or other storage units onto which one or more items or containers of items, e.g., the bins 142-$n$, may be placed or otherwise deposited.

Components from which the frame 150 is assembled (e.g., the bases 152 and/or the risers 154) may take any shapes or forms, and may feature cross-sections that are not only circular but also rectangular (e.g., square), triangular, elliptical or of any other regular or irregular shape in accordance with the present disclosure. In some embodiments, the frame 150 may further include one or more crossbars or other structural components for enhancing the strength, the rigidity and/or the durability of the frame 150.

The frame 150 may be formed as an integral unit, or from a plurality of modules or sub-modules that may be homogenous in nature, e.g., such that each of the modules or sub-modules has the same size, shape and/or dimensions, or is configured to support bins 142-$n$ of the same size, shape and/or dimensions, or heterogeneous in nature, e.g., such that two or more of the modules or sub-modules may have different sizes, shapes and/or dimensions, or be configured to support two or more bins 142-$n$ having different sizes, shapes and/or dimensions. For example, each of a plurality of sub-modules of the frame 150 may include one or more pairs of the bases 152 and one or more pairs of the risers 154, and be physically coupled to one another, or merely aligned in series with respect to one another. Moreover, the frame 150 may be arranged in a grid or lattice-like structure having bars or framing elements that are coaligned with the frame of the sortation system 135 when the sortation system 135 is inserted into the mobile module 140, as is shown in FIGS. 1A and 1B.

Figure 1E:
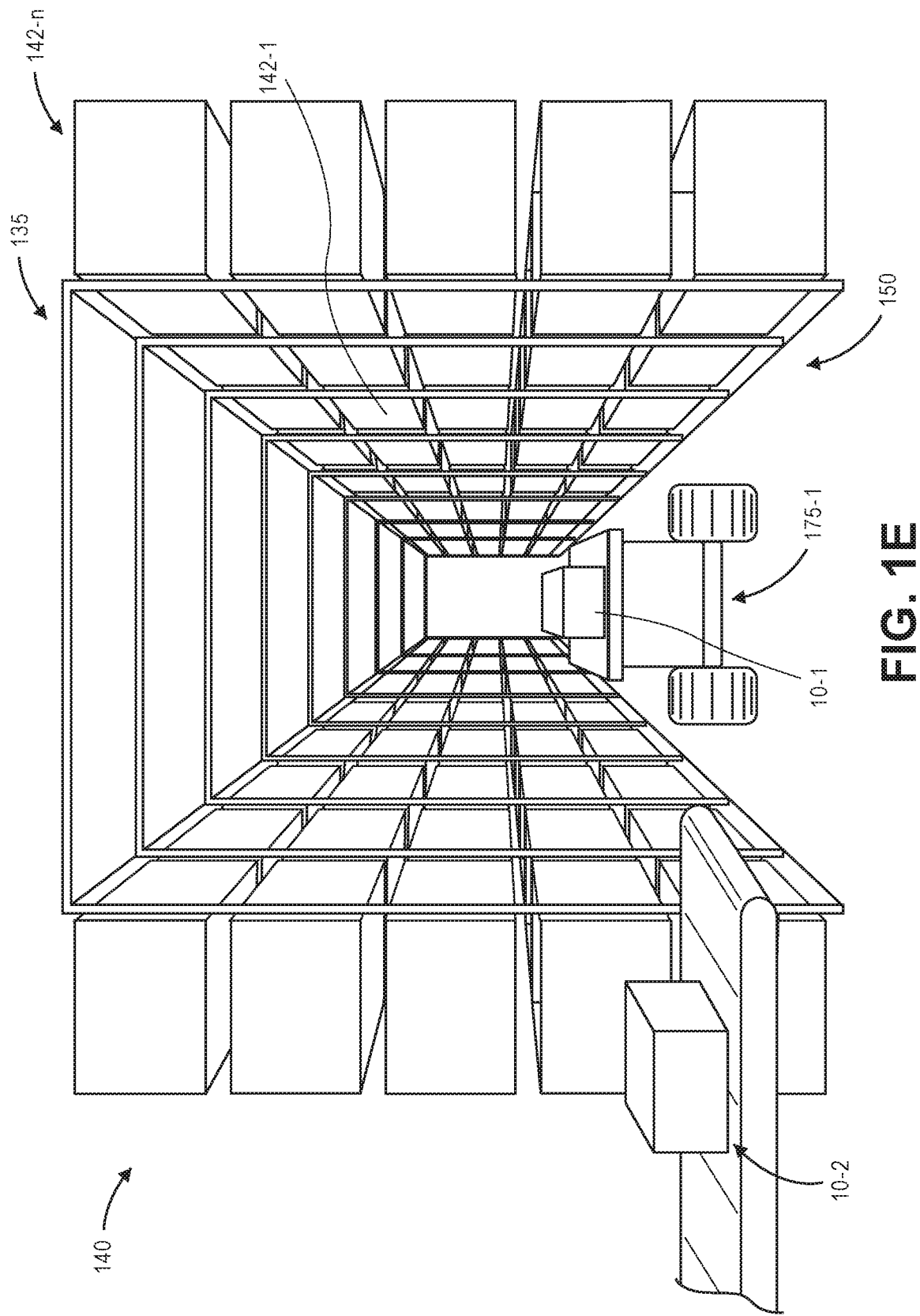

As is shown in FIG. 1E, after the item 10-1 has been delivered to the sortation system 135, an autonomous mobile robot 175-1 may retrieve the item 10-1 from the conveyor 133 and travel along the sortation system 135, within the mobile module 140, before depositing the item 10-1 within a bin 142-1 of the bins 142-n that has been selected to receive the item 10-1. The autonomous mobile robot 175-1 may then return to the conveyor 133 to retrieve the item 10-2 therefrom, and may then travel along the sortation system 135, within the mobile module 140, to deposit the item 10-2 within the one of the bins 142-n that has been selected for the item 10-2. For example, if the item 10-2 and the item 10-1 are each included in a common order, the item 10-2 may also be deposited into the bin 142-1, with the item 10-1. If the item 10-2 and the item 10-1 are not included in a common order, the item 10-2 may be deposited into another of the bins 142-n. Any items that subsequently travel along the conveyor 133 and are subsequently recognized based on data captured by the scanner 137 as being associated with the same orders as the item 10-1 or the item 10-2 may be retrieved by the autonomous mobile robot 175-1 and delivered to one or more of the bins 142-n into which the item 10-1 or the item 10-2 were deposited. Any items that are recognized as being associated with different orders may be assigned to a selected one or more of the bins 142-n, retrieved by the autonomous mobile robot 175-1, and delivered to the selected bins 142-n.

Figure 1F:
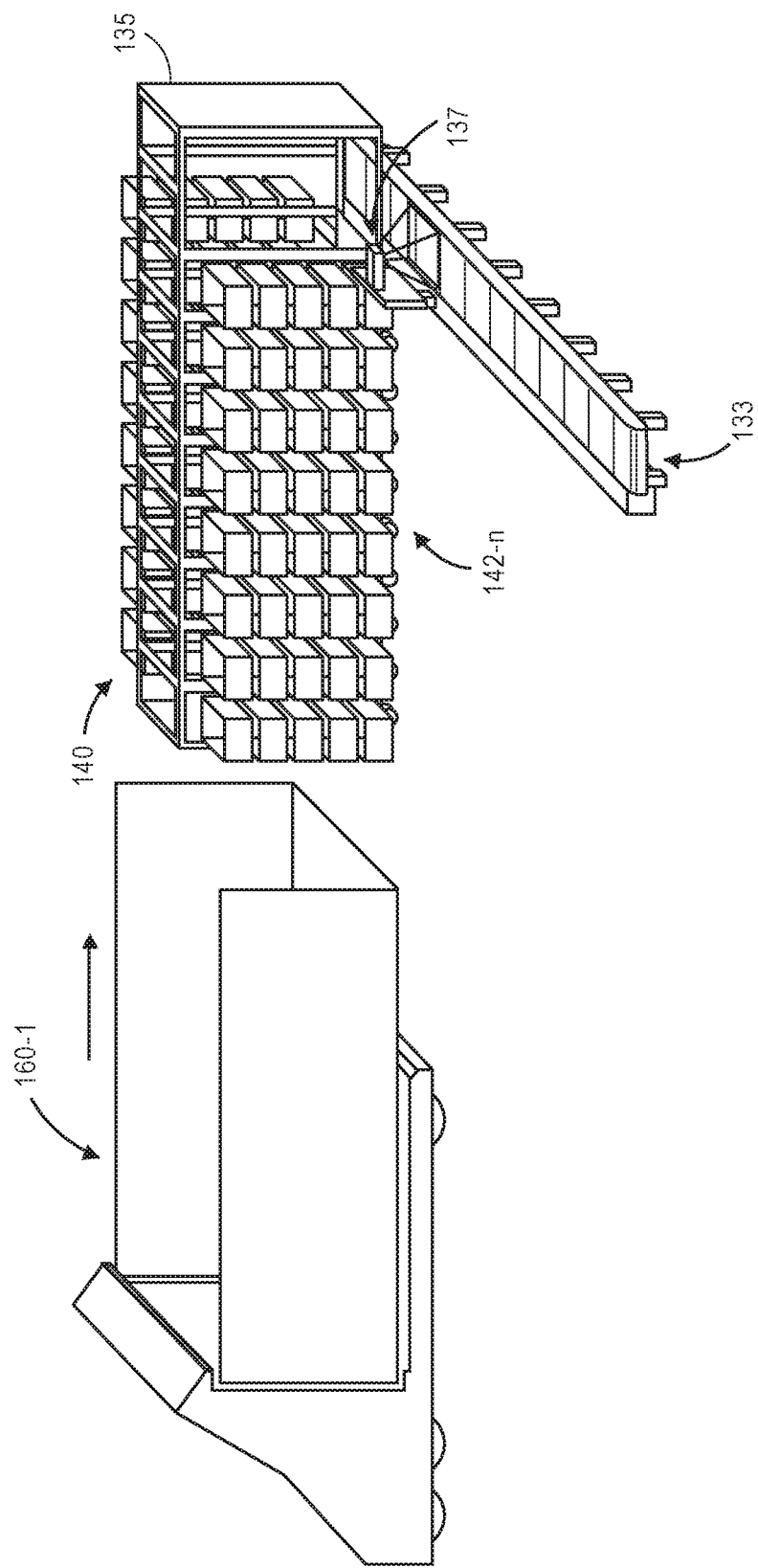

After the bins 142-n of the mobile module 140 have been sufficiently loaded, e.g., completely or partially loaded, with items associated with one or more orders, the mobile module 140 may be removed from the sortation system 135 and transferred to one or more delivery vehicles, which may include but are not limited to cars, trucks, trailers, freight cars, container ships or aircraft (e.g., manned or unmanned aerial vehicles, or drones). As is shown in FIG. 1F, a delivery vehicle 160-1 having one or more motors and a cargo bay for accommodating the mobile module 140 may approach one end of the mobile module 140, in an alignment that enables the delivery vehicle 160-1 to receive the mobile module 140 within the cargo bay. For example, where the cargo bay of the delivery vehicle 160-1 is provided aft of the motor, such as is shown in FIG. 1F, the delivery vehicle 160-1 may approach a free end of the mobile module 140 in reverse, accept the mobile module 140 within the cargo bay, and uncouple the mobile module 140 from the sortation system 135. In some embodiments, the delivery vehicle 160-1 may be an autonomous, unmanned vehicle that is programmed to approach the mobile module 140 and receive the mobile module 140 within the cargo bay. Additionally, the cargo bay of the delivery vehicle 160-1 may have a size and a shape that can receive the mobile module 140 and the associated bins 142-n, as well as one or more features for coupling with the mobile module 140. For example, one or more external surfaces or other aspects of the frame of the mobile module 140 may be outfitted or equipped with one or more fasteners or other features for mating with an interior of the cargo bay.

Figure 1G:
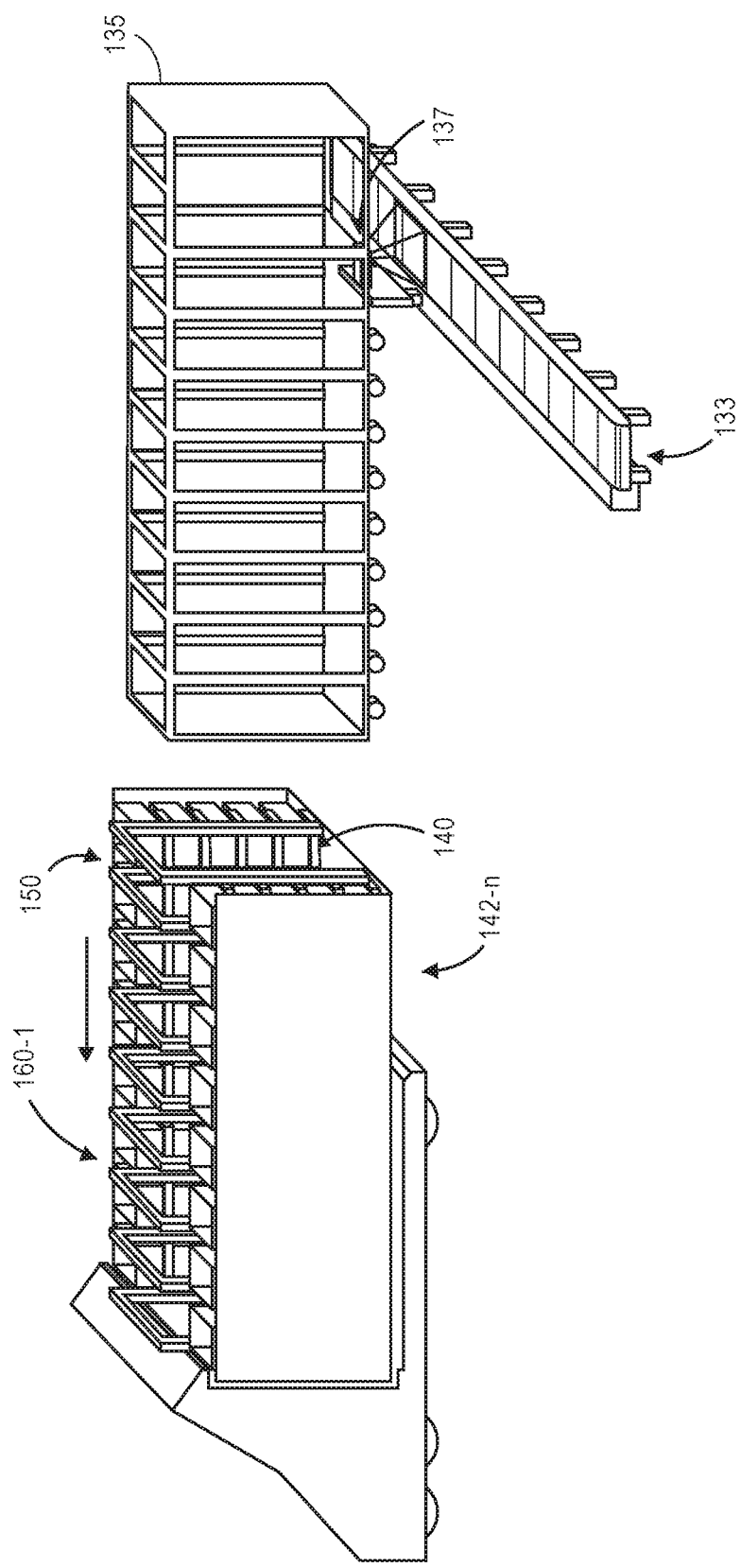

As is shown in FIG. 1G, after the mobile module 140 has been loaded into the cargo bay of the delivery vehicle 160-1, and engaged with the cargo bay, the mobile module 140 may be disengaged from the sortation system 135, e.g., by pulling the delivery vehicle 160-1 forward and away from the sortation system 135, which remains in place. Subsequently, one or more other mobile modules having a plurality of bins or other storage units (not shown) may be coupled to the sortation system 135, and loaded with items by way of the conveyor 133.

Figure 1H:
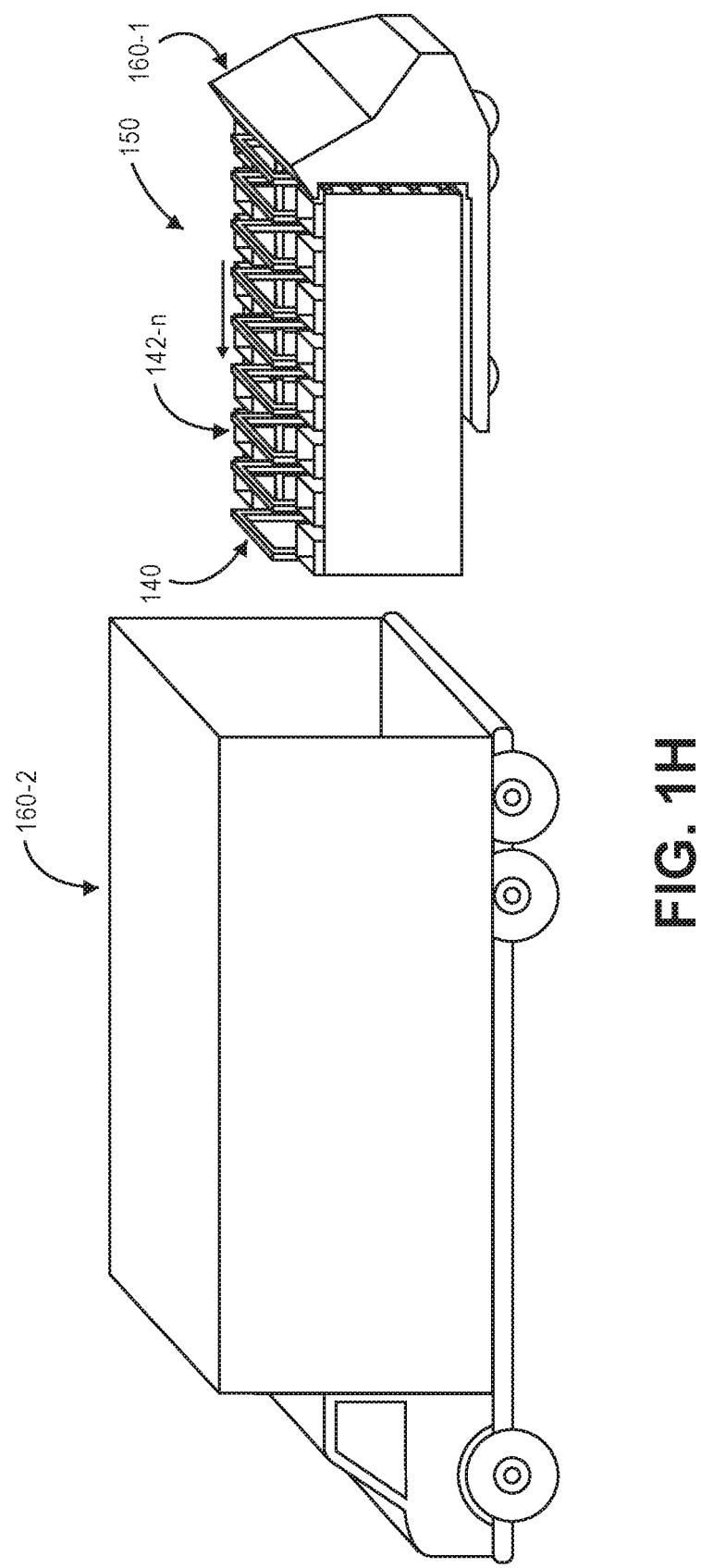
Figure 11:
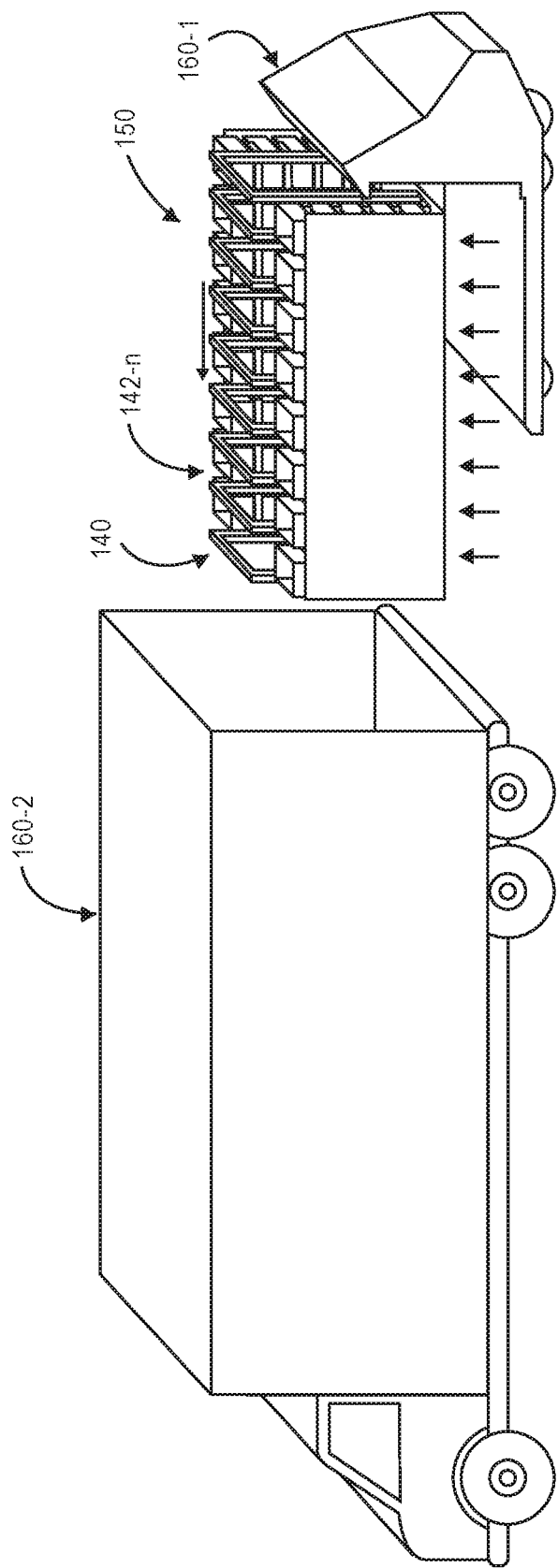
FIGS. 11A through 11C are views of aspects of one system for delivering items using mobile modules in accordance with embodiments of the present disclosure.

As is shown in FIG. 1H, the mobile module 140 may be transferred by the delivery vehicle 160-1 to another delivery vehicle, e.g., a delivery vehicle 160-2. For example, in some embodiments, the delivery vehicle 160-1 may be an industrial powered vehicle such as an automatic forklift that is typically operated in indoor or outdoor environments and for short distances. In some embodiments, the delivery vehicle 160-1 may be configured to retrieve the mobile module 140 and transport the mobile module 140 to another delivery vehicle, viz., one or more cars, trucks, trailers, freight cars, container ships or aircraft (e.g., manned or unmanned aerial vehicles, or drones). For example, as is shown in FIG. 1H, the delivery vehicle 160-2 may be a road vehicle such as a tractor-trailer, van or truck. As is shown in FIG. 1I, the delivery vehicle 160-1 may place the mobile module 140 in a selected alignment or orientation with respect to a cargo bay of the delivery vehicle 160-2, e.g., by elevating the mobile module 140 and operating in reverse to insert the mobile module 140 into the cargo bay of the delivery vehicle 160-2. Like the cargo bay of the delivery vehicle 160-1, the cargo bay of the delivery vehicle 160-2 may have a size and a shape that can receive the mobile module 140 and the associated bins 142-n, as well as one or more features for coupling with the mobile module 140, e.g., one or more fasteners or other features for mating with an interior of the cargo bay. The delivery vehicle 160-1 may then uncouple or disengage from the mobile module 140, e.g., by driving forward and away from the cargo bay of the delivery vehicle 160-2. Alternatively, the delivery vehicle 160-2 may drive forward and away from the cargo bay of the delivery vehicle 160-1, with the mobile module 140 coupled or engaged thereto.

Figure 1K:
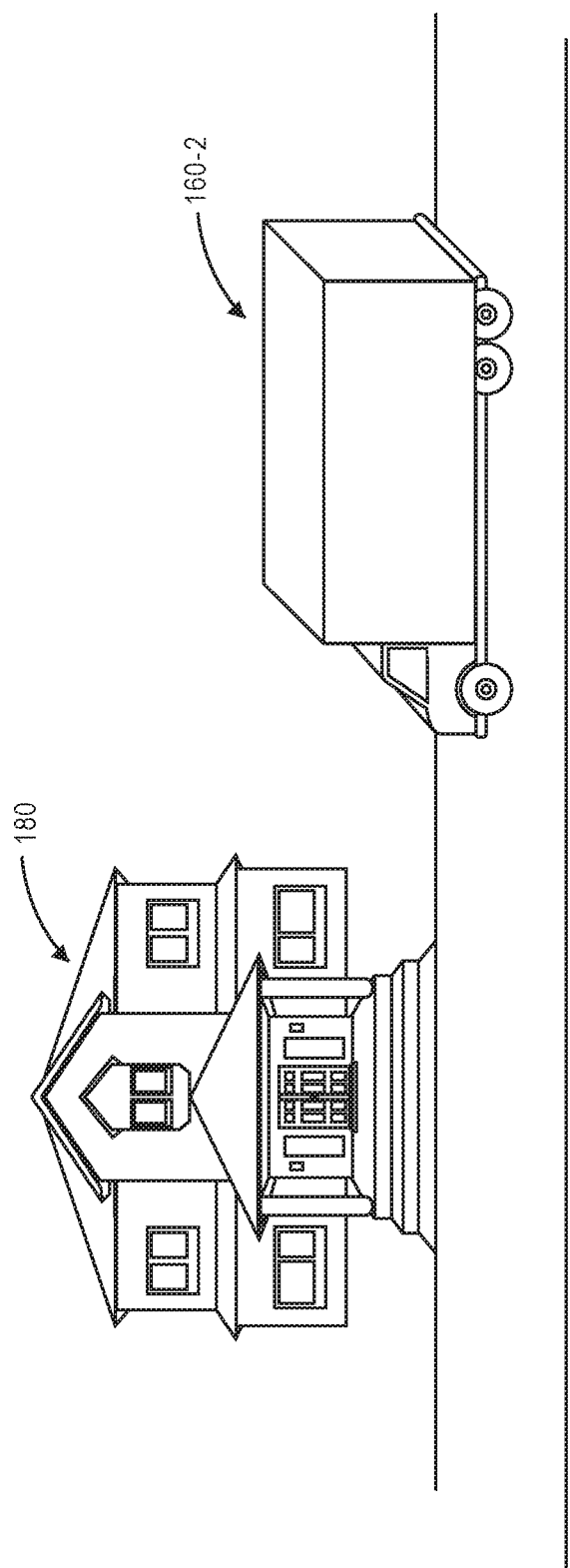

As is shown in FIG. 1J, after the mobile module 140 has been loaded into the cargo bay of the delivery vehicle 160-2, the delivery vehicle 160-2 may then proceed to one or more destinations that are associated with the items in the bins 142-n. For example, as is shown in FIG. 1K, the delivery vehicle 160-2 may travel to a location 180 specified by a customer that placed an order for one or more of the items in the bins 142-n. In some embodiments, the delivery vehicle 160-2 may travel to locations such as the location 180 on an individual basis, e.g., in series, and one or more items may be delivered to destinations specified in orders at each of such locations. In some other embodiments, the delivery vehicle 160-2 may travel to a single location that is proximate to destinations for multiple orders, and one or more items may be delivered from the location to the multiple destinations.

Figure 1L:
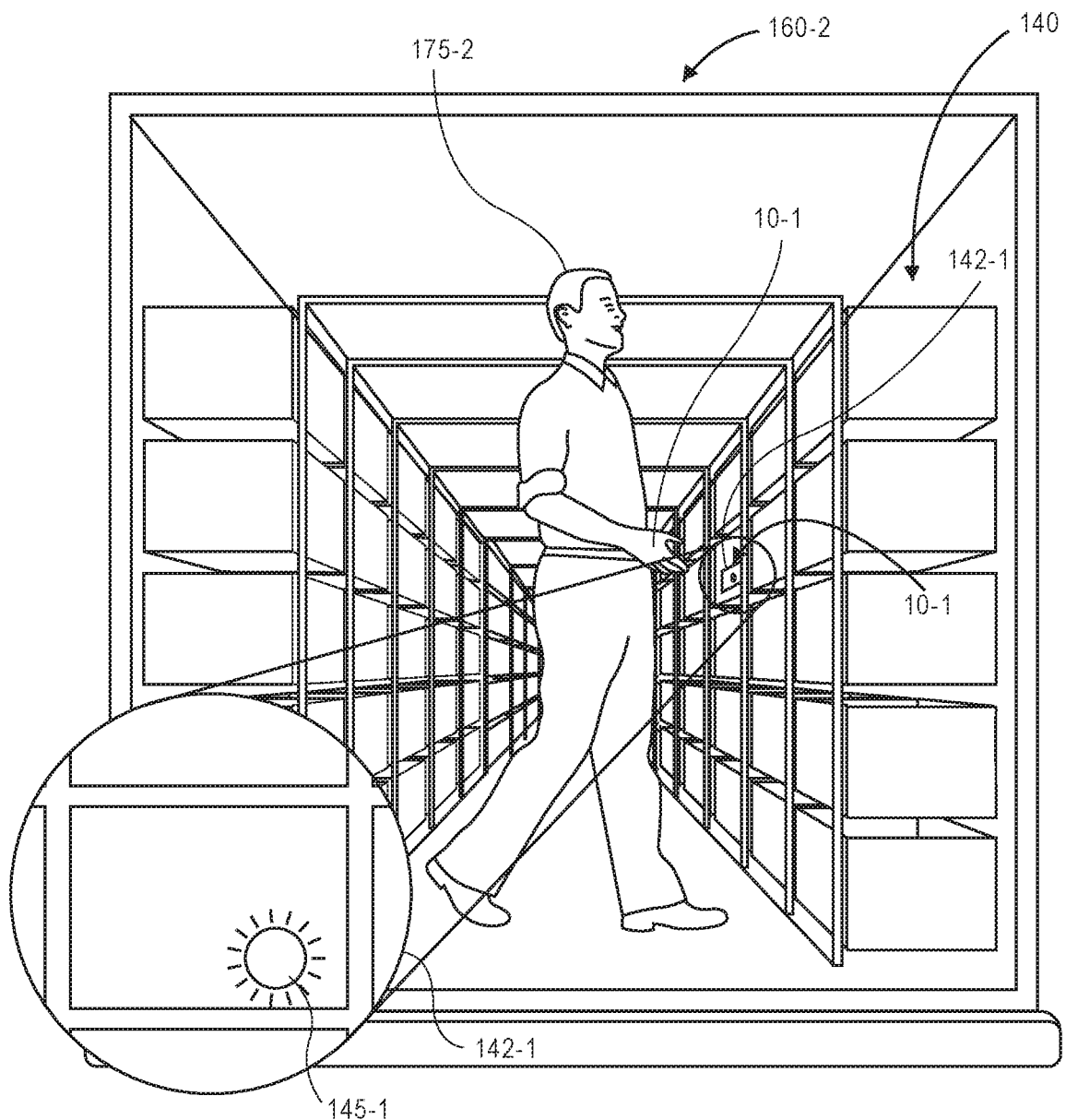

As is shown in FIGS. 1L and 1M, after the delivery vehicle 160-2 has arrived at the location 180, which may be a dwelling, an office building, a garage or another like structure, an associate 175-2 may retrieve one or more items from the bins 142-n, viz., the item 10-1, and transport the items to the location 180. In some embodiments, each of the bins 142-n may include one or more programmable or addressable indicators that may alert an associate or a machine (e.g., an autonomous mobile robot) as to which of the respective bins 142-n includes one or more items that are to be delivered to a given destination.

For example, as is shown in FIG. 1L, the bin 142-1 includes an illuminator 145-1 that is activated upon an arrival of the mobile module 140 at the destination. The illuminator 145-1 may include one or more programmable or addressable lights or lighting elements such as fluorescent bulbs of any size or shape (e.g., compact fluorescent bulbs), incandescent bulbs, light emitting diodes (or "LED"), or the like. For example, where the bin 142-1 is formed from partially or entirely translucent materials, the illuminator 145-1 may include one or more lights or lighting elements that are mounted or otherwise provided within the bin 142-1 in a manner that enables light emitted therefrom to be viewed by associates or machines (e.g., autonomous mobile robots outfitted with one or more visual sensors) from outside the bin 142-1. Alternatively, where the bin 142-1 is formed from partially or substantially opaque materials, the illuminator 145-1 may include one or more lights or lighting elements that are mounted or otherwise provided external to the bin 142-1. The illuminator 145-1 may include any number of individual, programmable or addressable lights or lighting elements that may be provided in groups or concentrations arranged in an array or matrix having any dimension. For example, the illuminator 145-1 may occupy any portion of any visible face or section of the bin 142-1, e.g., a substantially small portion, or an entirety of, one or more faces of the bin 142-1. Where the illuminator 145-1 includes one or more programmable or addressable lights or lighting elements, each of such elements may be operated individually or in groups, in order to emit light at any desired color, wavelength, frequency or intensity. For example, in some embodiments, the illuminator 145-1 may include lights or other lighting elements that are arranged in standard shapes such as circles, squares, triangles or the like, or in shapes of discrete letters, numbers, characters or symbols. In such embodiments, the illuminator 145-1 may be programmed to display one or more of letters, numbers, characters or symbols at various times or for various reasons.

The illuminator 145-1 may be configured for operation, e.g., to emit light, or not to emit light, on any basis or for any reason. In some embodiments, the illuminator 145-1 may emit light in a single color, wavelength, frequency or intensity, or in multiple colors, wavelengths, frequencies or intensities. In some embodiments, the illuminator 145-1 may emit light in a first color (or wavelength, frequency or intensity) when the bin 142-1 includes one or more items, and a second color (or wavelength, frequency or intensity) when the bin 142-1 is empty. The illuminator 145-1 may also emit light in a first color (or wavelength, frequency or intensity) when the delivery vehicle 160-2 is within a predetermined range or vicinity of the location 180, and light in a second color (or wavelength, frequency or intensity) when the delivery vehicle 160-2 is not within the predetermined range or vicinity of the location 180. The illuminator 145-1 may also emit light in any colors, wavelengths, frequencies or intensities, and in any shapes (e.g., letters numbers, characters or symbols), to alert an associate or machine (e.g., an autonomous mobile robot) as to any information regarding any items within the bin 142-1, including one or more identifiers of handling instructions for such items, destinations of such items, conditions of such items, or the like. For example, in some embodiments, the illuminator 145-1 may emit light indicative of an order or sequence in which items within the bin 142-1 are to be delivered.

The illuminator 145-1 may be activated in any number of ways. For example, the illuminator 145-1 may be in communication with one or more computer systems, and may receive one or more analog or digital instructions to illuminate in one or more colors, wavelengths, frequencies or intensities at any given time. In some embodiments, where the delivery vehicle 160-2 and/or the associate 175-2 are outfitted or equipped with one or more position sensors (e.g., a Global Positioning System (or "GPS") receiver, the illuminator 145-1 may also be activated (e.g., turned on) or secured (e.g., turned off) when a position sensor determines that the illuminator 145-1 is within a predetermined range or vicinity of one or more locations, either automatically or upon one or more manual instructions or interactions by the associated 175-2. In some embodiments, the illuminator 145-1 may also be activated or secured as a function of a delivery sequence. For example, where the delivery vehicle 160-2 is intended to deliver items of a plurality of orders to destinations in a selected sequence, the illuminator 145-1 may be activated when items included in an order that precedes the order for the item 10-1 in the sequence is delivered, and secured after the item 10-1 has been delivered to the location 180.

Moreover, any number of the bins 142-*n* may be outfitted with illuminators, such as the illuminator 145-1, and such illuminators may be homogenous or heterogeneous in nature. For example, some of the bins 142-*n* may be outfitted with illuminators that share some or all of the properties or features of the illuminator 145-1, while some of the bins 142-*n* may be outfitted with illuminators having different properties or features, such as a different number of lights or lighting elements that may be configured to emit light in any colors, wavelengths, frequencies or intensities, or in any shapes (e.g., letters numbers, characters or symbols), on any basis or for any reason. Furthermore, in some embodiments, the illuminator 145-1 may also be configured to emit sounds or any other sensory emissions (e.g., odors or haptic feedback) to alert an associate or other machine. For example, the illuminator 145-1 may also include an audio speaker, a haptic feedback device, an RFID transmitter or any other type or form of system for alerting associates or machines. Alternatively, in some other embodiments, the illuminator 145-1 may be replaced by a device configured for such other sensory emissions, and need not be configured to emit light.

After retrieving the item 10-1 from the bin 142-1, the associate 175-2 may deposit the item 10-1 at the location 180, e.g., on a porch or set of stairs, in a portico, on a driveway, or in any other location associated with a destination. For example, the associate 175-2 may retrieve the item 10-1 from the bin 142-1, and deliver the item 10-1 to the location 180 individually or with one or more items (not shown) that are also included in an order for the item 10-1. In some embodiments, the associate 175-2 may transport the item 10-1 and any other items to the location 180 in one or more bags or other carriers (not shown) provided within the delivery vehicle 160-1. Alternatively, in some other embodiments, the associate 175-2 may deliver the entire bin 142-1 to the location 180. Alternatively, the item 10-1 may be delivered to the location 180 by an autonomous mobile robot (not shown), which may automatically retrieve the item 10-1 from the bin 142-1, or may automatically retrieve the bin 142-1 in its entirety, and transport the item 10-1 to the location 180. In some embodiments, either the associate 175-2, or an autonomous mobile robot (not shown) may be granted access to the location 180, and may be permitted to open one or more doors, access ports or other entryways at the location 180 to deposit the item 10-1 therein.

Accordingly, the systems and methods of the present disclosure are directed to mobile modules that may be loaded with items in individual bins or other storage units at a fulfillment center, a warehouse or a like facility, and transported to one or more locations by way of one or more delivery vehicles. The mobile modules may be formed from a plurality of modules or sub-modules that are collectively or individually outfitted with one or more bins, bays, shelves, slots, racks, tiers, bars, hooks, cubbies or other like storage units for receiving items, or containers of such items, from one or more associates or machines, such as autonomous mobile robots. The mobile modules may be configured to mate not only with sortation systems for loading items therein by way of one or more associates or machines but also with one or more delivery vehicles, which may transport the mobile modules to one or more locations and enable the distribution of the items therein to designated locations, e.g., by associates or machines, such as autonomous mobile robots. The mobile modules may further include one or more indicators for alerting such associates or machines as to which of the items is to be retrieved therefrom, or for providing any other information regarding such items to the associates or machines.

Online marketplaces are increasingly popular electronic forums through which customers may place orders for one or more items over the Internet. The growth of online marketplaces, and the rapid expansion in the scope and breadth of their available offerings, has led to a concomitant proliferation of fulfillment centers. Online marketplaces usually use fulfillment centers to allow vendors to maintain inventories of items that are available for sale at the online marketplaces in a centralized location. Typically, upon the receipt of an order for one or more items that are located at the fulfillment center, a list of the items included in the order is provided to a staff member or one or more autonomous mobile robots at the fulfillment center on paper, electronically (e.g., to a handheld computer maintained by the staff member), or in any other format. The staff member or robot must then traverse the floor of the fulfillment center to physically retrieve the items from the spaces, areas or units in which they are stored, and transport the items to a distribution station in preparation for delivery to the customer.

A distribution station at a fulfillment center may serve as a transition zone within which a shipment containing one or more items ordered by a customer that are maintained in a storage area or region of the fulfillment center may be prepared for delivery, and from which the shipment may be delivered to the customer. In this regard, a distribution station may include one or more regions or surfaces that may temporarily accommodate the one or more items that are to be included in a shipment, or in multiple shipments of a batch, until such items may be prepared for delivery. For example, items to be included in a number of shipments may arrive at the distribution station in a first container or vessel, and a worker may sort the items into multiple containers or vessels, each corresponding to the respective shipments. Such regions or surfaces may include one or more shelves, racks, slots or bins, and may be maintained in a fixed structure (e.g., mounted within or onto a wall) or provided in the form of one or more mobile structures (e.g., carts). Because the preparation of outbound shipments of ordered items necessarily involves a number of workers who must transport, deposit, sort, prepare and pack items that are to be included in the orders, the distribution station is a fast-paced environment with remarkably high levels of traffic of both personnel and items which are coming from and departing to countless destinations.

Typically, after ordered items are packed into one or more containers, the containers are loaded from the distribution station into one or more delivery vehicles (e.g., trucks, vans, trailers, aircraft, ships or railway cars) at a loading dock, a loading bay, or another like facility. Such vehicles may be temporarily joined to the loading dock, or provided adjacent to the loading dock, e.g., backed up to the loading dock, for the purpose of loading a plurality of items thereon. The items may be manually carried onto the vehicles, or loaded onto one or more conveyors and transported into the vehicles. For example, an extensible conveyor may be extended into an open vehicle in order to aid in the delivery of the items into a rear of the vehicle, and may be gradually withdrawn as workers remove the items arriving by way of the extensible conveyor and stack the items therein to fill the vehicle.

The amount of energy and the number of interactions that are required in order to manually sort items for delivery at a fulfillment center, or to load items onto a vehicle, may commonly result in delays, errors or discrepancies, and lead to dissatisfaction among a workforce. For example, workers at a distribution station who receive items in a container or vessel and deposit the items at a predetermined location or sort the items into one or more other containers or vessels are often required to bend down, stand up or rotate, and raise or lower items of various sizes, dozens of times per day. Additionally, workers who load items onto a delivery vehicle at a loading dock must occasionally deal with extreme temperatures and adverse environmental or other working conditions, which may lead to incomplete or incorrect deliveries, damaged items or procedural violations, or any number of other unfavorable results.

The systems and methods of the present disclosure are directed to the use of mobile modules for distributing items from fulfillment centers, warehouses or like facilities. The mobile modules may be loaded with items by sortation systems or manually, and physically transported to one or more destinations where the items may be delivered to customers or other recipients. In some embodiments, the mobile modules may be formed from modules or sub-modules that are configured to be coupled with one another, and to sortation systems or delivery vehicles, or aligned in series with respect to one another or such sortation systems or delivery vehicles. The mobile modules may include any type or form of bins, bays, shelves, slots, racks, tiers, bars, hooks, cubbies or other like storage units. A storage unit within a mobile module may be assigned to an order, or to a destination, and items that are included in the order or intended for delivery to the destination may be deposited in or on the storage unit by one or more associates or automated systems. When the mobile module arrives at the destination, the items may be retrieved from the storage unit and transported by one or more associates or automated systems to a selected location at the destination, e.g., an outdoor location such as a porch or set of stairs, a portico, a driveway, or any other location associated with a destination, or an indoor or secure location, if access to the indoor or secure location has been granted. Alternatively, a storage unit may be removed from the mobile module and delivered to the destination.

In some embodiments, the mobile modules may include frames formed from any sufficiently strong and appropriately sized materials, such as wood, plastics (e.g., reinforced plastics such as fiberglass), metals (e.g., forged steel or aluminum) or composites, as well as one or more bins, bays, shelves, slots, racks, tiers, bars, hooks, cubbies or other storage units for receiving the items. The mobile modules or the various modules or sub-modules may further include one or more fastening mechanisms, such as quick-release fastening mechanisms (e.g., ball-and-socket, hook-and-slot, or the like), enabling the modules or sub-modules to be coupled to (or uncoupled from) one another, or for coupling the mobile modules to (or uncoupling the mobile modules from) a sortation system or delivery vehicle, as desired.

In some embodiments, the mobile modules may have sizes, shapes or dimensions that may be selected based on sizes, shapes or dimensions of delivery vehicles into which such mobile modules are to be inserted and transported. For example, in some embodiments, the mobile modules may be sized for insertion into a standard freight trailer, having an interior width of approximately ninety-two to approximately one hundred two inches (92-102 in.), and an interior height of approximately ninety-four to approximately one hundred eight inches (94-108 in.), with varying lengths. In some embodiments, the mobile modules may be sized for insertion into intermodal containers having standard dimensions including widths of approximately ninety-six to one hundred two inches (96-102 in.), heights of approximately ninety-six to one hundred twenty inches (96-120 in.) and lengths of twenty, forty, forty-five, forty-eight or fifty-three feet (20, 40, 45, 48 or 53 ft). Moreover, mobile modules may be stacked or aligned in series, or coupled in any manner. The sizes, shapes or dimensions of the mobile modules of the present disclosure, or the bins, bays, shelves, slots, racks, tiers, bars, hooks, cubbies or other storage units provided thereon, is not limited.

In some embodiments, the mobile modules may be transported from a fulfillment center, a warehouse or a like facility to a destination for one or more items therein by way of any type or form of delivery vehicle. For example, a mobile module may be coupled to and lifted at a distribution station at a fulfillment center by a first delivery vehicle, and transported to a second delivery vehicle, into which the mobile module may be loaded for transportation to one or more destinations.

The systems and methods of the present disclosure are not limited to deliveries of items from fulfillment centers or like facilities to customers or destinations specified by customers. For example, in some embodiments, a mobile module may be used to transport items from various locations to a fulfillment center, e.g., to a receiving station of the fulfillment center, at which the items may be unloaded from the fulfillment center and stored in one or more storage areas or cross-docked for delivery to one or more other destinations. For example, in some embodiments, a mobile module may be manually or automatically loaded with items at one location by one or more associates or machines, e.g., from various manufacturers, merchants, sellers or vendors, or transported to various locations and loaded with items at such locations using associates or machines, before being transported to the fulfillment center. At the fulfillment center, items or storage units may be removed from the mobile modules and transported to one or more storage areas and deposited there.

Figure 2A:
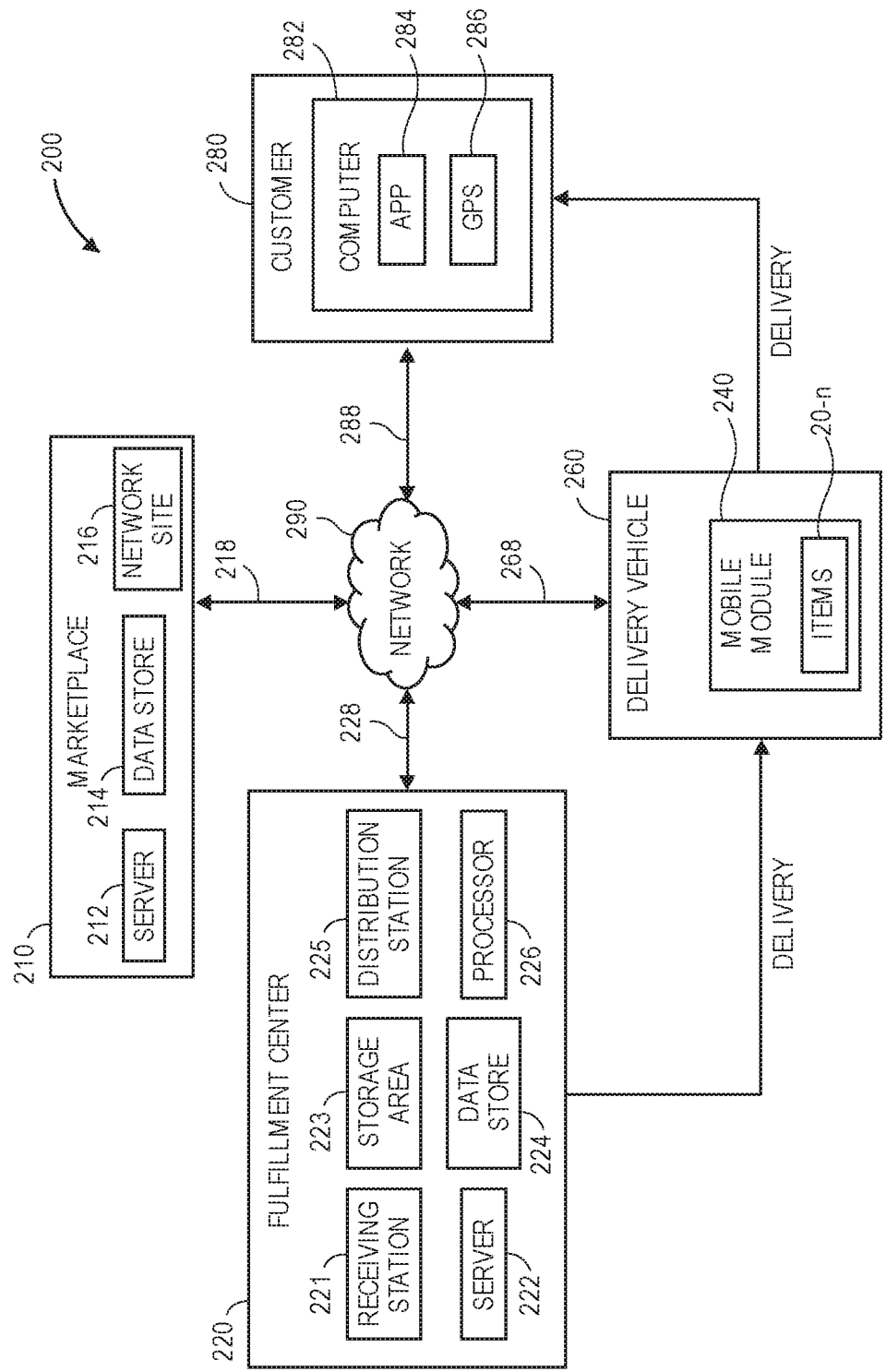
FIGS. 2A and 2B are block diagrams of components of one system for delivering items using mobile modules in accordance with embodiments of the present disclosure.
Figure 2B:
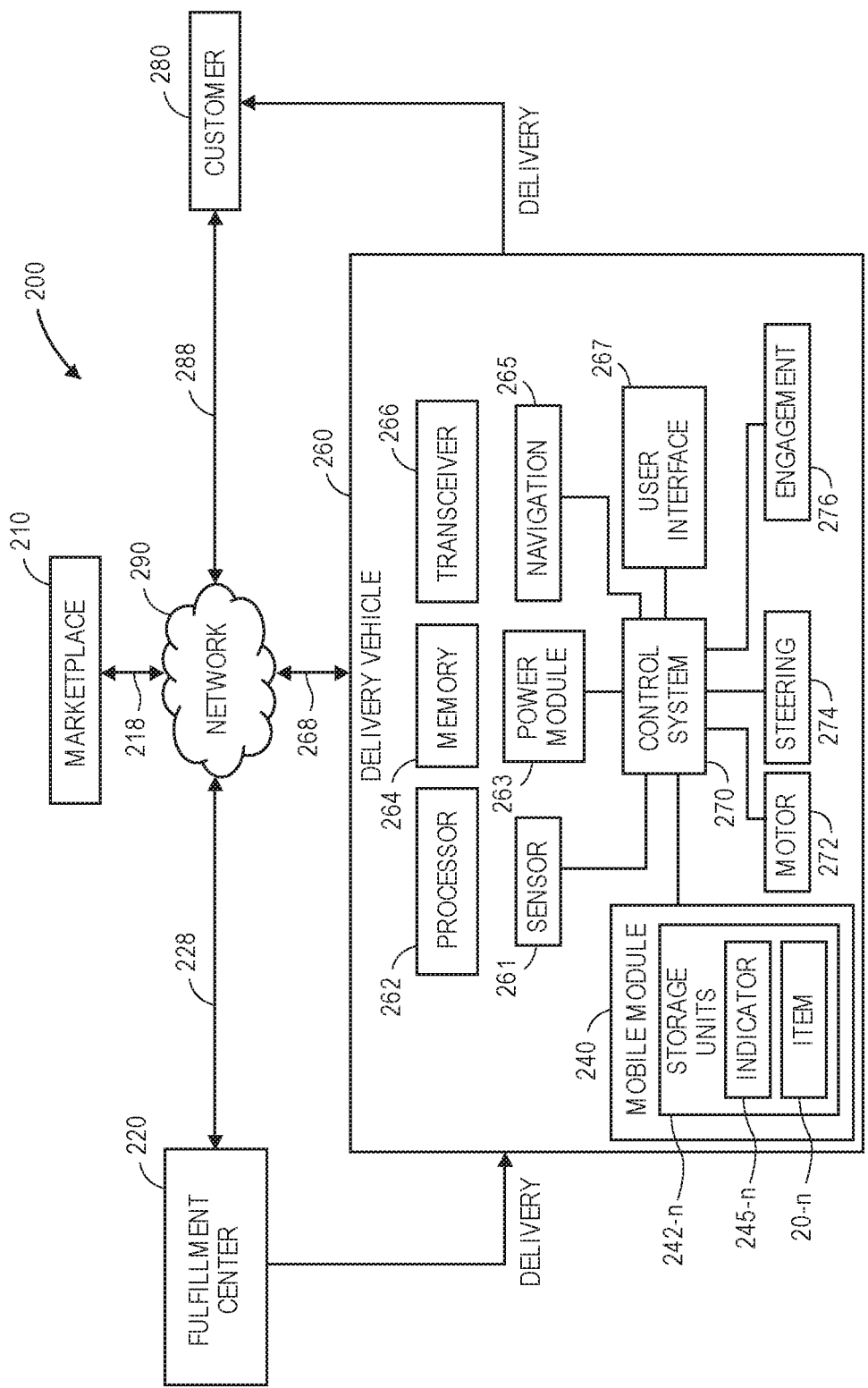

Referring to FIGS. 2A and 2B, block diagrams of components of one system for delivering items using mobile modules in accordance with embodiments of the present disclosure are shown. Except where otherwise noted, reference numerals preceded by the number "2" in FIG. 2A or FIG. 2B refer to elements that are similar to elements having reference numerals preceded by the number "1" shown in FIGS. 1A through 1M.

The system 200 includes a marketplace 210, a fulfillment center 220, a mobile module 240, a delivery vehicle 260 and a customer 280 that are connected to one another across a network 290, which may include the Internet in whole or in part.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 220. The network site 216 may be implemented using the one or more servers 212, which connect or otherwise communicate with the one or more data stores 214 as well as the network 290, as indicated by line 218, through the sending and receiving of digital data. Moreover, the data store 214 may include any type of information stored thereon regarding items that have been made available for sale through the marketplace 210, or ordered by customers, such as the customer 280, from the marketplace 210, or any information or data regarding the delivery of such items to the customers, e.g., by the mobile module 240 and one or more delivery vehicles 260.

The fulfillment center 220 may be any facility that is adapted to receive, store, process and/or distribute items. As is shown in FIG. 2A, the fulfillment center 220 includes a networked computer infrastructure, including one or more physical computer servers 222, one or more data stores 224, and one or more computer processors 226. The fulfillment center 220 also includes stations for receiving, storing and distributing items to customers, including but not limited to a receiving station 221, a storage area 223 and a distribution station 225.

The server 222 and/or the processor 226 may operate one or more order processing and/or communication systems and/or software applications having one or more user interfaces, or communicate with one or more other computing devices or machines that may be connected to the network 290, as indicated by line 228, for transmitting or receiving information in the form of digital or analog data, or for any other purpose. For example, the server 222 and/or the processor 226 may also operate or provide access to one or more reporting systems for receiving or displaying information or data regarding orders for items received by the marketplace 210, e.g., from the customer 280, or deliveries made from the mobile module 240 by one or more of the delivery vehicle 260, e.g., to the customer 280, and may provide one or more interfaces for receiving interactions (e.g., text, numeric entries or selections) from one or more operators, users, workers or other persons in response to such information or data. The server 222, the data store 224 and/or the processor 226 may be components of a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 222 and/or the processor 226 may be configured to assign bins (or bays, shelves, slots, racks, tiers, bars, hooks, cubbies or other like storage facilities or units) within the mobile module 240 to one or more orders, and generate one or more instructions for causing items included in such orders to be transferred into such bins. The server 222 and/or the processor 226 may also be configured to determine an optimal path or route between two locations for the execution of a given mission or task to be executed by the delivery vehicle 260 on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 222 and/or the processor 226 may be configured to control or direct, or to recommend or suggest, collaboration between or among two or more delivery vehicles 260 in the performance of one or more tasks or in the execution of one or more functions. For example, the server 222 and/or the processor 226 may be configured to identify levels of inventory distributed among one or more of the delivery vehicles 260, or aboard other vehicles or in other locations, and to identify an optimal path to be traveled in order to obtain each of the items included in an order and to deliver such items to a customer or other destination. Additionally, the server 222 and/or the processor 226 may determine which of the delivery vehicles 260 is appropriately equipped to perform specific steps of a delivery process, based on any amounts or types of items or materials that may be available nearby, proximity to one or more other delivery vehicles 260, or a given destination or other location, or on any other relevant factor or basis. The server 222 and/or the processor 226 may identify appropriate locations or rendezvous points where one or more associates, vehicles or other machines may meet in order to transfer items therebetween, or for any other purpose.

The receiving station 221 may include any apparatuses that may be required in order to receive shipments of items at the fulfillment center 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned or unmanned aircraft, such as drones), as well as one or more of the mobile module 240 and/or the delivery vehicle 260, and preparing such items for storage or distribution to customers. The storage area 223 may include one or more predefined two-dimensional or three-dimensional spaces for accommodating items and/or containers of such items, such as aisles, rows, bins, bays, shelves, slots, racks, tiers, bars, hooks, cubbies or other like storage means, or any other appropriate regions or stations. The distribution station 225 may include one or more regions or stations where items that have been retrieved from a designated storage area may be evaluated, prepared and packed for delivery from the fulfillment center 220 to locations or destinations specified by customers, e.g., by way of the mobile module 240 and one or more of the delivery vehicles 260, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at the receiving station 221 may be processed, and the items placed into storage within the storage areas 223 or, alternatively, transferred directly to the distribution station 225, or "cross-docked," for prompt delivery to one or more customers.

The fulfillment center 220 may further include one or more control systems that may generate instructions for conducting operations at one or more of the receiving station 221, the storage area 223 or the distribution station 225. Such control systems may be associated with the server 222, the data store 224 and/or the processor 226, or with one or more other computing devices or machines, and may communicate with the receiving station 221, the storage area 223 or the distribution station 225 within the fulfillment center 220 by any known wired or wireless means, or with the marketplace 210, the customer 280 or one or more of the delivery vehicles 260 over the network 290, as indicated by line 228, through the sending and receiving of digital data.

Additionally, the fulfillment center 220 may include one or more systems or devices (not shown in FIG. 2A or FIG. 2B) for determining locations of one or more elements therein, such as cameras or other image recording devices. Furthermore, the fulfillment center 220 may also include one or more workers or staff members (not shown in FIG. 2A or FIG. 2B), who may handle or transport items within the fulfillment center 220. Such workers may operate one or more computing devices or machines for registering the receipt, retrieval, transportation or storage of items within the fulfillment center, or a general-purpose device such as a personal digital assistant, a digital media player, a smartphone, a tablet computer, a desktop computer or a laptop computer, and may include any form of input and/or output peripherals such as scanners, readers, keyboards, keypads, touchscreens or like devices.

The mobile module 240 may be any system, such as the mobile module 140 of FIGS. 1A through 1M, that is configured to receive one or more items 20-n, e.g., for temporary storage and/or distribution therefrom. As is shown in FIG. 2B, the mobile module 240 includes a plurality of storage units 242-n, each having one or more indicators 245-n and configured to store, contain or support one or more items 20-n within the mobile module 240.

The storage units 242-n may be one or more bins, bays, shelves, slots, racks, tiers, bars, hooks, cubbies or other like storage facilities for receiving the items 20-n, or containers of such items 20-n, from one or more associates or machines, such as autonomous mobile robots. As is discussed above, the storage units 242-n may be homogenous or heterogeneous in nature.

Additionally, each of the indicators 245-n may be any type or form of system or device for providing an indication to an associate or a machine, typically regarding contents of a respective one of the storage units 242-n. For example, one or more of the indicators 245-n may include programmable or addressable lights or lighting elements such as fluorescent bulbs of any size or shape (e.g., compact fluorescent bulbs), incandescent bulbs, light emitting diodes (or "LED"), or the like, as well as one or more audio speakers, haptic feedback units, or any other system or device. The indicators 245-n may be activated (e.g., turned on) or secured (e.g., turned off) manually or automatically in response to signals generated by one or more computer systems, including but not limited to the processor 262, the control system 270, or any type or form of computer system associated with the delivery vehicle 260 or one or more occupants thereof, e.g., a handheld device or dashboard-mounted system. Such indicators 245-n may be activated or secured on any basis or for any purpose in accordance with the present disclosure.

In some embodiments, the mobile module 240 may be formed from a plurality of modules or sub-modules that may be coupled to one another by one or more fasteners (e.g., bolts or other like means), including but not limited to one or more quick-release fasteners, such as ball-and-socket fasteners, hook-and-slot fasteners, or the like. One or more of the modules or sub-modules of the mobile module 240 may be formed from any sufficiently strong and appropriately sized materials, such as wood, plastics (e.g., reinforced plastics such as fiberglass), metals (e.g., forged steel or aluminum) or composites. The mobile module 240 may include one or more bins, bays, shelves, slots, racks, tiers, bars, hooks, cubbies or other like storage facilities for receiving the items 20-n, or containers of such items 20-n, from one or more associates or machines, such as autonomous mobile robots.

The delivery vehicle 260 may be any type or form of self-powered vehicle capable of being programmed or otherwise configured for travel between two points of along one or more paths or routes, in furtherance of the performance of one or more missions or tasks, such as the delivery of an item from the fulfillment center 220 to the customer 280 by way of the mobile module 240, based on one or more computer instructions. For example, one or more of the delivery vehicles 260 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths or routes may, in some embodiments, include one or more common locations or rendezvous points where an item or materials may be transferred between or among the delivery vehicles 260, or one or more associates, machines or other vehicles. Likewise, one or more of the delivery vehicles 260 may be configured to determine whether an item may be manufactured or produced thereby, either using stock materials carried thereon, or any items, waste products generated by such items, or remnants or scraps of such items that may be located nearby, independently or in concert with one or more other delivery vehicles 260.

In some embodiments, the delivery vehicle 260 may be configured to distribute, or forward-deploy, inventory from the fulfillment center 220 to regions where demand for items is known, observed or predicted, in anticipation of one or more orders for such items, and to fulfill such orders, by way of the mobile module 240. The delivery vehicle 260 may be configured to transport items from the fulfillment center 220 to such regions autonomously, or by any other means, by way of the mobile module 240. In some other embodiments, the delivery vehicles 260 may be configured to return to the fulfillment center 220 after fulfilling orders for some or all of the items carried thereby, e.g., by traveling to the fulfillment center 220 autonomously, or by any other means. For example, the delivery vehicle 260 may be configured to receive the mobile module 240 from the fulfillment center 220 or another like facility or location, to transfer the mobile module 240 to another delivery vehicle 260, to deposit the mobile module 240 at a selected location, or to return the mobile module 240 to the fulfillment center 220.

As is shown in FIGS. 2A and 2B, the delivery vehicle 260 may include one or more computer components such as a processor 262, a memory component 264 and a transceiver 266 in communication with one or more other computer devices that may be connected to the network 290, as indicated by line 268, in order to transmit or receive information in the form of digital or analog data, or for any other purpose. For example, the delivery vehicle 260 may receive instructions or other information or data via the transceiver 266 regarding contents of the mobile module 240, viz., the one or more items 20-$n$, as well as items that are to be delivered from the fulfillment center 220 to the customer 280 via one or more paths or routes from the marketplace server 212, the fulfillment center server 222 and/or the customer computing device 282, or from any other computing device over the network 290. Additionally, the delivery vehicle 260 may further provide one or more instructions or other information or data regarding the items 20-$n$ to one or more of the indicators 245-$n$, thereby causing the respective indicators 245-$n$ to be activated or secured based on such instructions, information or data. For example, upon determining that the delivery vehicle 260 is within a predetermined range or vicinity of a location, the delivery vehicle 260 may provide one or more instructions to the indicators 245-$n$ associated with storage units 242-$n$ having items stored therein or thereon that are intended for delivery to the location. In response to such instructions, the respective indicators 245-$n$ may be activated, e.g., caused to be illuminated or to generate other feedback, in order to alert any associates or machines as to the storage units 242-$n$ having such items therein or thereon. One or more of the indicators 245-$n$ may be activated or secured on any basis or for any reason in accordance with the present disclosure.

The transceiver 266 may be configured to enable the delivery vehicle 260 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 266 may further include or be in communication with one or more input/output (or "I/O") interfaces, network interfaces and/or input/output devices, and may be configured to allow information or data to be exchanged between one or more of the components of the delivery vehicle 260, or to one or more other computer devices or systems (e.g., other aerial vehicles, not shown) via the network 290. For example, in some embodiments, the transceiver 266 may be configured to coordinate I/O traffic between the processor 262 and one or more onboard or external computer devices or components. The transceiver 266 may perform any necessary protocol, timing or other data transformations in order to convert data signals from a first format suitable for use by one component into a second format suitable for use by another component. In some embodiments, the transceiver 266 may include support for devices attached through various types of peripheral buses, e.g., variants of the Peripheral Component Interconnect (PCI) bus standard or the Universal Serial Bus (USB) standard. In some other embodiments, functions of the transceiver 266 may be split into two or more separate components, or incorporated directly into the processor 262.

As is shown in FIG. 2B, the delivery vehicle 260 includes one or more control systems 270 as well as one or more sensors 261, one or more power modules 263, one or more navigation modules 265, and one or more user interfaces 267. Additionally, the delivery vehicle 260 further includes one or more motors 272, one or more steering systems 274 and one or more item engagement systems (or devices) 276.

The control system 270 may include one or more software applications or hardware components configured for controlling or monitoring operations of one or more components such as the sensor 261, the power module 263, the navigation module 265, or the user interfaces 267, as well as the motors 272, the steering systems 274 and the item engagement systems 276, e.g., by receiving, generating, storing and/or transmitting one or more computer instructions to such components. The control system 270 may communicate with the marketplace 210, the fulfillment center 220 and/or the customer 280 over the network 290, as indicated by line 268, through the sending and receiving of digital data.

The sensor 261 may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data, of the delivery vehicle 260. Geolocations of the sensor 261 may be associated with the delivery vehicle 260, where appropriate.

The sensor 261 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the delivery vehicle 260, or for any other purpose. For example, the sensor 261 may be configured to capture or detect reflected light if the reflected light is within a field of view of the sensor 261, which is defined as a function of a distance between an imaging sensor and a lens within the sensor 261, viz., a focal length, as well as a location of the sensor 261 and an angular orientation of the lens. Accordingly, where an object appears within a depth of field, or a distance within the field of view where the clarity and focus is sufficiently sharp, the sensor 261 may capture light that is reflected off objects of any kind to a sufficiently high degree of resolution using one or more sensors thereof, and store information regarding the reflected light in one or more data files.

The sensor 261 may also include manual or automatic features for modifying a field of view or orientation. For example, the sensor 261 may be a digital camera configured in a fixed position, or with a fixed focal length (e.g., fixed-focus lenses) or angular orientation. Alternatively, the sensor 261 may include one or more actuated or motorized features for adjusting a position of the sensor 261, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 261, or a change in one or more of the angles defining the angular orientation of the sensor 261.

For example, the sensor 261 may be an imaging device that is hard-mounted to a support or mounting that maintains the imaging device in a fixed configuration or angle with respect to one, two or three axes. Alternatively, however, the sensor 261 may be provided with one or more motors and/or controllers for manually or automatically operating one or more of the components, or for reorienting the axis or direction of the sensor 261, i.e., by panning or tilting the sensor 261. Panning the sensor 261 may cause a rotation within a horizontal plane or about a vertical axis (e.g., a yaw), while tilting the sensor 261 may cause a rotation within a vertical plane or about a horizontal axis (e.g., a pitch). Additionally, the sensor 261 may be rolled, or rotated about its axis of rotation, and within a plane that is perpendicular to the axis of rotation and substantially parallel to a field of view of the sensor 261.

Imaging data (e.g., still or moving images, as well as associated audio data or metadata) captured using the sensor 261 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 261 may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 261 may also be an item identification sensor and may include a bar code scanner, a radiofrequency identification (or RFID) reader, or other technology that is utilized to determine an identification of an item that is being retrieved or deposited, or has been retrieved or deposited, by the delivery vehicle 260. In some embodiments, the sensor 261 may be provided within a cargo bay or other storage component of the delivery vehicle 260, such as a presence detection sensor and/or a motion sensor for detecting the presence or absence of one or more objects within the cargo bay or storage compartment, or movement of objects therein. For example, data captured using the sensor 261 may be utilized to aid in loading or unloading the mobile module 240 onto the delivery vehicle 260, identifying one or more bins having the items 20-$n$ therein, or in any other manner.

The power module 263 may be any type of power source for providing electrical power, mechanical power or other forms of power in support of one or more electrical or mechanical loads aboard the delivery vehicle 260. In some embodiments, the power module 263 may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 263 may each have any cell voltages, peak load currents, charge times, specific energies, internal resistances or cycle lives, or other power ratings. The power module 263 may also be any type, size or form of other power source, e.g., other than a battery, including but not limited to one or more fuel cells, turbines, solar cells or nuclear reactors. Alternatively, the power module 263 may be another form of prime mover (e.g., electric, gasoline-powered or any other type of motor) capable of generating sufficient mechanical forces for the delivery vehicle 260.

The navigation module 265 may include one or more software applications or hardware components including or having access to information or data regarding aspects of transportation systems within a given region, including the locations, dimensions, capacities, conditions, statuses or other attributes of various paths or routes in the region. For example, the navigation module 265 may receive inputs from the sensor 261, e.g., from a GPS receiver, an imaging device or another sensor, as well as information regarding a destination for one or more items, e.g., from the marketplace 210 and/or the customer 280, and determine an optimal direction and/or an optimal speed of the delivery vehicle 260 for travelling on a given path or route based on such inputs. The navigation module 265 may select a path or route to be traveled upon by the delivery vehicle 260, and may provide information or data regarding the selected path or route to the control system 270.

The user interface 267 may be configured to receive and provide information to associate users of the delivery vehicle 260 and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the delivery vehicle 260 and an associate user. In various embodiments, the user interface 267 may include a variety of different features. For example, in one embodiment, the user interface 267 may include a relatively small display and/or a keypad for receiving inputs from associate users. In other embodiments, inputs for controlling the operation of the delivery vehicle 260 may be provided remotely. For example, in order to access a storage compartment, an associate user may send a text message to or reply to a text message from the control system 270 and request that a door or other access portal be opened in order to enable the user to access an item therein. In various implementations, the delivery vehicle 260 may have capabilities for directly receiving such signals from a user device or other device (e.g., a device inside a user's residence) that provides a signal to open the storage compartment door.

The motor 272 may be any type or form of motor or engine (e.g., electric, gasoline-powered or any other type of motor) that is capable of providing sufficient rotational forces to one or more axles, shafts and/or wheels for causing the delivery vehicle 260 and any items therein to travel in a desired direction and at a desired speed. In some embodiments, the delivery vehicle 260 may include one or more electric motors having any number of stators, poles and/or windings, such as an outrunner or an inrunner brushless direct current (DC) motor, or any other motors, having any speed rating, power rating or any other rating.

The steering system 274 may be any system for controlling a direction of travel of the delivery vehicle 260. The steering system 274 may include any number of automatically operable gears (e.g., racks and pinions), gear boxes, shafts, shaft assemblies, joints, servos, hydraulic cylinders, linkages or other features for repositioning one or more wheels to cause the delivery vehicle 260 to travel in a desired direction.

The engagement system 276 may be any mechanical component, e.g., a robotic arm, for engaging the mobile module 240 and/or one or more of the items 20-*n* therein, as desired. For example, when the mobile module 240 is to be loaded onto a delivery vehicle 260, the engagement system 276 may be used to engage with one or more aspects of the mobile module 240, including one or more entryways, guide tracks, fastening systems, coupling systems or other aspects of the mobile module 240. When the delivery vehicle 260 is tasked with delivering items or materials from an origin to a destination, the engagement system 276 may be used to engage with the items or materials at the origin and to deposit the items or materials in a cargo bay or other storage compartment prior to departing. After the delivery vehicle 260 arrives at the destination, the engagement system 276 may be used to retrieve the items or materials within the cargo bay or storage compartment, and deposit the items or materials in a desired location at the destination.

In some embodiments, the delivery vehicles 260 may be programmed or configured to perform one or more missions or tasks in an integrated manner. For example, the control system 270 may be programmed to instruct the delivery vehicles 260 to travel to an origin, e.g., the fulfillment center 220, and to begin the performance of a task there, such as by retrieving the mobile module 240 via the engagement system 276, before proceeding to a destination, e.g., the customer 280, along a selected route (e.g., an optimal route). Along the way, the control system 270 may cause the motor 272 to operate at any predetermined speed and cause the steering system 274 to orient the delivery vehicles 260 in a predetermined direction or otherwise as necessary to travel along the selected route, e.g., based on information or data received from or stored in the navigation module 265. The control system 270 may further cause the sensor 261 to capture information or data (including but not limited to imaging data) regarding the delivery vehicles 260 and/or its surroundings along the selected route. The control system 270 or one or more other components of the delivery vehicles 260 may be programmed or configured as necessary in order to execute any actions associated with a given task, in accordance with the present disclosure.

Any combination of networks or communications protocols may be utilized in accordance with the systems and methods of the present disclosure. For example, each of the delivery vehicles 260 may be configured to communicate with one another or with the marketplace server 212, the fulfillment center server 222 and/or the customer computer 282 via the network 290, such as is shown in FIGS. 2A and 2B, e.g., via an open or standard protocol such as Wi-Fi. Alternatively, each of the delivery vehicles 260 may be configured to communicate with one another directly outside of a centralized network, such as the network 290, e.g., by a wireless protocol such as Bluetooth, in which two or more of the delivery vehicles 260 may be paired with one another.

The customer 280 may be any entity or individual that wishes to download, purchase, rent, lease, borrow or otherwise obtain items (which may include goods, products, services or information of any type or form) from the marketplace 210, e.g., for delivery by the mobile module 240 via one or more of the delivery vehicles 260. The customer 280 may utilize one or more computing devices 282 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 284, such as a web browser or a shopping application, and may be connected to or otherwise communicate with the marketplace 210, the fulfillment center 220 or the delivery vehicles 260 through the network 290, as indicated by line 288, by the transmission and receipt of digital data. The computing devices 282 may further include a GPS receiver 286, or any other position sensors (e.g., cellular transceivers configured to triangulate positions based on signals received from multiple cellular transmitters) for determining a position of the computing device 282, which may be associated with the customer 280.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," or a "delivery vehicle," or like terms, may be automated steps performed by their respective computer systems, or implemented within software modules (or computer programs) executed by one or more general purpose computers. Moreover, process steps described as being performed by a "marketplace," a "fulfillment center" a "customer," or a "delivery vehicle," may be typically performed by an associate operator, but could, alternatively, be performed by an automated agent.

The marketplace 210, the fulfillment center 220, the delivery vehicle 260, or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the fulfillment center 220 and/or the server 222 may be adapted to transmit information or data in the form of synchronous or asynchronous messages to the marketplace 210, the delivery vehicle 260, the customer computing device 282, or any other computer device in real time or in near-real time, or in one or more offline processes, via the network 290. Those of ordinary skill in the pertinent art would recognize that the marketplace 210, the fulfillment center 220, the delivery vehicle 260, the customer computing device 282 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 222, the processors 262, the computing devices 282 or any other computers or control systems utilized by the marketplace 210, the fulfillment center 220, the delivery vehicle 260 or the customer 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
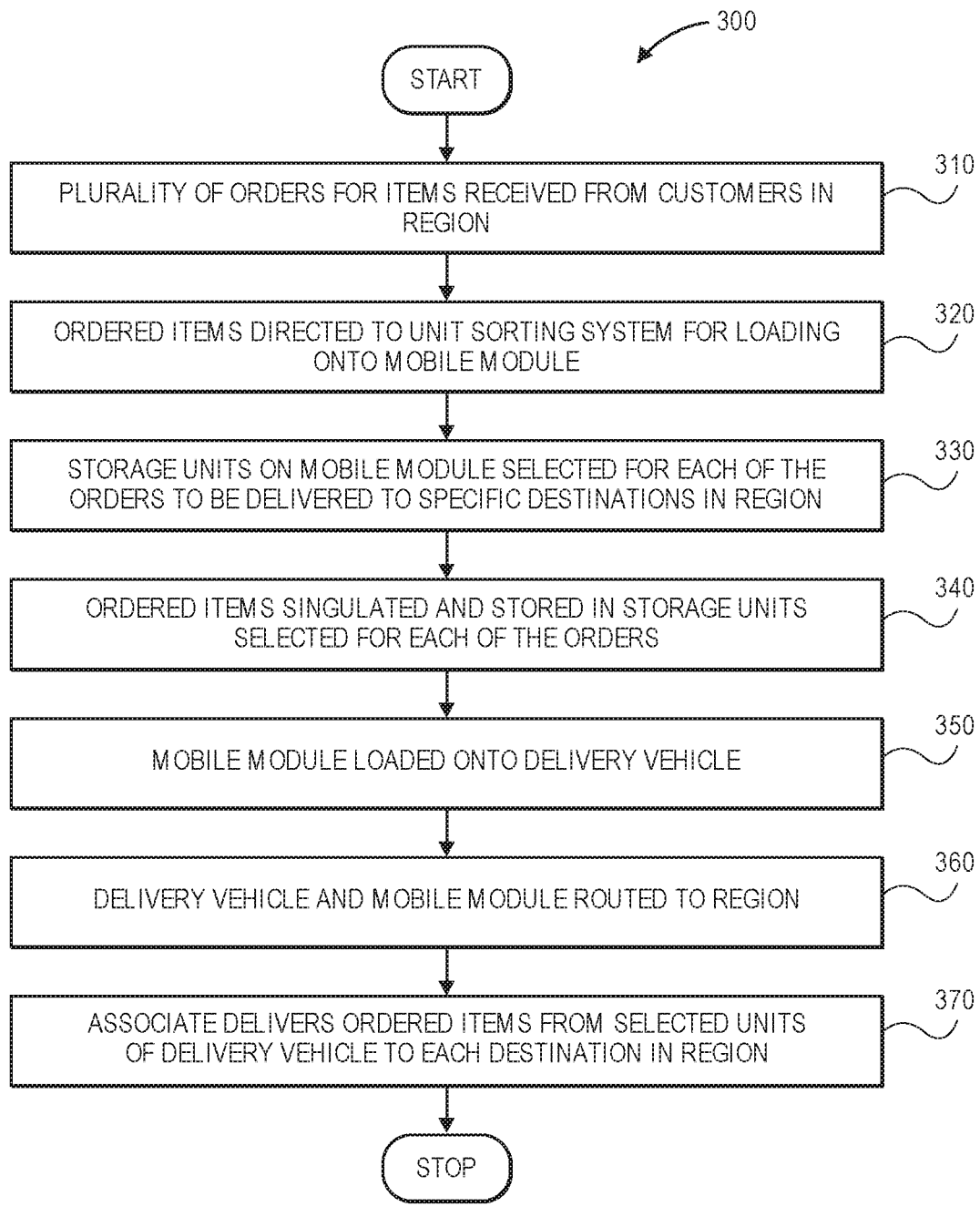
FIG. 3 is a flow chart of one process for delivering items using mobile modules in accordance with embodiments of the present disclosure.

Referring to FIG. 3, a flow chart 300 of one process for delivering items using mobile modules in accordance with embodiments of the present disclosure is shown. At box 310, a plurality of orders for items are received from customers within a given region. The orders may be received electronically, e.g., online, via one or more electronic systems over a network, or, alternatively, in person or by telephone. At box 320, the ordered items are directed to a unit sorting system for loading onto a mobile module. The unit sorting system may include one or more conveyors (e.g., belted conveyors, chain conveyors, gravity conveyors) or other systems for loading items from a fulfillment center into the mobile module, which may include a plurality of bins, bays, shelves, slots, racks, tiers, bars, hooks, cubbies or other like storage units that may be homogenous (e.g., such that each of the storage units has the same size, shape and/or dimensions) or heterogeneous (e.g., such that two or more of the storage units may have different sizes, shapes and/or dimensions) in nature. Alternatively, the ordered items may be prepared for loading onto the mobile module by one or more associates or autonomous mobile robots, or in any other manner.

At box 330, storage units on the mobile module are selected for each of the orders of items. The storage units may be selected based on attributes of the orders and/or the items, or on any other basis. For example, a storage unit may be selected based on a number of items included in an order, sizes of the individual items included in the order, handling or control restrictions for the items included in the order (e.g., temperature, orientation, or the like), a sequence in which the ordered items are to be delivered, or any other basis. At box 340, the ordered items are singulated and stored in the storage units for each of the orders. For example, the ordered items may be loaded into the mobile module by way of the unit sorting system, or in any other manner, and deposited in their respective storage units on the mobile module. Alternatively, in some embodiments, each of the items included in an order may be delivered in a specific container that may be deposited in a selected storage unit, such as by hanging the container on a hook, placing the container on a shelf, putting the container in a bin, or in any other manner.

At box 350, the mobile module is loaded onto a delivery vehicle. The delivery vehicles (or automated vehicles) of the present disclosure may be vehicles having any number of wheels mounted to axles that may be rotated by one or more motors, with dimensions, masses or other indicators of size that may be selected on any basis. For example, the delivery vehicle may be an autonomous mobile robot, an autonomous ground vehicle, a carrier vehicle (e.g., a large truck, such as an 18-wheeled tractor-trailer or other like vehicle), or another vehicle that is specifically configured to receive the mobile module thereon or therein. Additionally, delivery vehicles of the present disclosure may include a cargo bay or other storage compartment, or multiple cargo bays or storage compartments, for storing items that are being delivered from an origin to a destination. Such cargo bays or storage compartments may be used to securely maintain items therein at any desired temperature, pressure or alignment or orientation, and to protect such items against the elements. Furthermore, in some embodiments, the delivery vehicles may also include one or more display screens (e.g., touchscreen displays, scanners, keypads) having one or more user interfaces for displaying information regarding such vehicles or their contents to associates, or for receiving interactions (e.g., instructions) from such associates, or other input/output devices for such purposes.

At box 360, the delivery vehicle is routed to the region. For example, in some embodiments, the delivery vehicles may be sized and configured to travel on roads at various times or during various levels of congestion, and at various speeds, e.g., in response to one or more computer-based instructions. In some other embodiments, however, the delivery vehicle may be sized and configured to travel on sidewalks, crosswalks, bicycle paths, trails or the like, and at various speeds. In still other embodiments, delivery vehicles may be configured to travel on not only roads but also sidewalks, crosswalks, bicycle paths, trails or the like, at any desired speeds. The delivery vehicle may transport the mobile module to the region directly or, alternatively, may transfer the mobile module to another delivery vehicle for transporting the item.

At box 370, an associate delivers the ordered items from the storage units of the mobile module to each of the designations within the region, and the process ends. For example, the delivery vehicle may stop in a single location within a vicinity of one or more destinations, and the items on the mobile module may be manually or automatically offloaded from the mobile module, and delivered to the destinations. In some embodiments, the items may be left on a porch or set of stairs, in a portico, on a driveway, or in any other location associated with a destination. In some other embodiments, a customer may authorize one or more associates and/or machines to enter premises, e.g., indoor or outdoor, and deliver the items to such premises. The ordered items may be retrieved from bins or other storage units and transported to the respective destinations in their own packaging, or in one or more bags or other carriers. Alternatively, an entire storage unit may be transported, with a plurality of ordered items therein, from the mobile module to an intended destination.

Figure 4A:
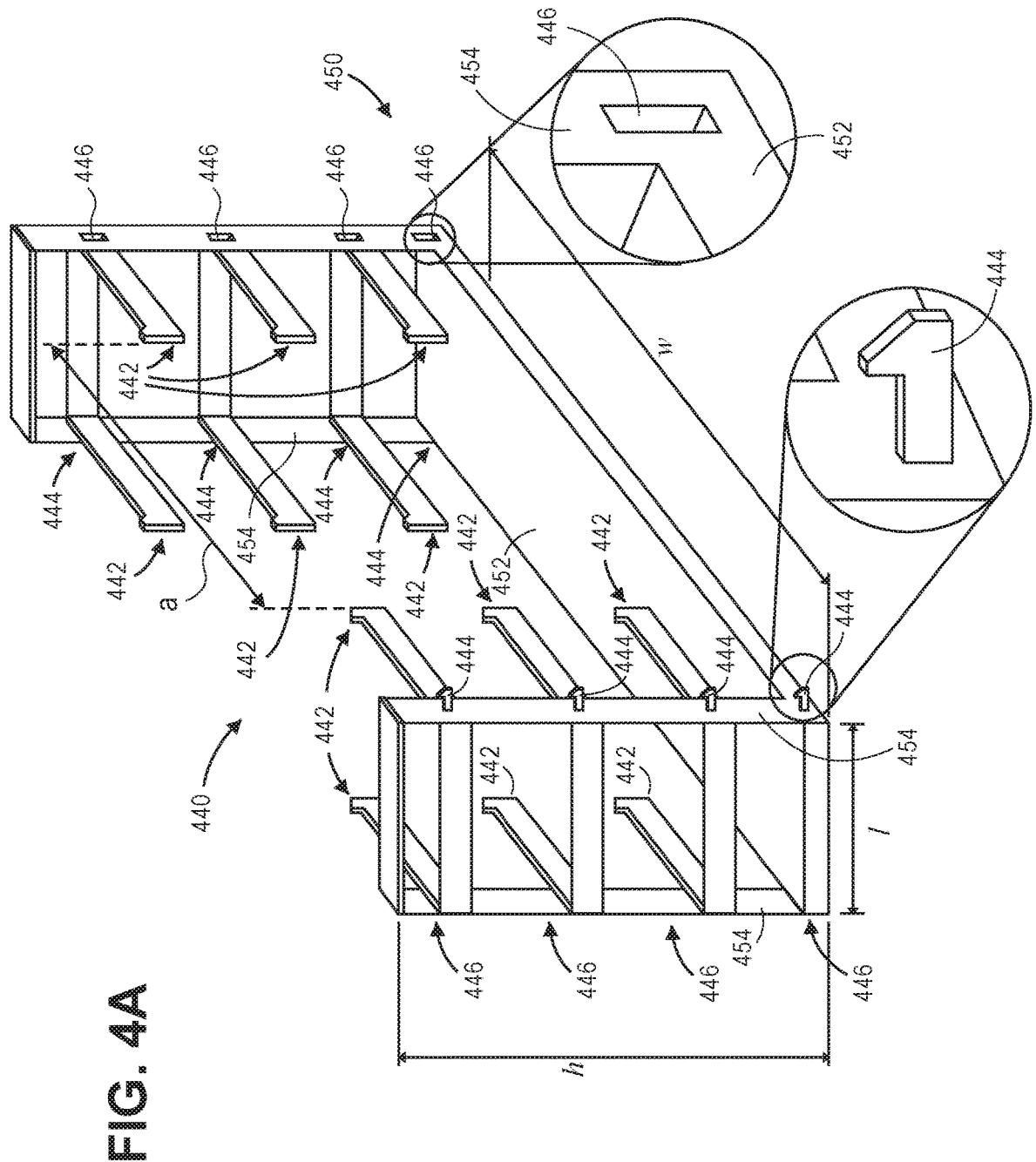
FIGS. 4A through 4C are views of aspects of one mobile module for delivering items in accordance with embodiments of the present disclosure.
Figure 4B:
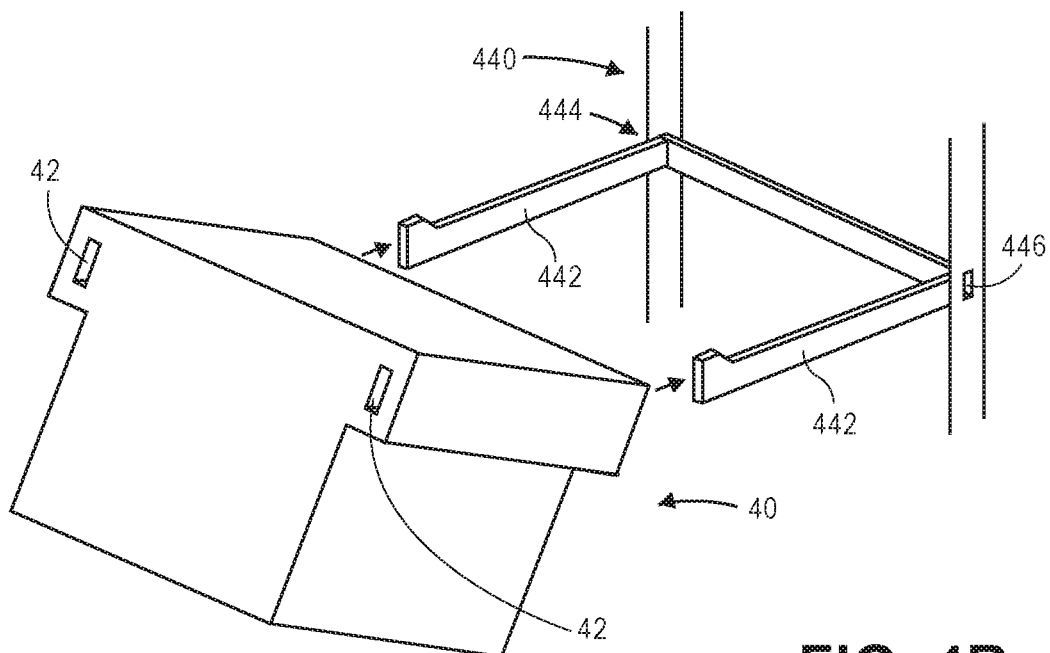
Figure 4C:
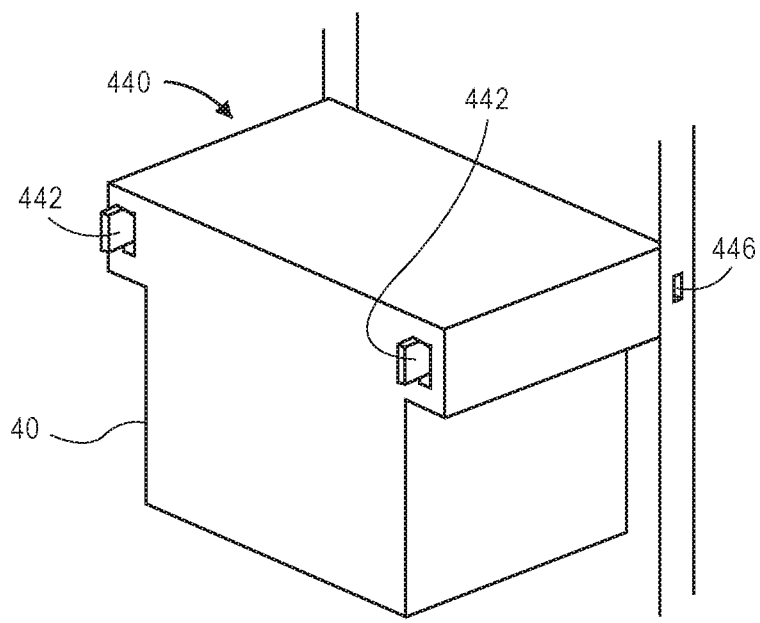

As is discussed above, the mobile modules of the present disclosure may be formed from one or more modules or sub-modules that are configured to store one or more items therein, e.g., in one or more bins, bays, shelves, slots, racks, tiers, bars, hooks, cubbies or other like storage units. Referring to FIGS. 4A through 4C, views of aspects of one mobile module for delivering items in accordance with embodiments of the present disclosure are shown. Except where otherwise noted, reference numerals preceded by the number "4" in FIGS. 4A through 4C refer to elements that are similar to elements having reference numerals preceded by the number "2" in FIG. 2A or FIG. 2B or by the number "1" shown in FIGS. 1A through 1M.

As is shown in FIG. 4A, the mobile module 440 includes a frame 450 having a base 452 and a pair of risers 454 extending vertically upward from, e.g., normal to, the base 452. The base 452 and the risers 454 may be formed from any suitable material, including but not limited to wood, plastics (e.g., reinforced plastics such as fiberglass), metals (e.g., forged steel or aluminum) or composites, and may be assembled using one or more screws, bolts, rivets, brackets or the like. The mobile module 440 further includes a plurality of pairs of support bars 442, each of which is mounted to one of the risers 454 and extends laterally inward therefrom. The support bars 442 may take any shapes or forms, and may feature cross-sections that are not only circular but also rectangular (e.g., square), triangular, elliptical or of any other regular or irregular shape in accordance with the present disclosure. Unlike the mobile module 140 of FIGS. 1A through 1M, in which the risers 154 are provided in a central portion of the mobile module 140, and the shelves 156 extended laterally outward from the risers 154, the risers 454 of FIG. 4A are provided in outer portions of the mobile module 440, and the support bars 442 extend laterally inward therefrom.

The dimensions of the mobile module 440 may be selected on any basis. For example, as is shown in FIG. 4A, the mobile module 440 has a height h, a length l, and a width w. In some embodiments, the height h, the length l, and the width w may be selected based on interior dimensions of a delivery vehicle for transporting the mobile module 440 from one location to another, e.g., from a fulfillment center to one or more destinations associated with orders for items stored therein. Alternatively, the height h, the length l, and the width w may be selected based on numbers, sizes or shapes of items or containers to be stored within the mobile module 440.

Furthermore, the lengths of the support bars 442 may also be selected in order to establish a distance a between the ends of the support bars 442, thereby enabling one or more aspects of a sortation system, such as the sortation system 135 of FIGS. 1A through 1M, to be extended therebetween and along the length l of the mobile module 440. For example, one or more items may be loaded onto the support bars 442, e.g., by one or more associates or autonomous mobile robots, which may be programmed to transport such items to a location of a selected pair of the support bars 442 along a length of a sortation system, such as the sortation system 135 of FIGS. 1A through 1M, and raised or lowered to a height of the selected pair of the support bars 442, as necessary, before being placed onto the support bars 442.

In some embodiments, the support bars 442 may be mounted to the risers 454 in a hinged fashion, such that the support bars 442 may be extended when the support bars 442 are required to store an item or container thereon and retracted when the support bars 442 are not required. In this regard, the capacity of the mobile module 440 to store items or containers of various sizes is enhanced accordingly.

The mobile module 440 further includes hook-and-slot fastening systems (or coupling systems) for coupling the mobile module 440 to (or uncoupling the mobile module 440 from) a plurality of other mobile modules (not shown)

in series, or for coupling the mobile module 440 to (or uncoupling the mobile module 440 from) a delivery vehicle, a sortation system, or any other system. As is shown in FIG. 4A, the mobile module 440 includes a plurality of hooks 444 and a plurality of slots 446. The hooks 444 and the slots 446 are provided in a corresponding fashion that enables a plurality of mobile modules 440 to be connected in series to one another, such that the hooks 444 of one of the mobile modules 440 are inserted into the slots 446 of another of the mobile modules 440. Additionally, an interior section (e.g., a cargo bay) of a delivery vehicle or a sortation system may be outfitted with a plurality of corresponding hooks 444 and slots 446, such that the hooks 444 of the mobile module 440 may be inserted into the slots 446 of another the delivery vehicle or sortation system, or the hooks 444 of the delivery vehicle or sortation system may be inserted into the slots 446 of the mobile module 440, thereby enabling the mobile module 440 to be coupled to (or uncoupled from) the delivery vehicle, the sortation system or the like.

As is shown in FIGS. 4B and 4C, a container 40 of one or more items may be stored on a pair of the support bars 442, e.g., by extending each of the support bars 442 of the pair through corresponding holes 42 in the container 40. The holes 42 are lateral openings by which the container 40 may be suspended from the support bars 442, and have common dimensions and shapes that correspond to the dimensions and shapes of the support bars 442. For example, as is shown in FIGS. 4A through 4C, the support bars 442 may be mounted to the risers 454 at a predetermined distance from one another, and the holes 42 extending through the container 40 may be separated by the same predetermined distance. Likewise, and as is also shown in FIGS. 4A through 4C, the cross-sections of the support bars 442 may have attributes such as shapes, dimensions or areas that substantially correspond to attributes such as shapes, dimensions or areas of the holes 42. In some embodiments, the holes 42 may have shapes, dimensions or areas that are at least as large as the shapes, dimensions or areas of the cross-sections of the support bars 442 on which the container 40 is to be suspended. In some other embodiments, e.g., where the container 40 is formed from a flexible or elastic material, the holes 42 may have shapes, dimensions or areas that are smaller than the cross-sections of the support bars 442 on which the container 40 is to be suspended, thereby providing additional friction that may maintain the container 40 in place on the support bars 442.

Figure 5A:
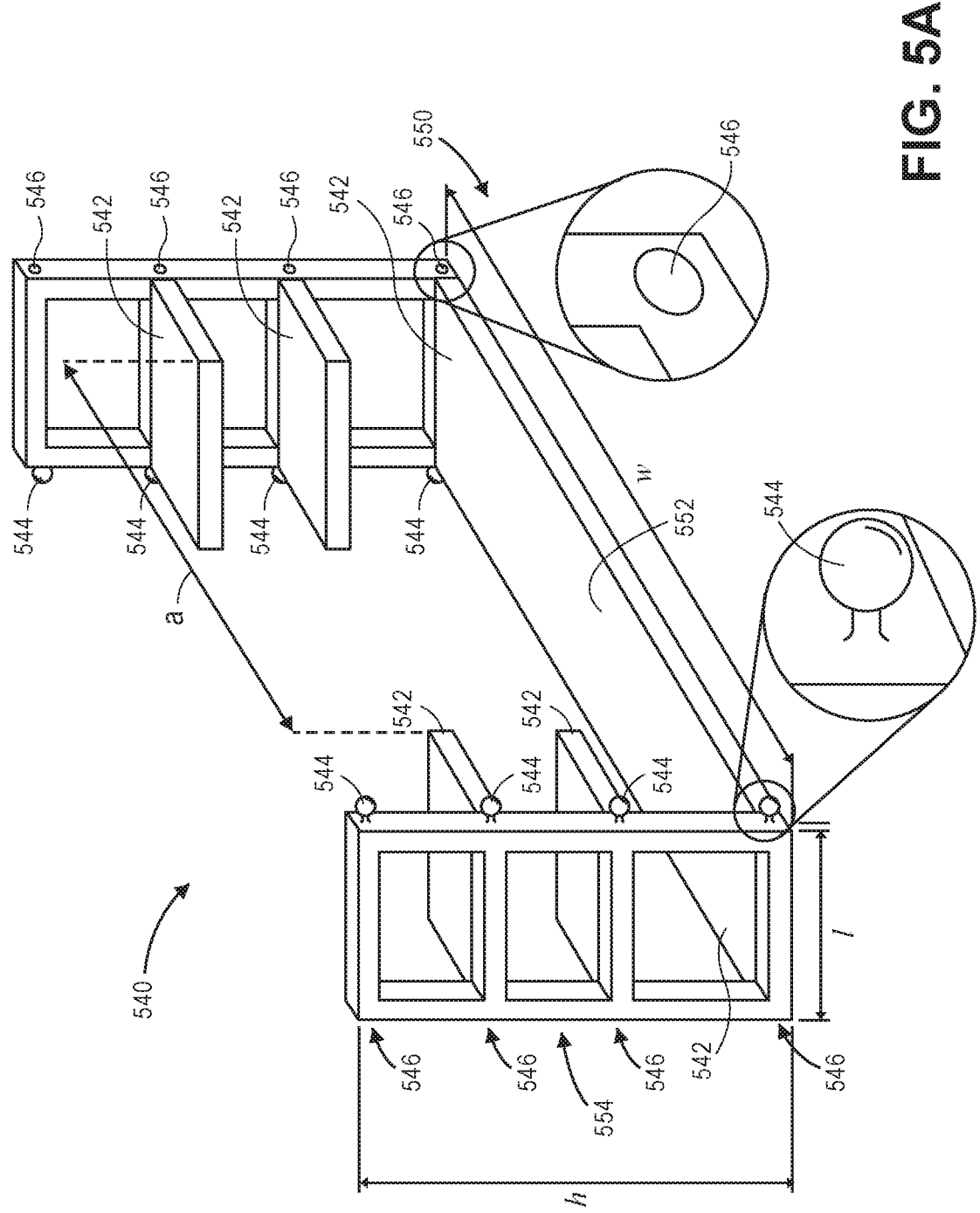
FIGS. 5A through 5C are views of aspects of one mobile module for delivering items in accordance with embodiments of the present disclosure.
Figure 5B:
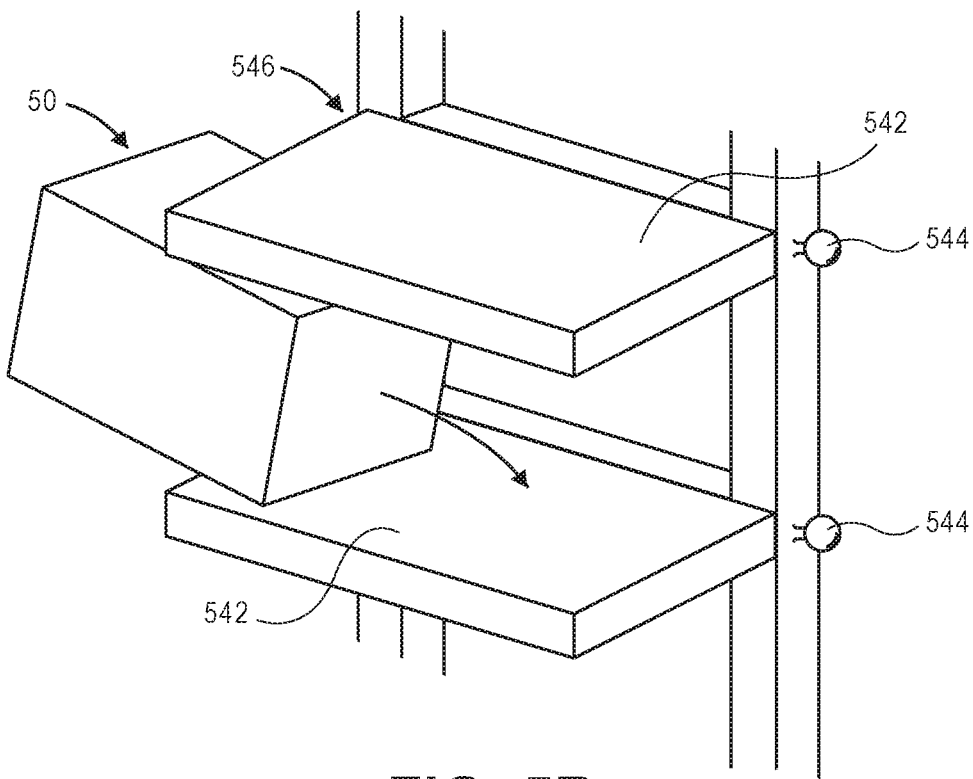
Figure 5C:
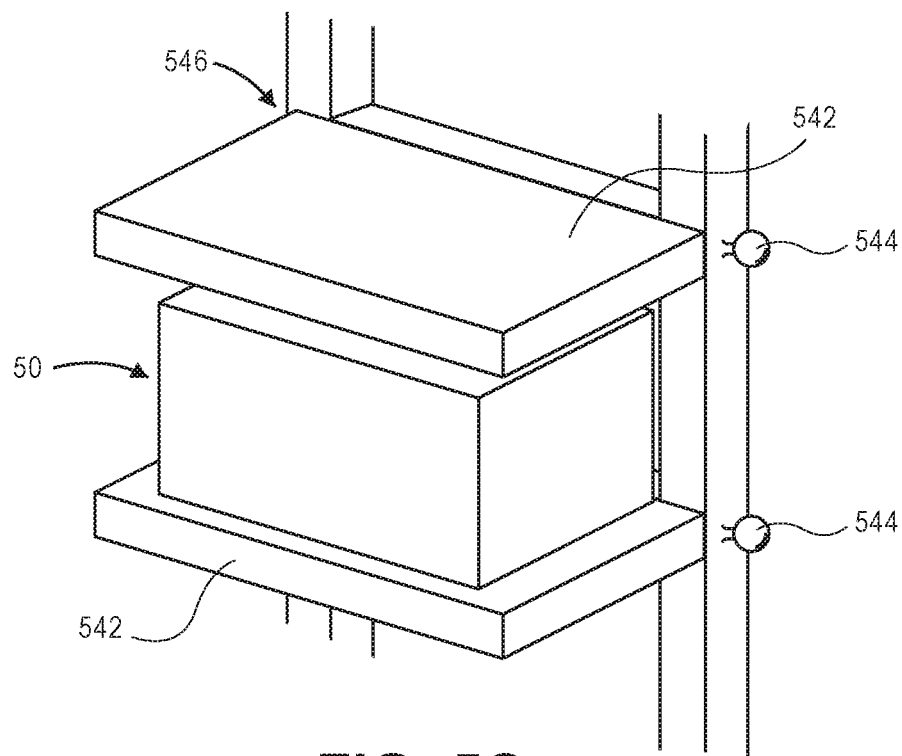

The mobile modules of the present disclosure may include any type or form of storage unit, and are not limited to storage units including one or more pairs of bars. Likewise, the mobile modules of the present disclosure may further include any type or form of fastening systems for coupling the mobile modules to one another, to a delivery vehicle or to a sortation system, or for uncoupling the modules from one another, from a delivery vehicle or from a sortation system. Referring to FIGS. 5A through 5C, views of aspects of one mobile module for delivering items in accordance with embodiments of the present disclosure are shown. Except where otherwise noted, reference numerals preceded by the number "5" in FIGS. 5A through 5C refer to elements that are similar to elements having reference numerals preceded by the number "4" in FIGS. 4A through 4C, by the number "2" in FIG. 2A or FIG. 2B or by the number "1" shown in FIGS. 1A through 1M.

As is shown in FIG. 5A, the mobile module 540 includes a frame 550 having a base 552 and a pair of risers 554 extending vertically upward from, e.g., normal to, the base 552. The base 552 and the risers 554 may be formed from any suitable material, including but not limited to wood, plastics (e.g., reinforced plastics such as fiberglass), metals (e.g., forged steel or aluminum) or composites, and may be assembled using one or more screws, bolts, rivets, brackets or the like. The mobile module 540 further includes a plurality of shelves 542, each of which is mounted to one of the risers 554 and extends laterally inward therefrom. The shelves 542 may take any shapes or forms, and may feature surface areas that are not only rectangular but also square, triangular, elliptical or of any other regular or irregular shape in accordance with the present disclosure. As with the mobile module 440 of FIGS. 4A through 4C, the mobile module 540 has a height h, a length l, and a width w, and the dimensions of the mobile module 540 or of the shelves 542 may be selected on any basis, e.g., interior dimensions of a delivery vehicle for transporting the mobile module 540 from one location to another, or numbers, sizes or shapes of items or containers to be stored within the mobile module 540, or any other basis. Likewise, the lengths of the shelves 542 may also be selected in order to establish a distance a between the ends of the shelves 542, thereby enabling one or more aspects of a sortation system, such as the sortation system 135 of FIGS. 1A through 1M, to be extended therebetween and along the length l of the mobile module 540. For example, referring again to the sortation system 135 of FIGS. 1A through 1M, one or more items may be loaded onto a shelf 542, e.g., by one or more associates or autonomous mobile robots, which may be programmed to transport such items to a location of a selected shelf 542, along a length of the sortation system 135, and raised or lowered to a height of the selected shelf 542, as necessary, before being placed onto the shelf 542.

The mobile module 540 further includes ball-and-socket fastening systems (or coupling systems) for coupling the mobile module 540 to (or uncoupling the mobile module 540 from) a plurality of other mobile modules (not shown) in series, or for coupling the mobile module 540 to (or uncoupling the mobile module 540 from) a delivery vehicle, a sortation system, or any other system. As is shown in FIG. 5A, the mobile module 540 includes a plurality of mounted balls 544, e.g., substantially spherical sections that are mounted to the risers 554, and a plurality of sockets 546 that are also mounted to the risers 554 and sized to accommodate the mounted balls 544 therein. The mounted balls 544 and the sockets 546 are provided in a corresponding fashion such that a plurality of mobile modules 540 may be connected in series to one another, such that the mounted balls 544 of one of the mobile modules 540 are inserted into the sockets 546 of another of the mobile modules 540. Additionally, an interior section (e.g., a cargo bay) of a delivery vehicle or a sortation system may be outfitted with a plurality of corresponding mounted balls 544 and sockets 546, such that the mounted balls 544 of the mobile module 540 may be inserted into the sockets 546 of another of the delivery vehicle or sortation system, and the mounted balls 544 of the delivery vehicle or sortation system may be inserted into the sockets 546 of the mobile module 540, thereby enabling the mobile module 540 to be coupled to (or uncoupled from) the delivery vehicle, the sortation system or the like.

As is shown in FIGS. 5B and 5C, a container 50 of one or more items may be stored within the mobile module 540 by placing the container 50 on one of the shelves 542. In some embodiments, two or more items may be stored on one of the shelves 542 in a common container. In some other embodiments, however, two or more items may be stored on one of the shelves 542 directly.

Figure 6:
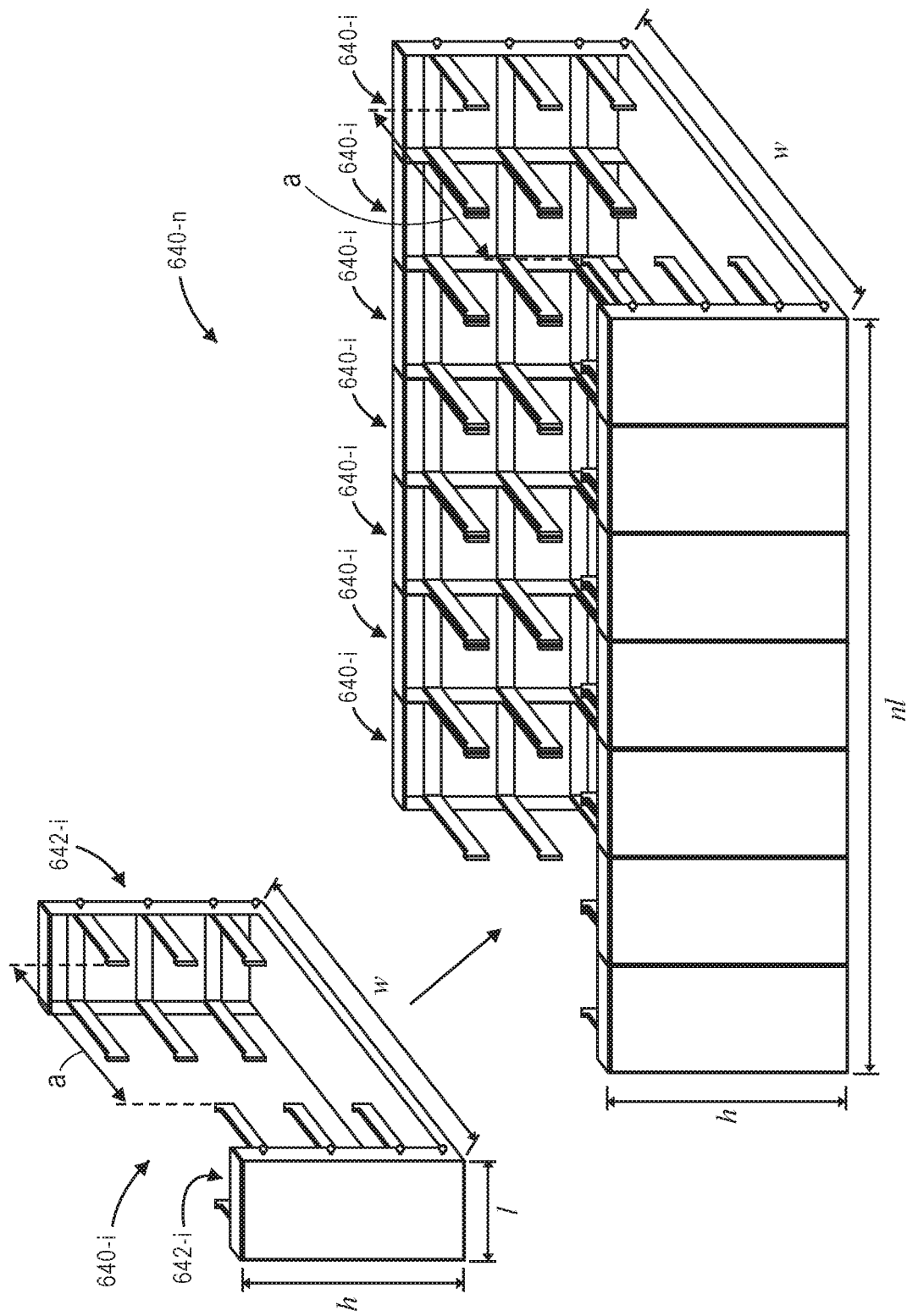
FIG. 6 is a view of aspects of one mobile module for delivering items in accordance with embodiments of the present disclosure.

As is discussed above, the mobile modules of the present disclosure may be modular in nature, and may be formed from a plurality of modules or sub-modules that may be coupled together, loaded with items at a fulfillment center and transported to one or more destinations. Referring to FIG. 6, views of aspects of one mobile module for delivering items in accordance with embodiments of the present disclosure are shown. Except where otherwise noted, reference numerals preceded by the number "6" in FIG. 6 refer to elements that are similar to elements having reference numerals preceded by the number "5" in FIGS. 5A through 5C, by the number "4" in FIGS. 4A through 4C, by the number "2" in FIG. 2A or FIG. 2B or by the number "1" shown in FIGS. 1A through 1M.

As is shown in FIG. 6, a mobile module 640-*n* is formed from a plurality of sub-modules 640-*i* by coupling a plurality of n sub-modules 640-*i* together in a longitudinal fashion, e.g., by one or more fastening systems (or coupling systems).

The sub-module 640-*i* has a height h, a length l, and a width w, and a predetermined number of storage units 642-*i* having ends that are separated by a distance a. A length nl of the mobile module 640-*n*, or a number of storage units 642-*i* included in the mobile module 640-*n*, is determined based on a number of the sub-modules 640-*i* that are coupled in series to form the mobile module 640-*n*. Because the sub-modules 640-*i* have the common height h and width w, however, the height h and the width w of the mobile module 640-*n* will remain fixed regardless of the number of the sub-modules 640-*i* that are coupled in series, thereby enabling the mobile module 640-*n* to be inserted into a cargo bay of a delivery vehicle having an internal height and an internal width that are greater than the height h and the width w, respectively. Similarly, because the sub-modules 640-*i* have the common distance a between the respective ends of the storage units 642-*i*, one or more aspects of a sortation system, such as the sortation system 135 of FIGS. 1A through 1M, may be extended therebetween and along the length nl of the mobile module 640-*n*, regardless of the number of sub-modules 640-*i* that are coupled together.

As is discussed above, the mobile modules of the present disclosure may be formed from modules or sub-modules that are homogenous in nature, e.g., such that each of the modules or sub-modules has the same size, shape and/or dimensions, or is configured to support bins or other storage units of the same size, shape and/or dimensions, or heterogeneous in nature, e.g., such that two or more of the modules or sub-modules may have different sizes, shapes and/or dimensions, or be configured to support two or more bins or other storage units having different sizes, shapes and/or dimensions. In this regard, a mobile module may be outfitted or configured to receive any number of items, having a variety of sizes, shapes or dimensions, before being transported to a location where the items may be delivered therefrom to one or more customers or destinations.

Referring to FIGS. 7A through 7D, views of aspects of one mobile module for delivering items in accordance with embodiments of the present disclosure are shown. Except where otherwise noted, reference numerals preceded by the number "7" in FIGS. 7A through 7D refer to elements that are similar to elements having reference numerals preceded by the number "6" in FIG. 6, by the number "5" in FIGS. 5A through 5C, by the number "4" in FIGS. 4A through 4C, by the number "2" in FIG. 2A or FIG. 2B or by the number "1" shown in FIGS. 1A through 1M.

Figure 7B:
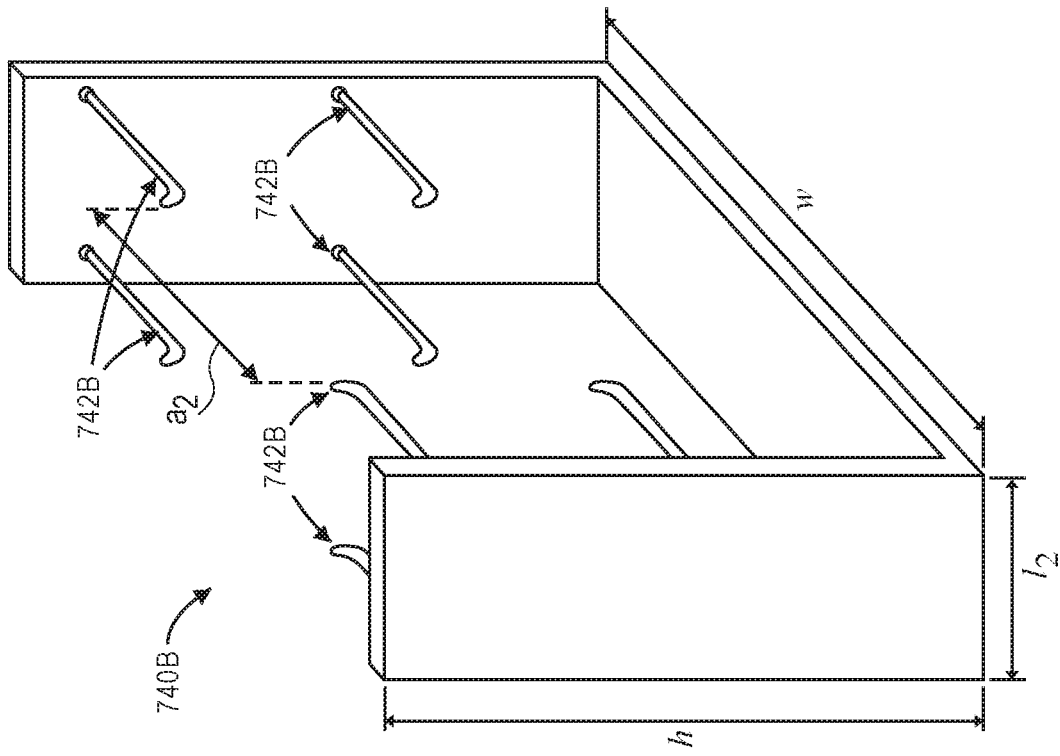
Figure 7A:
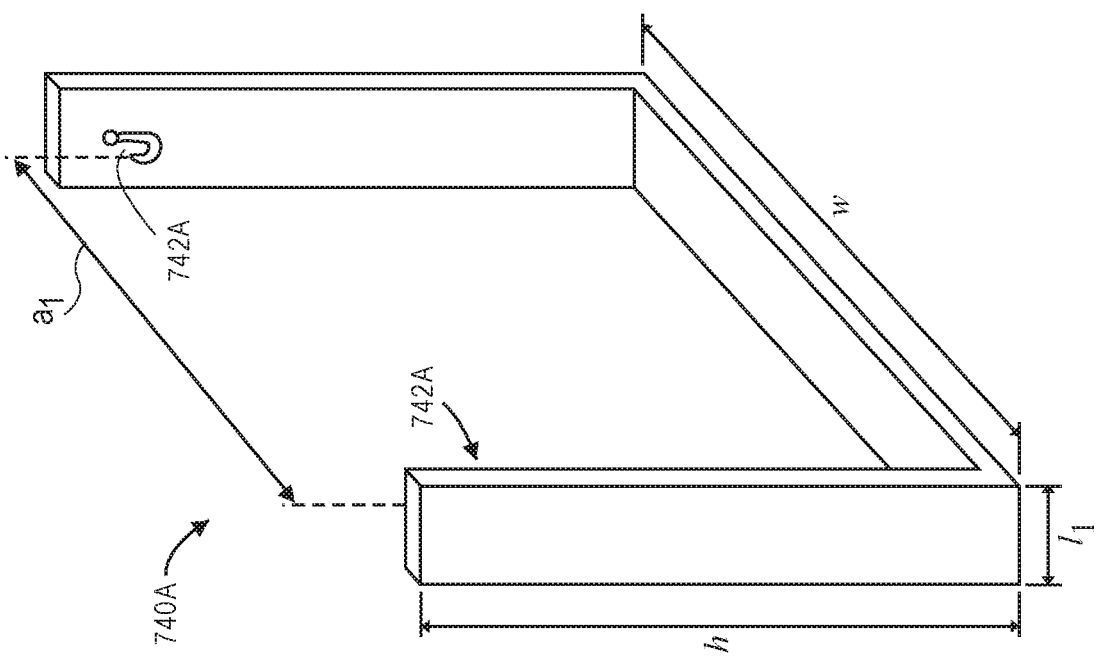
Figure 7C:
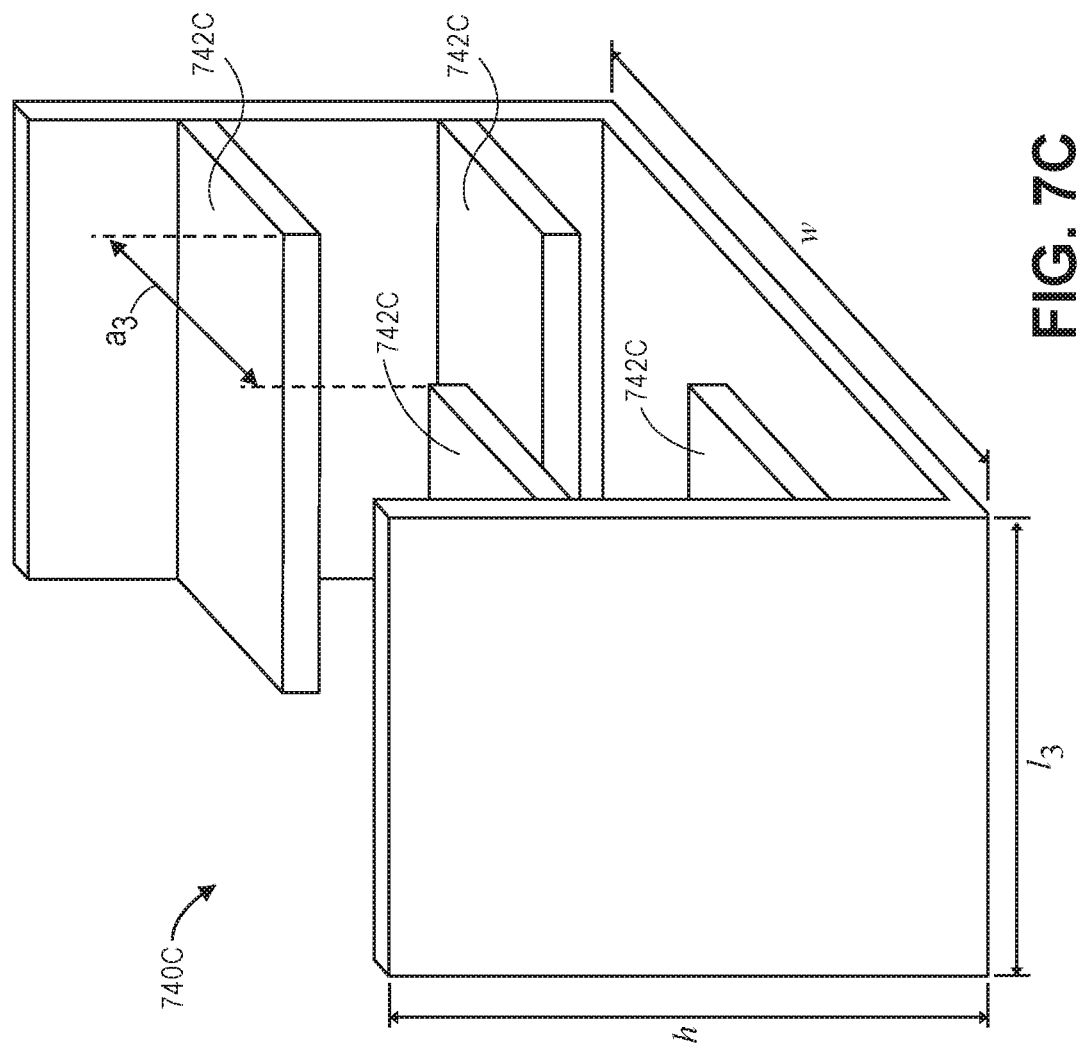

As is shown in FIG. 7A, a first sub-module 740A has a height h, a width w, and a first length $l_1$, and a pair of storage units 742A (e.g., hooks) having ends that are separated by a first distance $a_1$. As is shown in FIG. 7B, a second sub-module 740B has a height h, a width w, and a second length $l_2$, and a predetermined number of storage units 742B (e.g., pairs of support bars) having ends that are separated by a second distance $a_2$. As is shown in FIG. 7C, a third sub-module 740C has a height h, a width w, and a third length $l_3$, and a predetermined number of storage units 742C (e.g., shelves) having ends that are separated by a third distance $a_3$.

As is shown in FIG. 7D, the first sub-module 740A, the second sub-module 740B and the third sub-module 740C may be coupled together in a longitudinal fashion, e.g., by one or more fastening systems (or coupling systems), to form a mobile module 740-*n*. Alternatively, the first sub-module 740A, the second sub-module 740B and the third sub-module 740C may be aligned in series, e.g., in close proximity to one another, to form the mobile module 740-*n* and need not be physically coupled to one another. Because the sub-modules 740A, 740B, 740C have the common height h and width w, the mobile module 740-*n* may be inserted into a cargo bay of a delivery vehicle having an internal height and an internal width that are not less than the height h and the width w, respectively. Similarly, one or more aspects of a sortation system, such as the sortation system 135 of FIGS. 1A through 1M, may be extended into and along the length $(l_1+l_2+l_3)$ of the mobile module 740-*n*, subject to the shortest one of the first distance $a_1$, the second distance $a_2$ and the third distance $a_3$.

For example, referring again to the sortation system 135 of FIGS. 1A through 1M, one or more items may be loaded onto the storage units 742A, 742B, 742C via the sortation system 135, e.g., by one or more associates or autonomous mobile robots, which may be programmed to transport such items to a location of a selected one of the storage units 742A, 742B, 742C, along a length of the sortation system 135, and raised or lowered to a height of the selected one of the storage units 742A, 742B, 742C, as necessary, to deposit the items onto the selected one of the storage units 742A, 742B, 742C.

In some embodiments, the mobile modules of the present disclosure may be equipped with one or more features for loading the mobile modules onto a delivery vehicle, and unloading the mobile modules from a delivery vehicle. Referring to FIGS. 8A through 8F, views of aspects of one mobile module for delivering items in accordance with embodiments of the present disclosure are shown. Except where otherwise noted, reference numerals preceded by the number "8" in FIGS. 8A through 8F refer to elements that are similar to elements having reference numerals preceded by the number "7" in FIGS. 7A through 7D, by the number "6" in FIG. 6, by the number "5" in FIGS. 5A through 5C, by the number "4" in FIGS. 4A through 4C, by the number "2" in FIG. 2A or FIG. 2B or by the number "1" shown in FIGS. 1A through 1M.

Figure 8A:
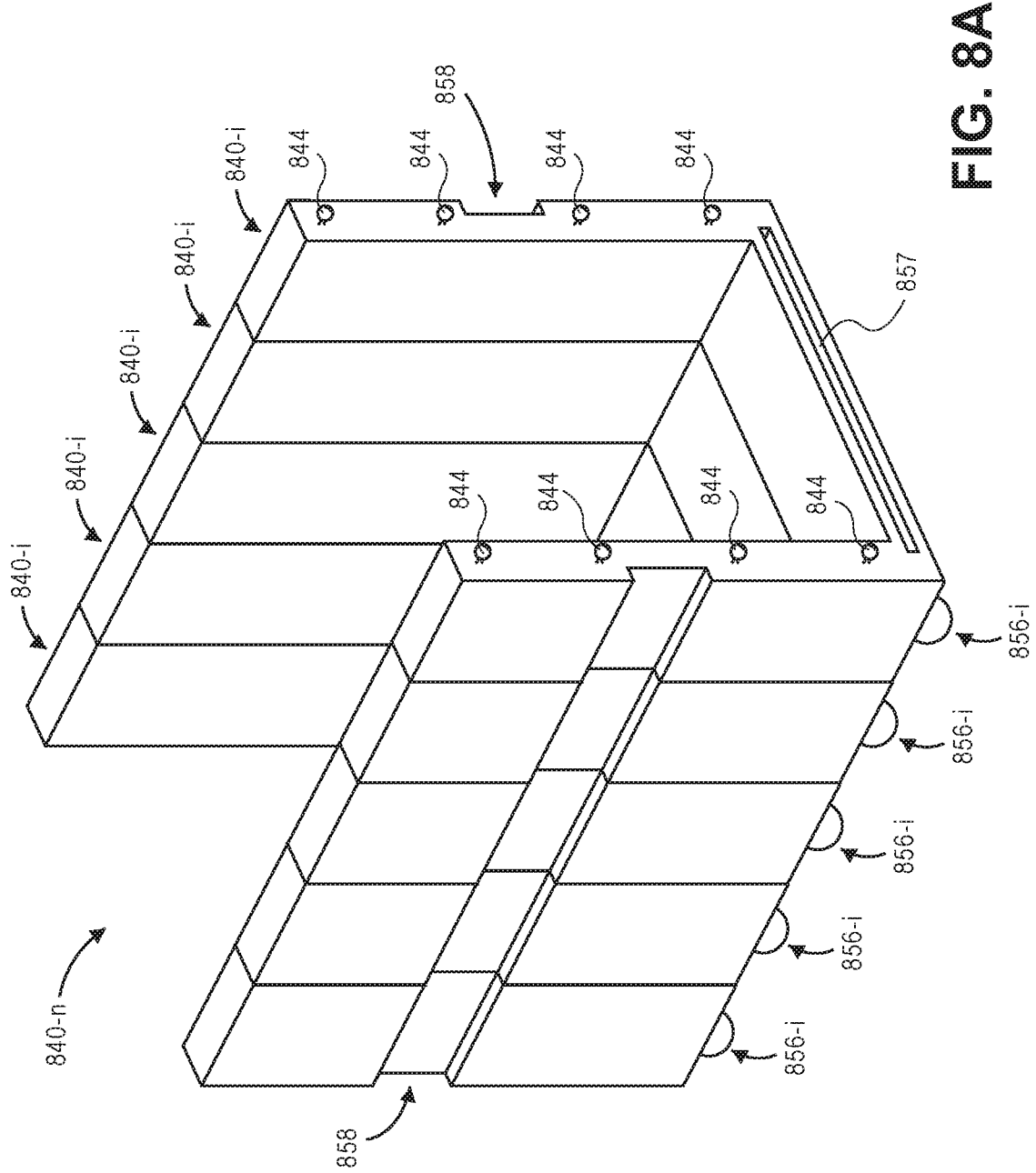
FIGS. 8A through 8F are views of aspects of one system for delivering items using mobile modules in accordance with embodiments of the present disclosure.

As is shown in FIG. 8A, a mobile module 840-*n* is formed from a plurality of sub-modules 840-*i*. Each of the sub-modules 840-*i* includes a frame 850-*i* having a set of mounted balls 844 (e.g., of a ball-and-socket fastening system) or other systems for coupling to (or uncoupling from) one another, or for coupling to (or uncoupling from) a delivery vehicle or a sortation system. Each of the frames 850-*i* further includes a set of wheels 856-*i*, an entryway 857-*i* and a guide track 858-*i*. Each of the sub-modules 840-*i* may further include one or more storage units (e.g., bins or other storage units, not shown).

The wheels 856-*i* may be casters or other wheeled systems for allowing the sub-modules 840-*i* to translate independently or in concert with two or more of the sub-modules 840-*i*, e.g., as a part of the mobile module 840-*n*. The wheels 856-*i* may have one or more rigs or forks, bearings, or other components. The entryway 857-*i* extends in parallel to a longitudinal axis of the sub-modules 840-*i*, at a base of the frame 850-*i*, and is sized to accommodate a lifting extension or other feature of a delivery vehicle. The guide track 858-*i* is provided on external surfaces of vertical risers of the frame 850-*i*, and also extends in parallel to the longitudinal axis of the sub-modules 840-*i*.

Figure 8B:
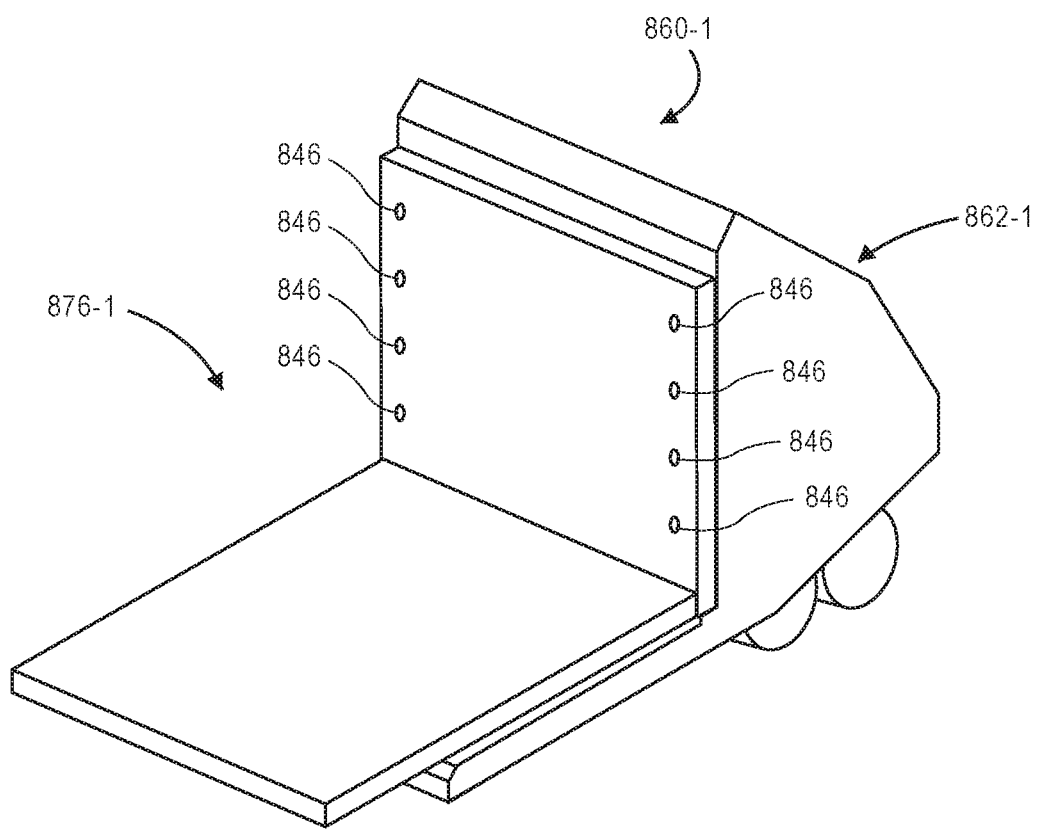
Figure 8C:
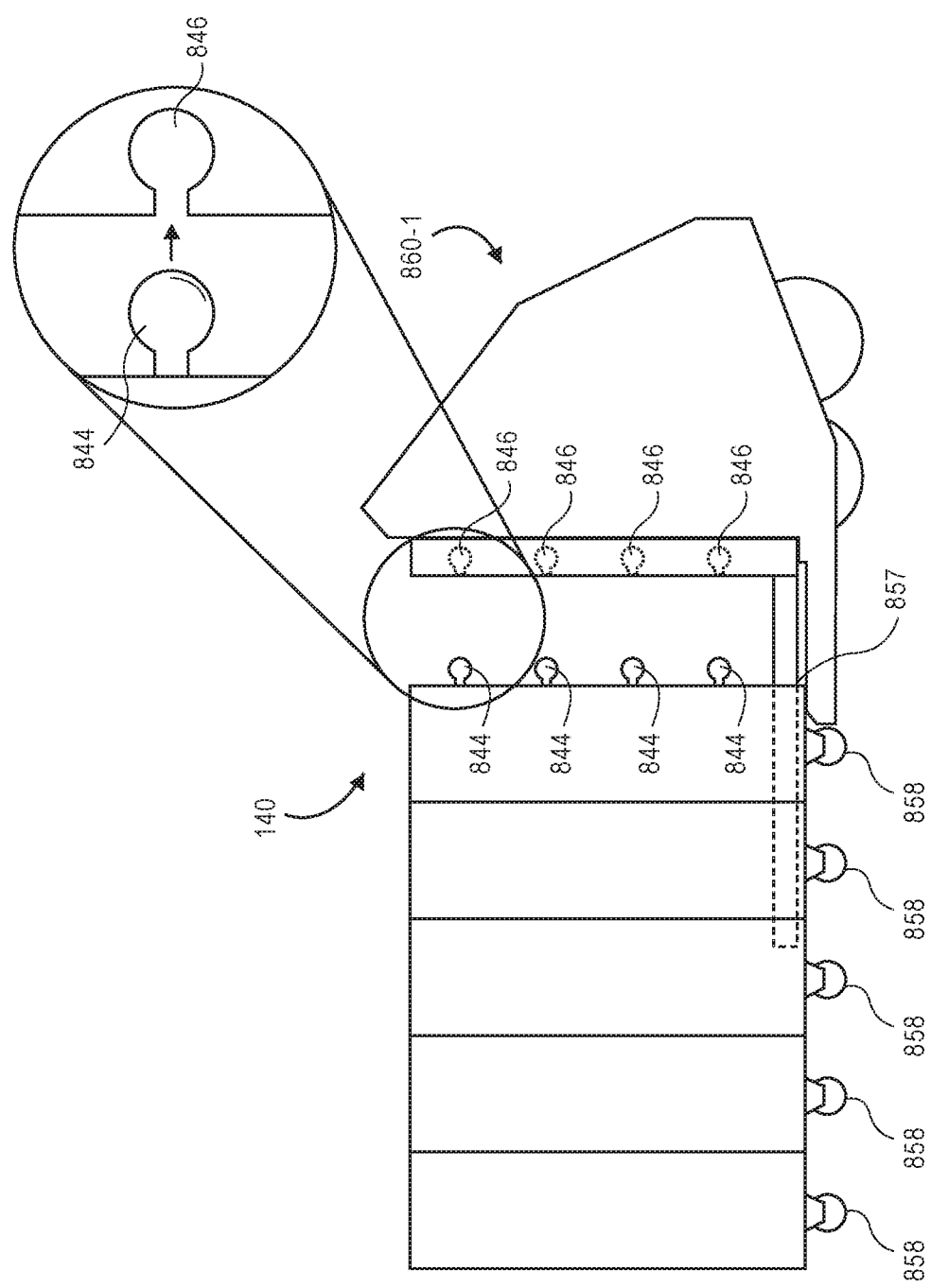

As is shown in FIG. 8B, a delivery vehicle 860-1 includes a motor 862-1 and an engagement system 876-1 for engaging with one or more mobile modules, e.g., the mobile module 840-*n* of FIG. 8A. For example, in some embodiments, the delivery vehicle 860-1 may be an autonomous mobile robot or autonomous ground vehicle, e.g., a forklift, configured to engage with the mobile module 840-*n* and transport the mobile module 840-*n* to one or more destinations, such as to another delivery vehicle. The engagement system 876-1 of FIG. 8B includes a plurality of sockets 846 for receiving the mounted balls 844 of the mobile module 840-*n* therein, and a lifting extension configured for insertion into the entryway 857-*i* of the mobile module 840-*n*. As is shown in FIG. 8C, the delivery vehicle 860-1 may engage with the mobile module 840-*n*, e.g., by backing the delivery vehicle 860-1 toward the mobile module 840-*n*, with the engagement system 876-1 aligned to receive the mounted balls 844 of the mobile module 840-*n* within the sockets 846 and to insert the lifting extension into the entryway 857-*i*.

Figure 8D:
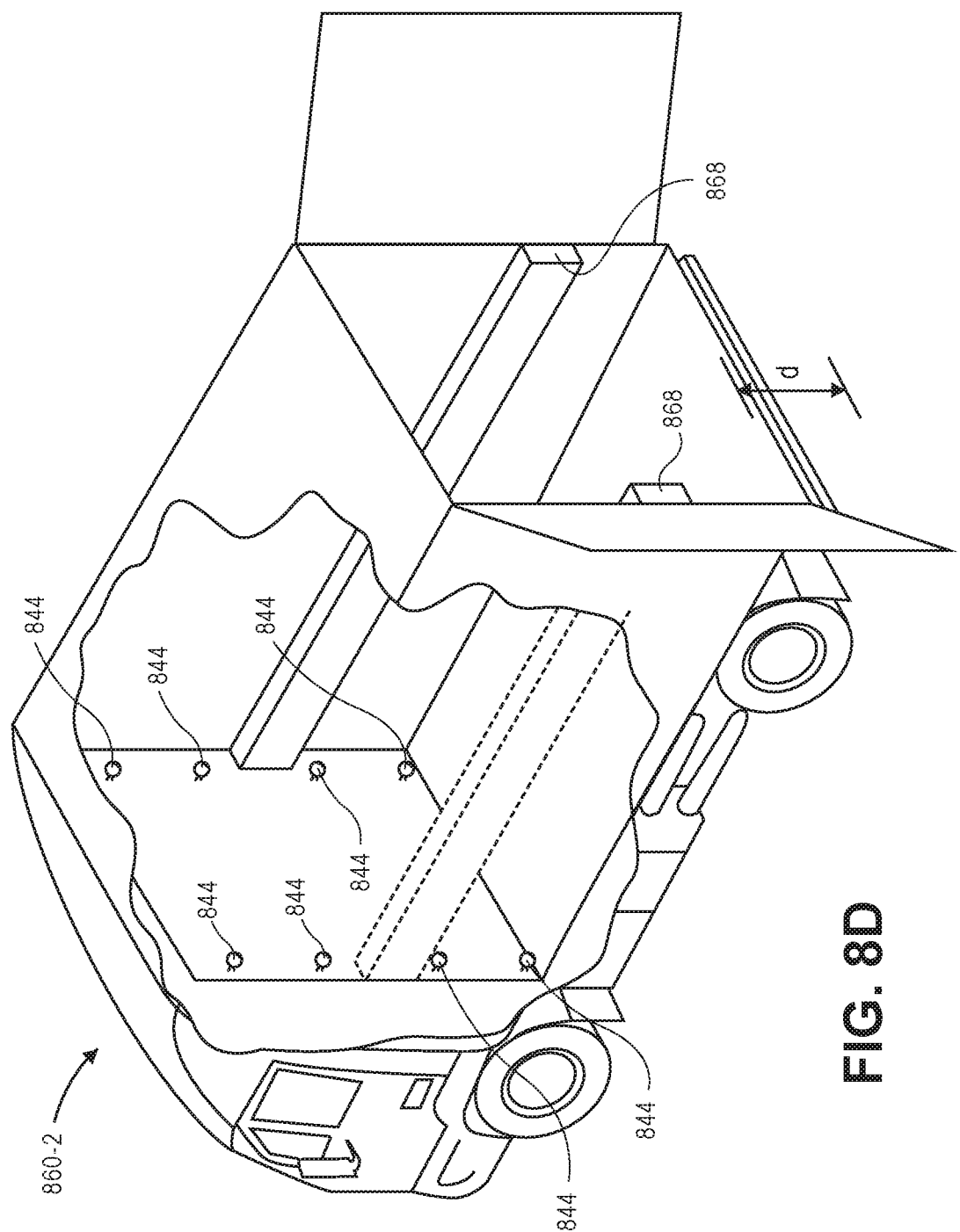

As is shown in FIG. 8D, a delivery vehicle 860-2 includes a cargo bay having a plurality of mounted balls 844 for engaging with a plurality of sockets of the mobile module 840-*n* (not shown) and a pair of guide rails 868 for mating with the guide tracks 858-*i* of the mobile module 840-*n*. For example, in some embodiments, the delivery vehicle 860-2 may be a cargo van or other vehicle configured to engage with the mobile module 840-*n* and transport the mobile module 840-*n* to one or more destinations for the delivery of one or more items. As is also shown in FIG. 8D, an interior surface of the cargo bay is provided at a height d above a traveling surface for the delivery vehicle 860-2. Alternatively, in some embodiments, the delivery vehicles 860-1, 860-2 may be any type or form of vehicle, including but not limited to one or more cars, trucks, trailers, freight cars, container ships or aircraft (e.g., manned or unmanned aerial vehicles, or drones).

Figure 8E:
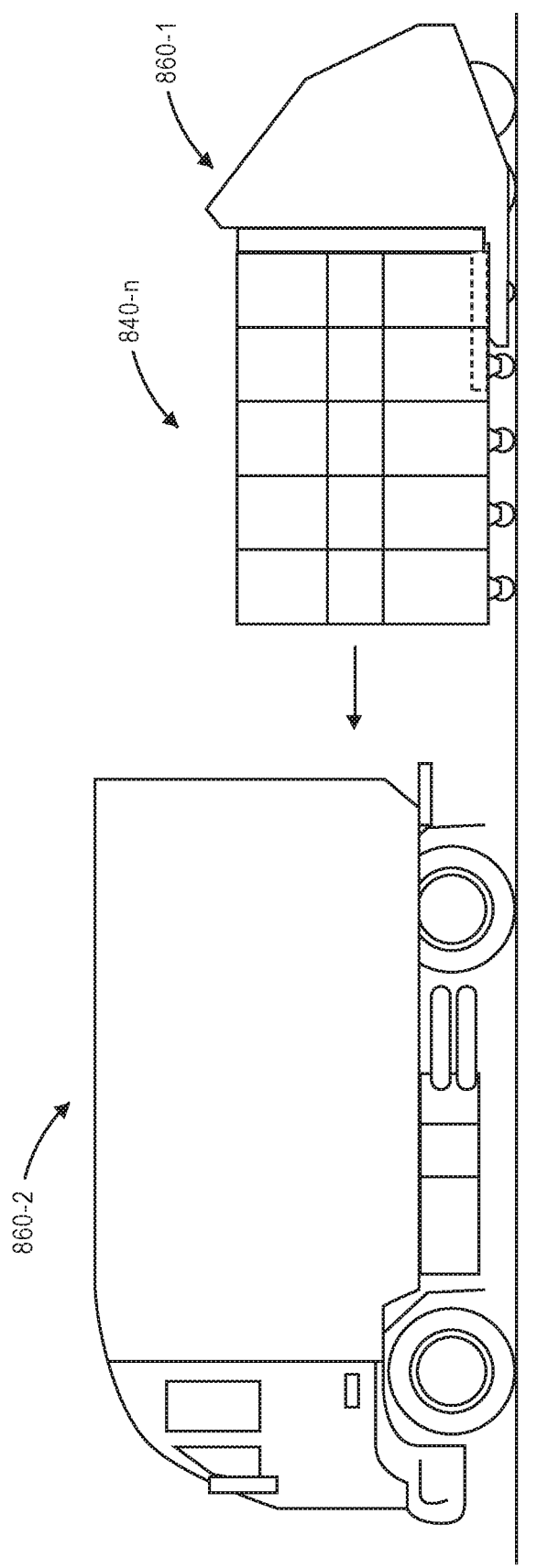
Figure 8F:
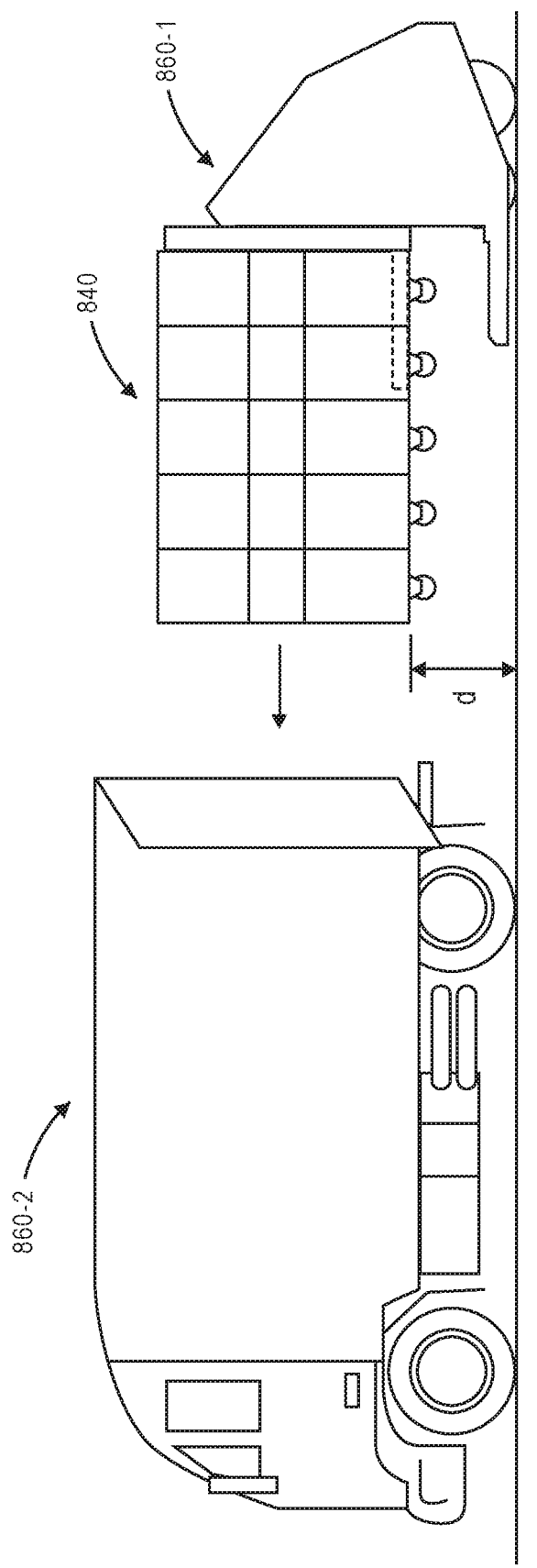

As is shown in FIGS. 8E and 8F, the mobile module 840-*n* may be transferred from the delivery vehicle 860-1 to the delivery vehicle 860-2 by aligning the delivery vehicle 860-1 in reverse, with the guide tracks 858-*i* of the mobile module 840-*n* with the guide rails 868 of the delivery vehicle 860-2, and backing the delivery vehicle 860-1 toward the delivery vehicle 860-2 until the mounted balls 844 of the delivery vehicle 860-2 engage with the sockets 846 of the mobile module 840. The delivery vehicle 860-1 may then travel in a forward direction, away from the delivery vehicle 860-2, and leave the mobile module 840-*n* within a cargo bay of the delivery vehicle 860-2. Subsequently, the delivery vehicle 860-2 may travel to a location associated with destinations for one or more items stored within the mobile module 840.

In accordance with some embodiments of the present disclosure, items may be loaded into bins or other storage units within a mobile module in a manner that enables the items to be efficiently offloaded from the mobile module, e.g., by one or more associates or autonomous mobile robots, when the mobile module arrives at one or more locations. Referring to FIGS. 9A through 9D, views of aspects of one mobile module for delivering items in accordance with embodiments of the present disclosure are shown. Except where otherwise noted, reference numerals preceded by the number "9" in FIGS. 9A through 9D refer to elements that are similar to elements having reference numerals preceded by the number "8" in FIGS. 8A through 8F, by the number "7" in FIGS. 7A through 7D, by the number "6" in FIG. 6, by the number "5" in FIGS. 5A through 5C, by the number "4" in FIGS. 4A through 4C, by the number "2" in FIG. 2A or FIG. 2B or by the number "1" shown in FIGS. 1A through 1M.

Figure 9A:
FIGS. 9A through 9D are views of aspects of one system for delivering items using mobile modules in accordance with embodiments of the present disclosure.
Figure 9B:
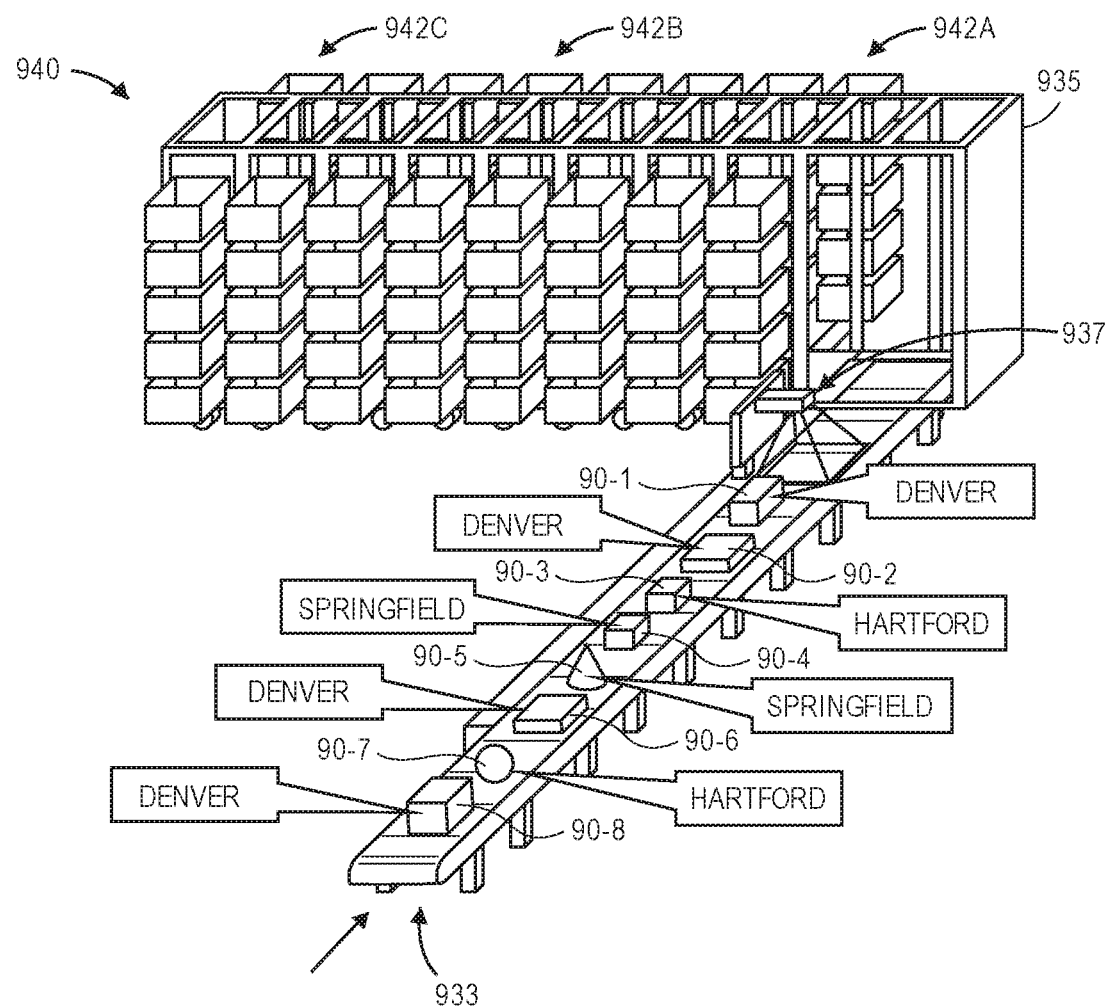

As is shown in FIG. 9A, a plurality of items are to be delivered from a fulfillment center 910 in Seattle, Wash., to a destination 980-1 in Denver, Colo., to a destination 980-2 in Springfield, Ill., and to a destination 980-3 in Hartford, Conn. As is shown in FIG. 9B, the items 90-1, 90-2, 90-3, 90-4, 90-5, 90-6, 90-7, 90-8 may be singulated based on their ultimate destinations as the items 90-1, 90-2, 90-3, 90-4, 90-5, 90-6, 90-7, 90-8 are loaded into the mobile module 940 having pluralities of bins 942A, 942B, 942C or other storage units by way of a conveyor 933 and a sortation system 935. For example, as is shown in FIG. 9B, a scanner 937 or other system may capture data regarding each of the items, as the items pass within a field of view of the scanner 937 on the conveyor 933. Based on the captured data, the items 90-1, 90-2, 90-6, 90-8 may be identified as having been ordered for delivery to Denver, while the items 90-4, 90-5 may be identified as having been ordered for delivery to Springfield, and the items 90-3, 90-7 may be identified as having been ordered for delivery to Hartford. The items 90-3, 90-7 that are to be delivered to Hartford may be loaded into the plurality of bins 942A that is nearest the conveyor 937, e.g., by one or more associates or autonomous mobile robots. The items 90-4, 90-5 that are to be delivered to Springfield may be loaded into the plurality of bins 942B that is in a central region of the mobile module 940, while the items 90-1, 90-2, 90-6, 90-8 that are to be delivered to Denver may be loaded into the plurality of bins 942C that are farthest from the conveyor 937, e.g., at a free end of the mobile module 940.

Figure 9C:
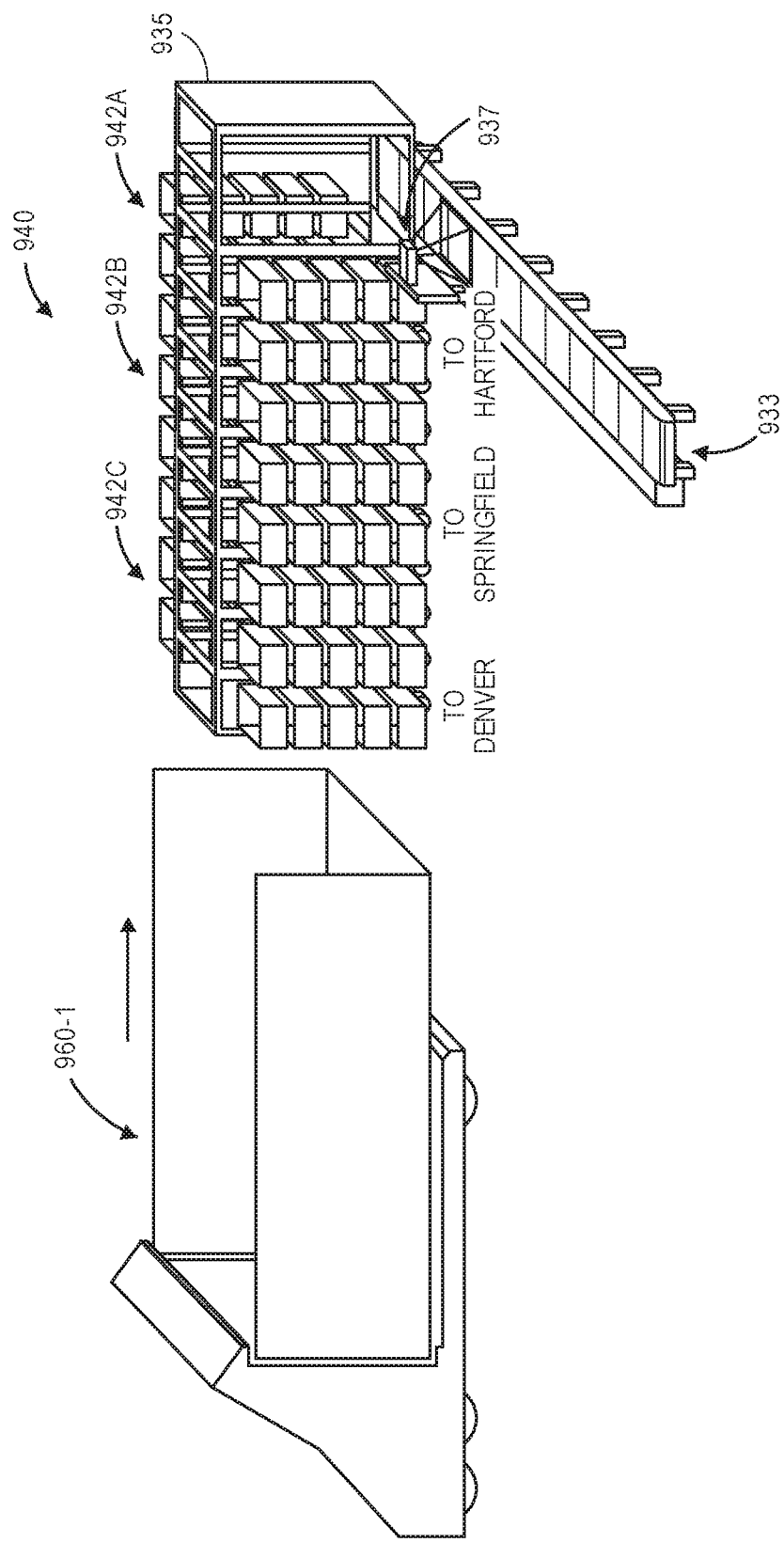
Figure 9D:
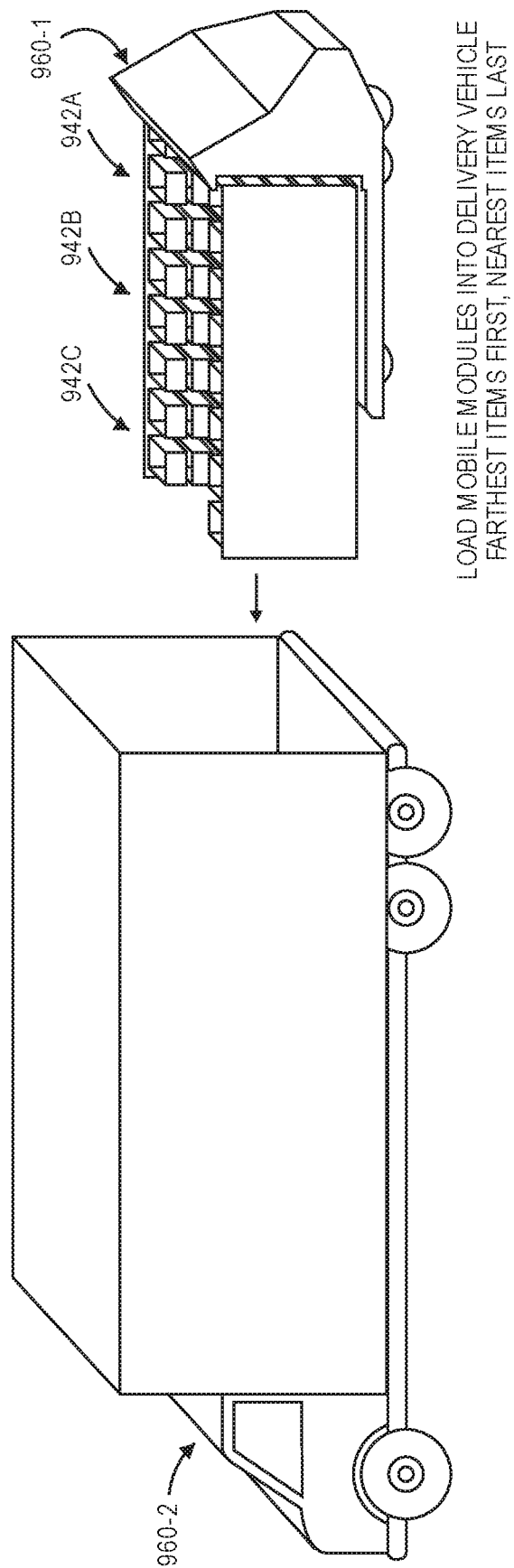

As is shown in FIGS. 9C and 9D, the mobile module 940 may be loaded onto a first delivery vehicle 960-1, which may be an industrial powered vehicle such as an automatic forklift that is typically operated in indoor or outdoor environments and for short distances, by operating the delivery vehicle 960-1 in reverse to mate with the mobile module 940, and releasing the mobile module 940 from the sortation system 935, before transporting the mobile module 940 to a second delivery vehicle 960-2. The mobile module 940 may then be loaded onto the second delivery vehicle 960-2, e.g., by operating the delivery vehicle 960-1 in reverse, and depositing the mobile module 940 onto the second delivery vehicle 960-2, which may be a large truck, such as an 18-wheeled tractor-trailer or other like vehicle that is typically operated for travel on roads and for long distances. By loading the mobile module 940 onto the second delivery vehicle 960-2 in this manner, the items that are to be removed from the mobile module 940 last, viz., the items that are being delivered to Hartford and are stored in the plurality of bins 942C, are stored in a forward portion of the delivery vehicle 960-2, farthest from the access. The items that are to be removed from the mobile module 940 second, viz., the items that are being delivered to Springfield and are stored in the plurality of bins 942B, are stored in a central portion of the delivery vehicle 960-2, while the items that are to be removed from the mobile module first, viz., the items that are being delivered to Denver and are stored in the plurality of bins 942A, are nearest the access to the delivery vehicle 960-2.

Figure 10A:
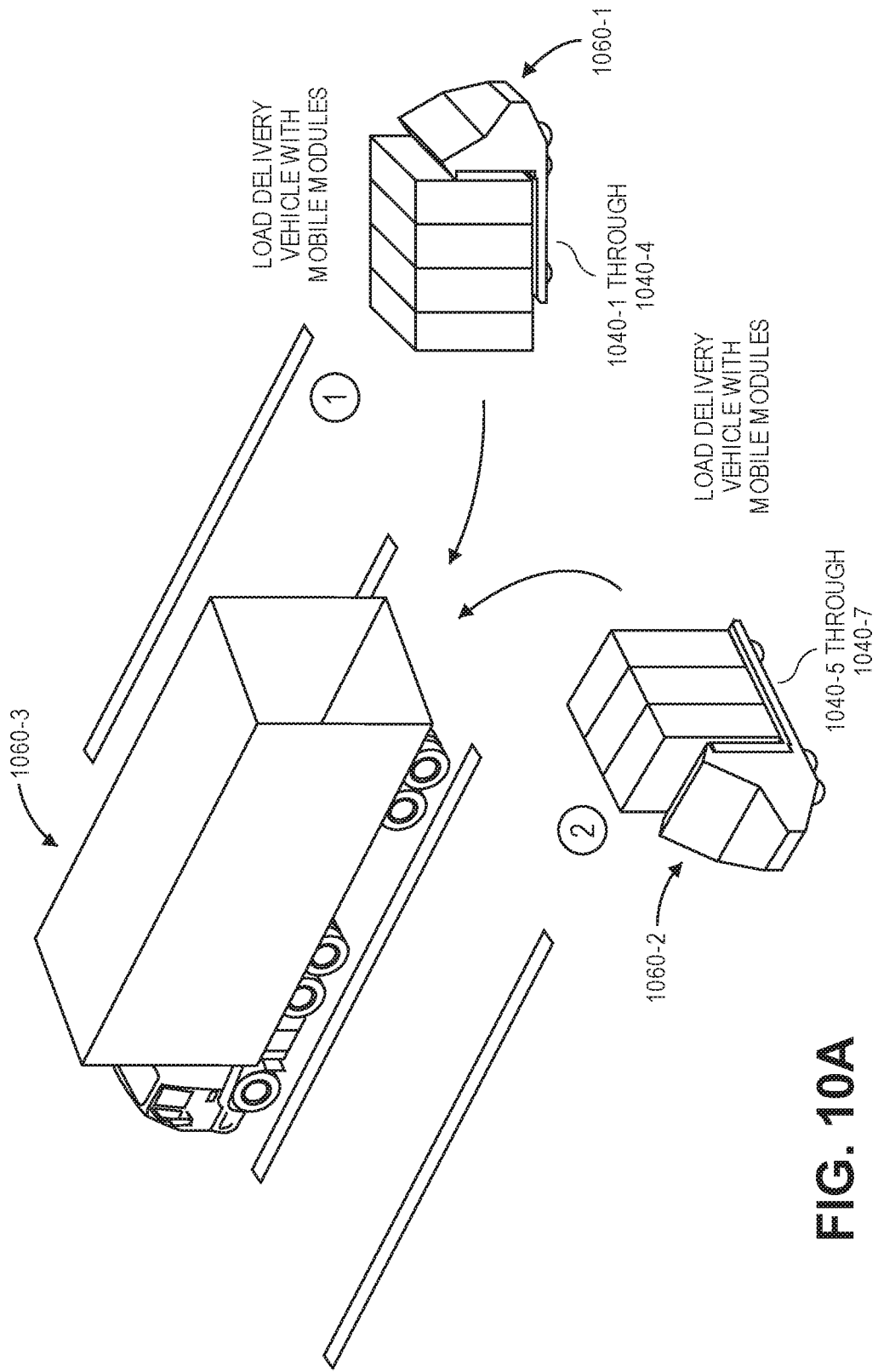
FIGS. 10A and 10B are views of aspects of one system for delivering items using mobile modules in accordance with embodiments of the present disclosure.
Figure 10B:
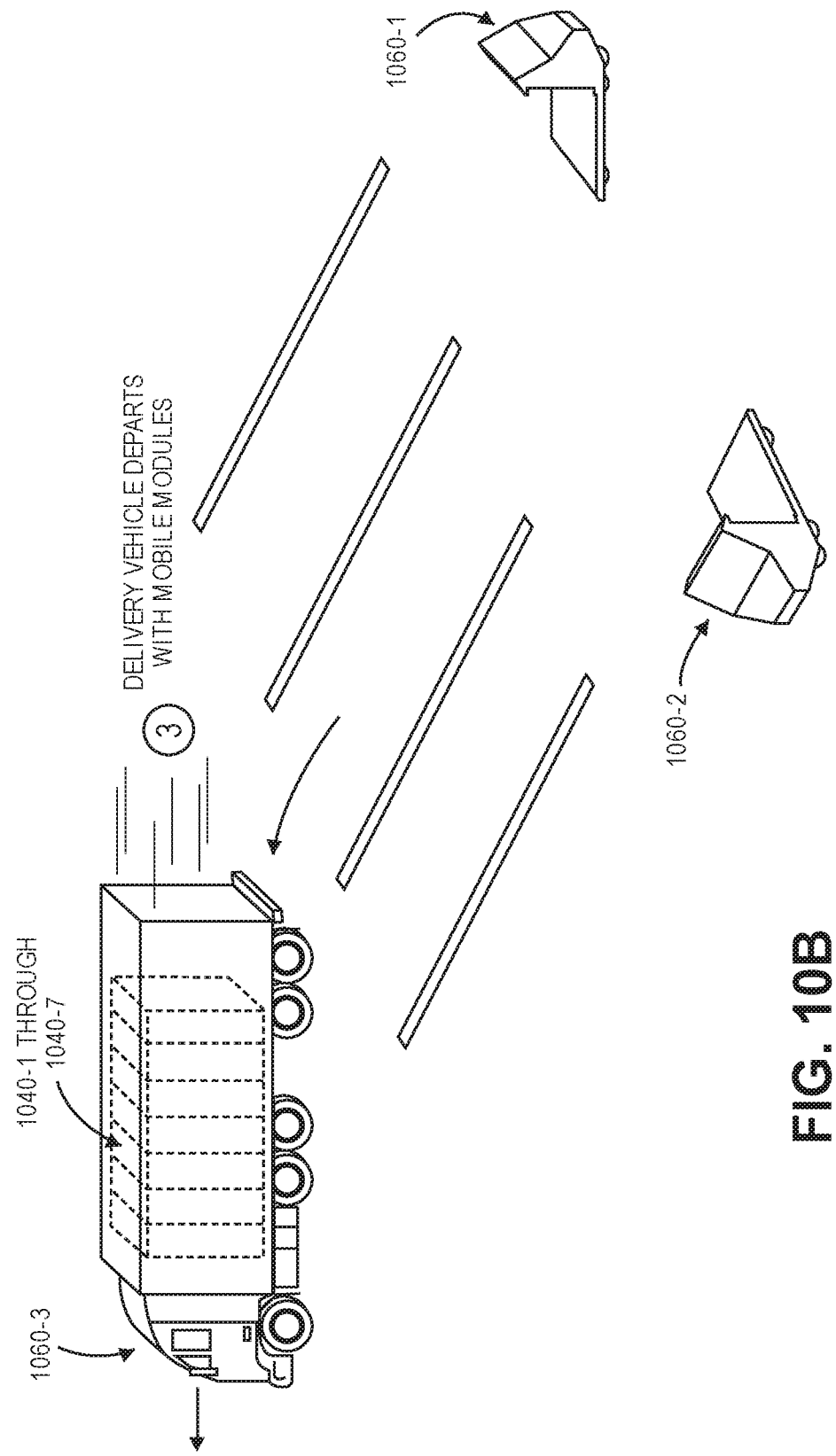

Additionally, two or more mobile modules may be loaded with items and placed onto a delivery vehicle for delivery to customers. Referring to FIGS. 10A and 10B, views of aspects of one mobile module for delivering items in accordance with embodiments of the present disclosure are shown. Except where otherwise noted, reference numerals preceded by the number "10" in FIGS. 10A and 10B refer to elements that are similar to elements having reference numerals preceded by the number "9" in FIGS. 9A through 9D, by the number "8" in FIGS. 8A through 8F, by the number "7" in FIGS. 7A through 7D, by the number "6" in FIG. 6, by the number "5" in FIGS. 5A through 5C, by the number "4" in FIGS. 4A through 4C, by the number "2" in FIG. 2A or FIG. 2B or by the number "1" shown in FIGS. 1A through 1M.

As is shown in FIG. 10A, a first delivery vehicle 1060-1 is carrying four mobile modules 1040-1 through 1040-4, and a second delivery vehicle 1060-2 is carrying three mobile modules 1040-5 through 1040-7. For example, the mobile modules 1040-1 through 1040-4 and the mobile modules 1040-5 through 1040-7 may be loaded with the same types of items, with items that are maintained in the same fulfillment centers or other sources, or with items that may be handled according to the same or similar handling instructions or procedures. Alternatively, the mobile modules 1040-1 through 1040-4 and the mobile modules 1040-5 through 1040-7 may be loaded with different types of items, with items that are maintained in different fulfillment centers or other sources, or with items that may be handled according to different handling instructions or procedures.

The first delivery vehicle 1060-1 and the second delivery vehicle 1060-2 may be any type or form of delivery vehicle. In some embodiments, the first delivery vehicle 1060-1 and the second delivery vehicle 1060-2 may be an industrial powered vehicle such as an automatic forklift that is typically operated in indoor or outdoor environments and for short distances. The first delivery vehicle 1060-1 and the second delivery vehicle 1060-2 may be configured to load the mobile modules 1040-1 through 1040-4 and the mobile modules 1040-5 through 1040-7, respectively, onto a third delivery vehicle 1060-3, which may also be any type or form of delivery vehicle. In some embodiments, the third delivery vehicle 1060-3 may be a tractor-trailer or other vehicle configured to transport substantially large loads over long distances.

As is shown in FIG. 10A, the first delivery vehicle 1060-1 and the second delivery vehicle 1060-2 may load the mobile modules 1040-1 through 1040-7 onto the third delivery vehicle 1060-3 in series, e.g., one before another. The mobile modules 1040-1 through 1040-4 and the mobile modules 1040-5 through 1040-7 may be coupled to one another within the third delivery vehicle 1060-3, e.g., by one or more fastening systems, such as the hook-and-slot fastening systems shown in FIG. 4A or the ball-and-socket fastening systems shown in FIG. 5A, or any other fastening systems (or coupling systems). As is shown in FIG. 10B, after the mobile modules 1040-1 through 1040-7 have been loaded onto the third delivery vehicle 1060-3, the third delivery vehicle 1060-3 may travel to one or more locations where items stored within the mobile modules 1040-1 through 1040-7 are to be delivered, and the items may be delivered to destinations at such locations by one or more associates or autonomous mobile robots.

Figure 11A:
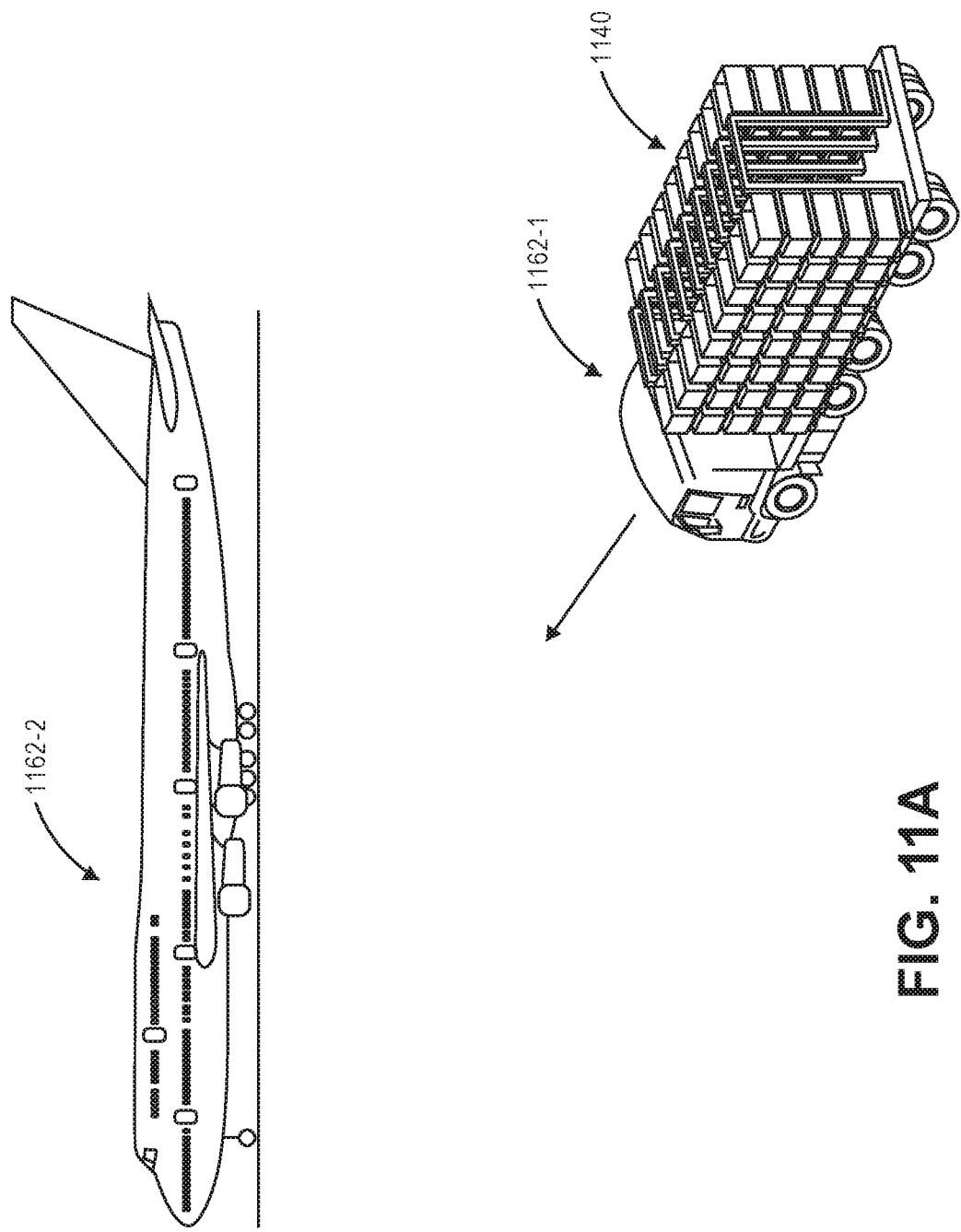
Figure 11B:
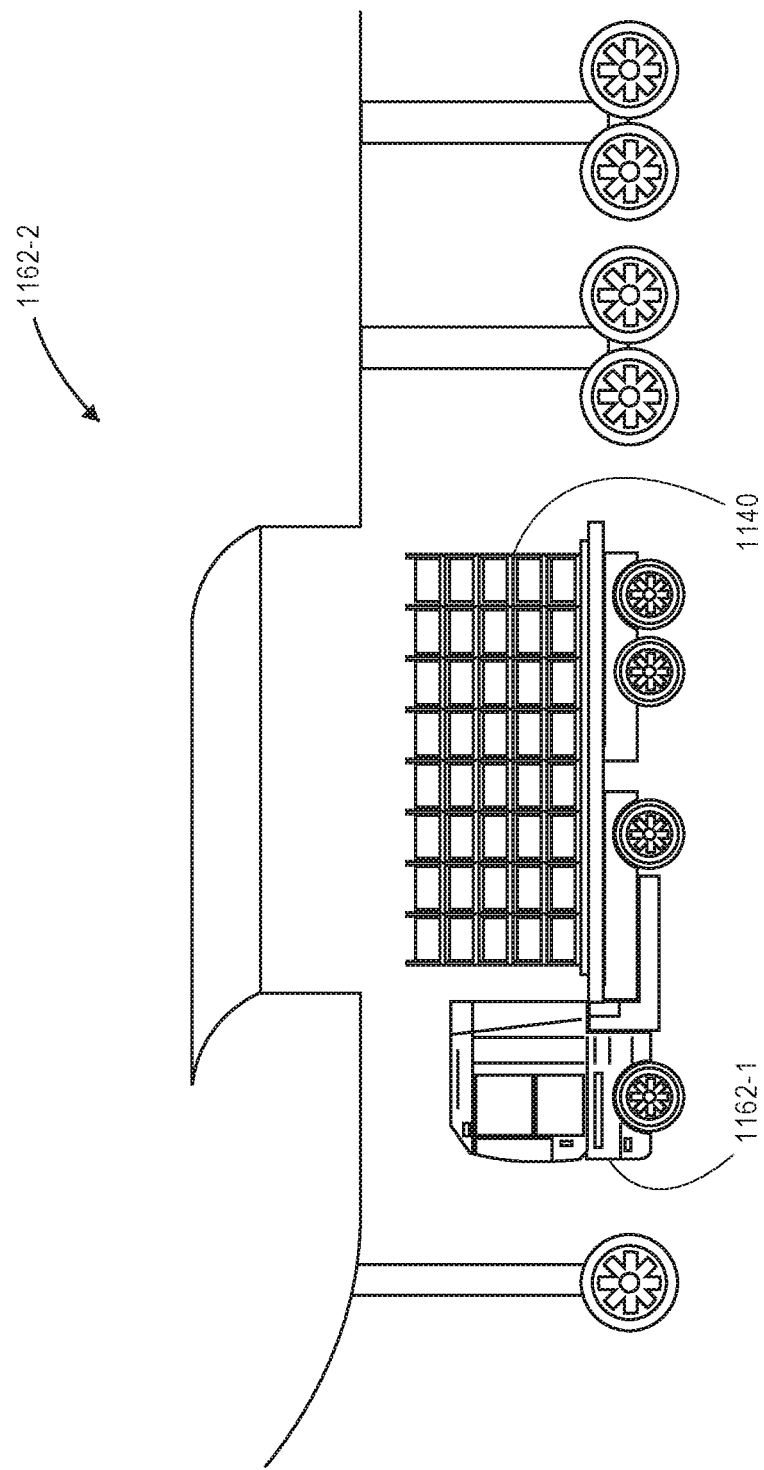
Figure 11C:
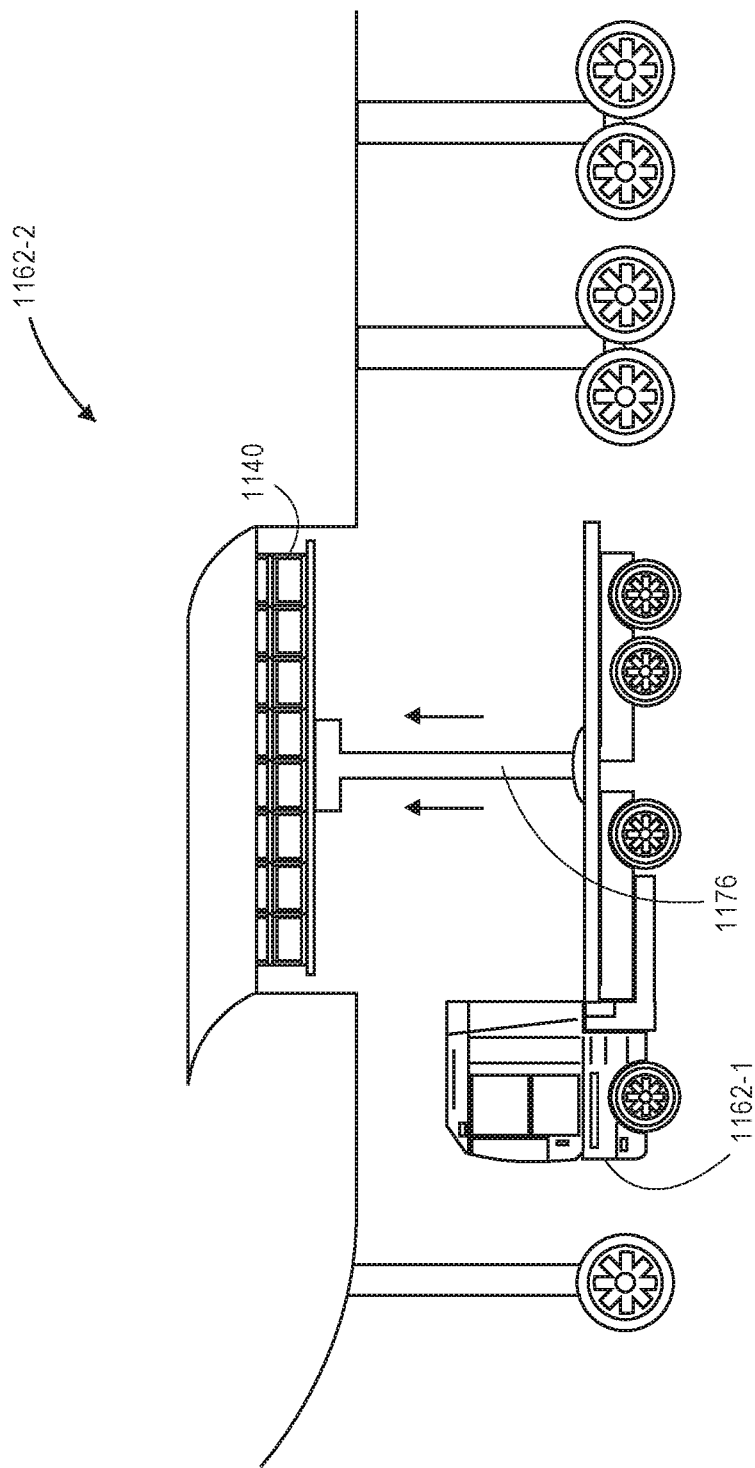

As is discussed above, one or more of the mobile modules of the present disclosure may be loaded onto and transported by delivery vehicles of any type or form, including cars, trucks, trailers, freight cars, container ships or aircraft. Referring to FIGS. 11A through 11C, views of aspects of one mobile module for delivering items in accordance with embodiments of the present disclosure are shown. Except where otherwise noted, reference numerals preceded by the number "11" in FIGS. 11A through 11C refer to elements that are similar to elements having reference numerals preceded by the number "10" in FIGS. 10A and 10B, by the number "9" in FIGS. 9A through 9D, by the number "8" in FIGS. 8A through 8F, by the number "7" in FIGS. 7A through 7D, by the number "6" in FIG. 6, by the number "5" in FIGS. 5A through 5C, by the number "4" in FIGS. 4A through 4C, by the number "2" in FIG. 2A or FIG. 2B or by the number "1" shown in FIGS. 1A through 1M.

As is shown in FIG. 11A, a delivery vehicle 1162-1 is transporting a mobile module 1140 to a delivery vehicle 1162-2. The delivery vehicle 1162-1 is a flatbed truck or other carrier having the mobile module 1140 placed or secured thereon. The delivery vehicle 1162-2 is an aircraft such as a jumbo jet, which may be manned or unmanned. The mobile module 1140 includes a plurality of bins or other storage units mounted to a frame or other structure. In some embodiments, one or more of the bins or storage units may contain items that were included in one or more orders, and are intended for delivery to one or more destinations by the delivery vehicles 1162-1, 1162-2. The bins or other storage units of the mobile module 1140 may have been loaded with the items manually or automatically, e.g., by an item sortation system such as the item sortation system 135 of FIGS. 1A through 1M.

As is shown in FIGS. 11B and 11C, the mobile module 1140 may be transferred from the delivery vehicle 1162-1 to the delivery vehicle 1162-2 by opening one or more hatches or doors to freight holds, cargo compartments or like storage areas of the delivery vehicle 1162-2, and elevating the mobile module 1140 into one of such holds, compartments or areas, e.g., by a lift 1176 (or jack, or elevator) or another like system. The mobile module 1140 may be engaged with the delivery vehicle 1162-2, and disengaged from the delivery vehicle 1162-1, before closing the one or more holds, compartments or other areas. The delivery vehicle 1162-2 may then depart for one or more intended destinations, and items may be delivered from the storage units to locations specified by customers, e.g., by one or more associates or machines, such as autonomous mobile robots.

Although the mobile module 1140 is shown as having an external shape of a rectangular prism or solid, mobile modules of the present disclosure may have any shape or form in accordance with the present disclosure. For example, in some embodiments, the mobile module 1140 may have an external shape of a cylinder or other three-dimensional shape, such as an octagonal prism, that may more readily conform to an interior of the delivery vehicle 1162-2. Moreover, the mobile module 1140 may further include one or more channels, conduits or other passageways that may be coaligned with one or more channels, conduits or other passageways of the delivery vehicle 1162-2 when the mobile module 1140 is properly installed therein.

Although some of the delivery vehicles disclosed herein are depicted as autonomous ground vehicles or tractor-trailers, those of ordinary skill in the pertinent arts will recognize that the systems and methods of the present disclosure are not so limited. Rather, the delivery vehicles of the present disclosure may be any type of vehicle that is configured to transport items from one location (e.g., a fulfillment center or any other type of location) to another location (e.g., a destination specified by a customer in an order for one or more items). The delivery vehicles of the present disclosure may further include any type of vehicles that are configured to transfer items or materials to an associate, a machine or another vehicle, or to receive items or materials from an associate, a machine or another vehicle, as necessary. Additionally, as is noted above, in some embodiments, the delivery vehicles of the present disclosure may include vehicles that are configured to travel by air, by sea, or across outer space, as well as on land.

Furthermore, although some of the embodiments of the present disclosure depict the delivery of items that are ordered by customers through online marketplaces, those of ordinary skill in the pertinent arts will recognize that the systems and methods of the present disclosure are not so limited. Rather, one or more of the mobile modules disclosed herein, or the systems or methods that rely on such modules, may be used to distribute inventory that may be made available through traditional commercial channels, e.g., by telephone or in one or more bricks-and-mortar stores, and delivered to customers or designated locations rapidly in response to orders for such items. Moreover, although some of the embodiments of the present disclosure depict mobile modules for transporting items or containers of such items are small in size, those of ordinary skill in the pertinent arts will recognize that the systems and methods of the present disclosure are not so limited. Rather, the mobile modules may be of any size or shape, and may be configured or outfitted with features that enable the delivery of items of any type or kind, and of any size or shape, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be connected to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A distribution system comprising:
   a fulfillment center;
   a sortation system having an autonomous mobile robot;
   at least one conveyor having a first end associated with the fulfillment center and a second end associated with the sortation system;
   a mobile module comprising:
      a frame having a first base, a first riser extending vertically upward from the first base, and a second riser extending vertically upward from the first base;
      an inner channel extending in parallel to a longitudinal axis defined by the frame between at least the first riser and the second riser,
      a first plurality of bins provided in association with the first riser, wherein each of the first plurality of bins is accessible via the inner channel; and
      a second plurality of bins provided in association with the second riser, wherein each of the second plurality of bins is accessible via the inner channel; and
   at least one computer system in communication with each of the fulfillment center, the at least one conveyor, and the autonomous mobile robot, wherein the at least one computer system is configured to execute a method comprising:
      receiving, over a computer network, a first order for delivery of at least a first item and a second item to a first destination;
      determining information regarding at least the first item and the second item, wherein the information regarding at least the first item and the second item comprises at least one attribute of the first item and at least one attribute of the second item;
      selecting a first bin of the first plurality of bins based at least in part on the information regarding at least the first item and the second item and the first destination;
      causing the first item to travel from the fulfillment center to the sortation system by the at least one conveyor;
      receiving, by the autonomous mobile robot, the first item at a first position corresponding to at least the second end of the at least one conveyor;
      transporting, by the autonomous mobile robot, the first item from the first position to a second position corresponding to the first bin;
      transferring, by the autonomous mobile robot, the first item into the first bin with the autonomous mobile robot in the second position;
      causing the autonomous mobile robot to return to the first position;
      causing the second item to travel from the fulfillment center to the sortation system by the at least one conveyor;
      receiving, by the autonomous mobile robot, the second item at the first position;
      transporting, by the autonomous mobile robot, the second item from the first position to the second position corresponding to the first bin;
      transferring, by the autonomous mobile robot, the second item into the first bin with the autonomous mobile robot in the second position;
      causing the mobile module to be loaded onto a first delivery vehicle; and
      causing the first delivery vehicle to transport at least the mobile module to at least the first destination.

2. The distribution system of claim 1, further comprising an imaging device in communication with the at least one computer system, wherein the imaging device includes at least a portion of the conveyor within a field of view, and wherein the method further comprises:
   capturing, by the imaging device, at least one image;
   recognizing the first item in the at least one image;
   in response to recognizing the first item in the at least one image,
      providing a first instruction to the autonomous mobile robot for causing the autonomous mobile robot to transport the first item from the first position to the second position; and
      providing a second instruction to the autonomous mobile robot for causing the autonomous mobile robot to transfer the first item into the first bin with the autonomous mobile robot in the second position.

3. The distribution system of claim 1, wherein the sortation system further comprises a frame having a channel defined by a first plurality of vertically aligned support elements and a second plurality of vertically aligned support elements,
   wherein the first item is transferred into the first bin with at least a portion of the frame of the sortation system inserted into the frame of the mobile module,
   wherein the autonomous mobile robot is configured to travel along a length of the channel of the sortation system,
   wherein each of the first plurality of bins is accessible by the autonomous mobile robot within the channel, and
   wherein each of the second plurality of bins is accessible by the autonomous mobile robot within the channel.

4. The distribution system of claim 1, wherein the method further comprises:
   receiving, over the computer network, a second order for delivery of at least a third item to a second destination;
   determining information regarding at least the third item, wherein the information regarding at least the third item comprises at least one attribute of the third item;
   determining a sequence for delivering at least the first item and the second item to the first destination and for delivering at least the third item to the second destination, wherein the first bin is selected based at least in part on the sequence;
   selecting a second bin of the first plurality of bins based at least in part on the information regarding at least the third item, the second destination, and the sequence;
   causing the third item to travel from the fulfillment center to the sortation system by the at least one conveyor;
   receiving, by the autonomous mobile robot, the third item at the first position;
   transporting, by the autonomous mobile robot, the third item from the first position to a third position corresponding to the second bin; and
   transferring, by the autonomous mobile robot; the third item into the second bin with the autonomous mobile robot in the third position,
   wherein causing the first delivery vehicle to transport at least the mobile module to at least the first destination comprises:
      causing the first delivery vehicle to transport at least the mobile module to at least the first destination and the second destination in accordance with the sequence.

5. A method comprising:
   receiving information regarding a first order comprising at least a first item from a first computer system over a network, wherein the first computer system is associated with a first customer account at an online marketplace;

determining that a facility has access to at least the first item by at least a second computer system, wherein the second computer system is associated with at least one of the online marketplace or the facility;

determining a first destination for at least the first item by at least the second computer system based at least in part on the information regarding the first order;

determining a route from a location associated with the facility to a location associated with at least the first destination by at least the second computer system;

selecting a first storage unit for at least the first item by at least the second computer system,
  wherein the first storage unit is one of a first plurality of storage units provided in association with a mobile module at the facility,
  wherein the mobile module comprises a first base, at least a first riser extending vertically upward from the first base and at least a second riser extending vertically upward from the first base,
  wherein each of the first plurality of storage units is mounted in association with the first riser and each of a second plurality of storage units is mounted in association with at least the second riser,
  wherein a channel extends along a longitudinal axis of the mobile module between the first riser and the second riser, and
  wherein the first storage unit is selected based at least in part on at least one of the route or the first destination;

causing at least the first item to be stored in association with the first storage unit;

transporting the mobile module from the facility to the location associated with at least the first destination via the route by at least one delivery vehicle, wherein the mobile module is transported to the location associated with at least the first destination with the first item stored in association with the first storage unit; and after the mobile module has arrived at the location associated with at least the first destination,
  causing at least the first item to be delivered from the mobile module to the first destination.

6. The method of claim 5, wherein selecting the first storage unit comprises:

determining at least a first attribute of the first item by at least the second computer system, wherein the first attribute is one of a size, a shape, a dimension, the destination or a handling requirement for the first item; and selecting the first storage unit for at least the first item by at least the second computer system based at least in part on the first attribute of the first item.

7. The method of claim 6, wherein the order comprises the first item and a second item, and
  wherein the method further comprises:
  determining at least a second attribute of the second item by at least the second computer system, wherein the second attribute is one of a size, a shape, a dimension, the destination or a handling requirement for the second item, wherein the route is determined based at least in part on the first destination and the second destination, and wherein the first storage unit is selected based at least in part on the first attribute of the first item, the second attribute of the second item and the route;

causing at least the second item to be stored in association with the first storage unit,
  wherein the mobile module is transported to the location associated with at least the first destination with each of the first item and the second item stored in association with the first storage unit; and
  after the mobile module has arrived at the location associated with at least the first destination,
    causing at least the second item to be delivered from the mobile module to the first destination.

8. The method of claim 5, wherein the mobile module further comprises a first sub-module releasably coupled to a second sub-module,
  wherein the first sub-module comprises the first base, at least the first riser and at least the second riser,
  wherein the second sub-module comprises a second base, at least a third riser extending vertically upward from the second base and at least a fourth riser extending vertically upward from the second base, and
  wherein the channel further extends along the longitudinal axis of the mobile module between the third riser and the fourth riser.

9. The method of claim 5, wherein the first storage unit of the first plurality of storage units is of a first type, and
  wherein the second storage unit of the second plurality of storage units is of one of the first type or a second type.

10. The method of claim 5, wherein the first storage unit is one of:
  a bin, a shelf, a rack, a bar, or a hook, and
  wherein causing at least the first item to be stored in association with the first storage unit comprises at least one of:
    placing the first item or a first container including the first item in the bin;
    placing the first item or the first container on the shelf;
    placing the first item or the first container on the rack;
    hanging the first item or the first container from the bar; or
    hanging the first item or the first container from the hook.

11. The method of claim 5, wherein an external width of the first base is not greater than an internal width of a cargo bay of the at least one delivery vehicle, and
  wherein an external height of each of the first riser and the second riser is not greater than an internal height of the cargo bay.

12. The method of claim 5, wherein causing at least the first item to be stored in association with the first storage unit comprises:
  transporting at least the first item to a sortation system by at least one conveyor, wherein at least a portion of the sortation system extends into the channel;
  receiving, by at least one autonomous mobile robot of the sortation system, at least the first item from the at least one conveyor;
  transporting, by the at least one autonomous mobile robot, at least the first item from a first position associated with the conveyor to a second position associated with the first storage unit within the channel; and
  depositing, by the at least one autonomous mobile robot, at least the first item into the first storage unit at the second position.

13. The method of claim 12, wherein causing at least the first item to be stored in association with the first storage unit further comprises:

capturing, by at least one imaging device having at least a portion of the at least one conveyor within a field of view, at least one image;

recognizing, by at least the second computer system, at least one attribute of the first item within the at least one image; and in response to recognizing the at least one attribute of the first item within the at least one image,
instructing, by at least the second computer system, the at least one autonomous mobile robot to transport at least the first item from the first position to the second position.

14. The method of claim 12, wherein transporting the mobile module to the location associated with at least the first destination by the at least one delivery vehicle comprises:

engaging a first end of the mobile module by a first delivery vehicle, wherein engaging the first end of the mobile module by the first delivery vehicle comprises inserting the first end of the mobile module into a cargo bay of the first delivery vehicle;

uncoupling a second end of the mobile module from the sortation system;

transporting, by the first delivery vehicle, the mobile module from a location of the sortation system to a location of a second delivery vehicle;

transferring the mobile module from the first delivery vehicle to the second delivery vehicle, wherein transferring the mobile module from the first delivery vehicle to the second delivery vehicle comprises inserting the second end of the mobile module into a cargo bay of the first delivery vehicle;

coupling at least the second end of the mobile module to the second delivery vehicle; and transporting the mobile module to the location associated with at least the first destination by the second delivery vehicle.

15. The method of claim 12, wherein the order comprises the first item and a second item, and
wherein the method further comprises:
causing the autonomous mobile robot to return to the first position;
transporting at least the second item to the sortation system by the at least one conveyor;
receiving, by the at least one autonomous mobile robot, at least the second item from the at least one conveyor;
transporting, by the at least one autonomous mobile robot, at least the second item from the first position to the second position; and
depositing, by the at least one autonomous mobile robot, at least the second item into the first storage unit at the second position.

16. The method of claim 5, wherein the delivery vehicle is one of a tractor-trailer, a truck or a van.

17. A module for storing items comprising:
a frame having a first base, a first riser extending vertically upward from the first base, and a second riser extending vertically upward from the first base;
an inner channel extending in parallel to a longitudinal axis defined by the frame between at least the first riser and the second riser,
a first plurality of storage units provided in association with at least the first riser, wherein each of the first plurality of storage units is accessible via the inner channel; and
a second plurality of storage units provided in association with at least the second riser, wherein each of the second plurality of storage units is accessible via the inner channel,
wherein an external width of the first base corresponds to an internal width of a cargo bay of at least one delivery vehicle, and
wherein an external height of each of the first riser and the second riser corresponds to an internal height of the cargo bay.

18. The module of claim 17, further comprising:
a first sub-module comprising the first base, the first riser and the second riser;
a second sub-module comprising a second base, a third riser and a fourth riser, wherein the inner channel further extends in parallel to the longitudinal axis defined by the frame between at least the third riser and the fourth riser;
a third plurality of storage units provided in association with the third riser, wherein each of the third plurality of storage units is accessible via the inner channel; and
a fourth plurality of storage units provided in association with the fourth riser, wherein each of the fourth plurality of storage units is accessible via the inner channel,
wherein the first sub-module is releasably coupled to the second sub-module by at least one coupling system, and
wherein the second sub-module is configured for coupling with the at least one delivery vehicle by the at least one coupling system.

19. The module of claim 18, wherein an internal width of the inner channel corresponds to an external width of at least a portion of an item sortation system having at least one autonomous mobile robot, and
wherein an internal height of the inner channel corresponds to an external height of at least the portion of the item sortation system.

20. The module of claim 17, wherein at least one of the first plurality of storage units is one of a bin, a shelf, a rack, a bar or a hook coupled to the first riser.

* * * * *